(12) United States Patent
Hamilton

(10) Patent No.: US 11,371,484 B2
(45) Date of Patent: Jun. 28, 2022

(54) WIND TURBINE FARM

(71) Applicant: William Larry Hamilton, Houston, TX (US)

(72) Inventor: William Larry Hamilton, Houston, TX (US)

(*) Notice: Subject to any disclaimer, the term of this patent is extended or adjusted under 35 U.S.C. 154(b) by 0 days.

(21) Appl. No.: 17/323,849

(22) Filed: May 18, 2021

(65) Prior Publication Data

US 2021/0301785 A1 Sep. 30, 2021

Related U.S. Application Data

(63) Continuation-in-part of application No. 16/827,665, filed on Mar. 23, 2020, now Pat. No. 11,041,481.

(60) Provisional application No. 62/891,966, filed on Aug. 27, 2019.

(51) Int. Cl.
*F03D 7/02* (2006.01)
*F03D 7/04* (2006.01)
*G01W 1/10* (2006.01)
*G01W 1/02* (2006.01)

(52) U.S. Cl.
CPC ............ *F03D 7/0204* (2013.01); *F03D 7/048* (2013.01); *G01W 1/02* (2013.01); *G01W 1/10* (2013.01)

(58) Field of Classification Search
CPC ........ F03D 7/0204; F03D 7/048; G01W 1/02; G01W 1/10
See application file for complete search history.

(56) References Cited

U.S. PATENT DOCUMENTS

| 7,484,363 | B2* | 2/2009 | Reidy | F03D 9/257 60/398 |
| 2014/0017080 | A1* | 1/2014 | Porm | F03D 1/0633 416/1 |
| 2018/0010576 | A1* | 1/2018 | Brake | F03D 7/048 |
| 2018/0100488 | A1* | 4/2018 | Miranda | F03D 7/045 |

* cited by examiner

*Primary Examiner* — Yoshihisa Ishizuka
(74) *Attorney, Agent, or Firm* — Kali-Law Group, P.C.

(57) ABSTRACT

Wind turbine farms are presented including: a number of steerable wind turbines each having a turbine diameter, where the number of steerable wind turbines is grouped pairwise into a number of monopole wind tower pairs, where each monopole wind tower pair is placed in a fixed pair placement and oriented in one of a number of fixed pair orientations, where each one of the number of fixed pair orientations corresponds with one of a number of prevailing wind directions, and where the number of monopole wind tower pairs is placed in a number of fixed pair positions.

18 Claims, 36 Drawing Sheets

FIG. 1
(PRIOR ART)
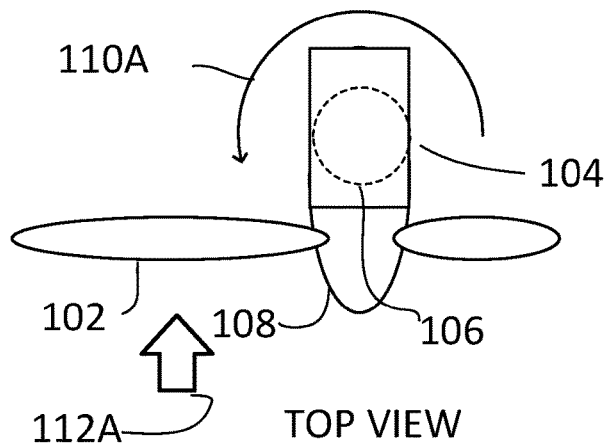
TOP VIEW
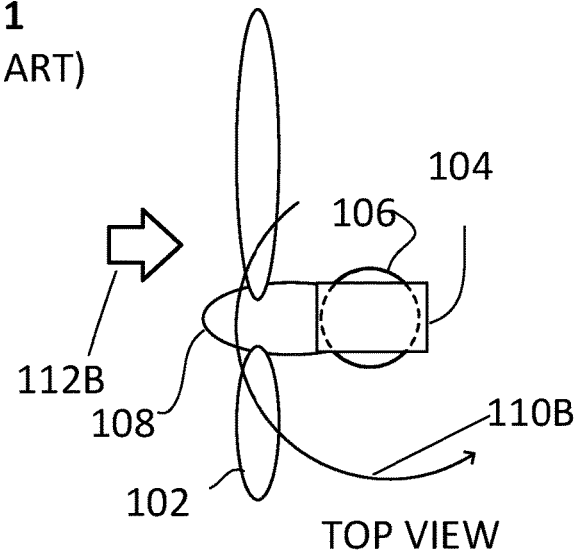
TOP VIEW
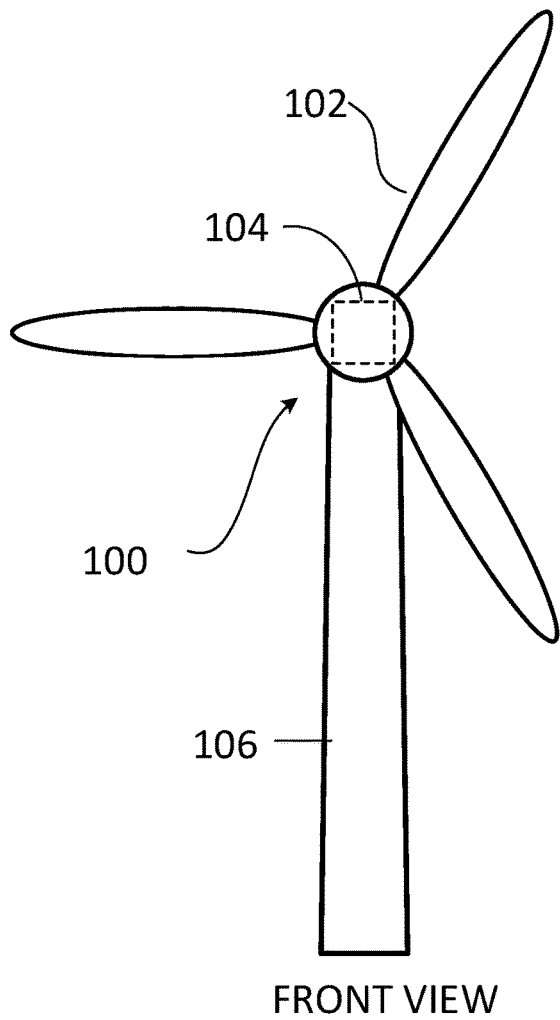
FRONT VIEW
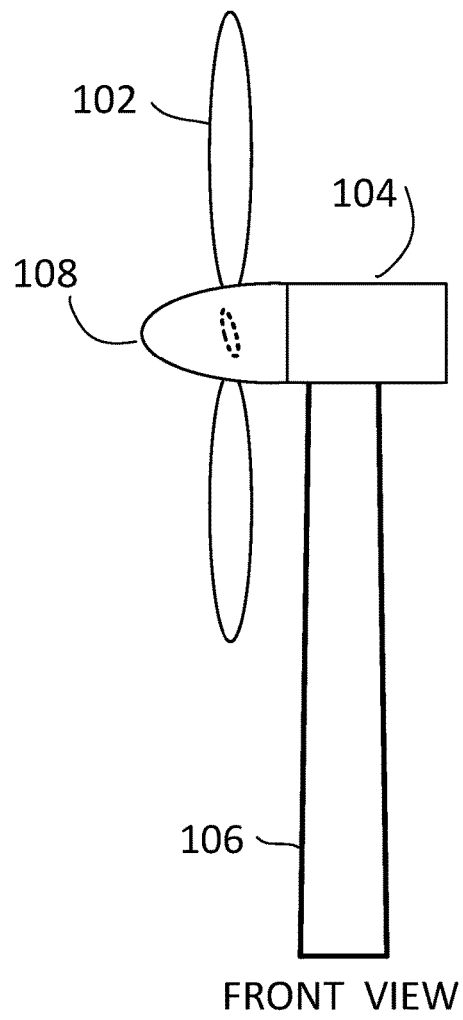
FRONT VIEW

FRONT VIEW

SIDE VIEW

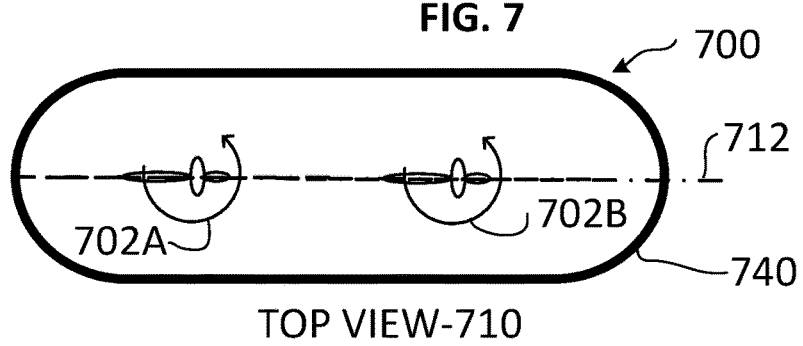
FIG. 7
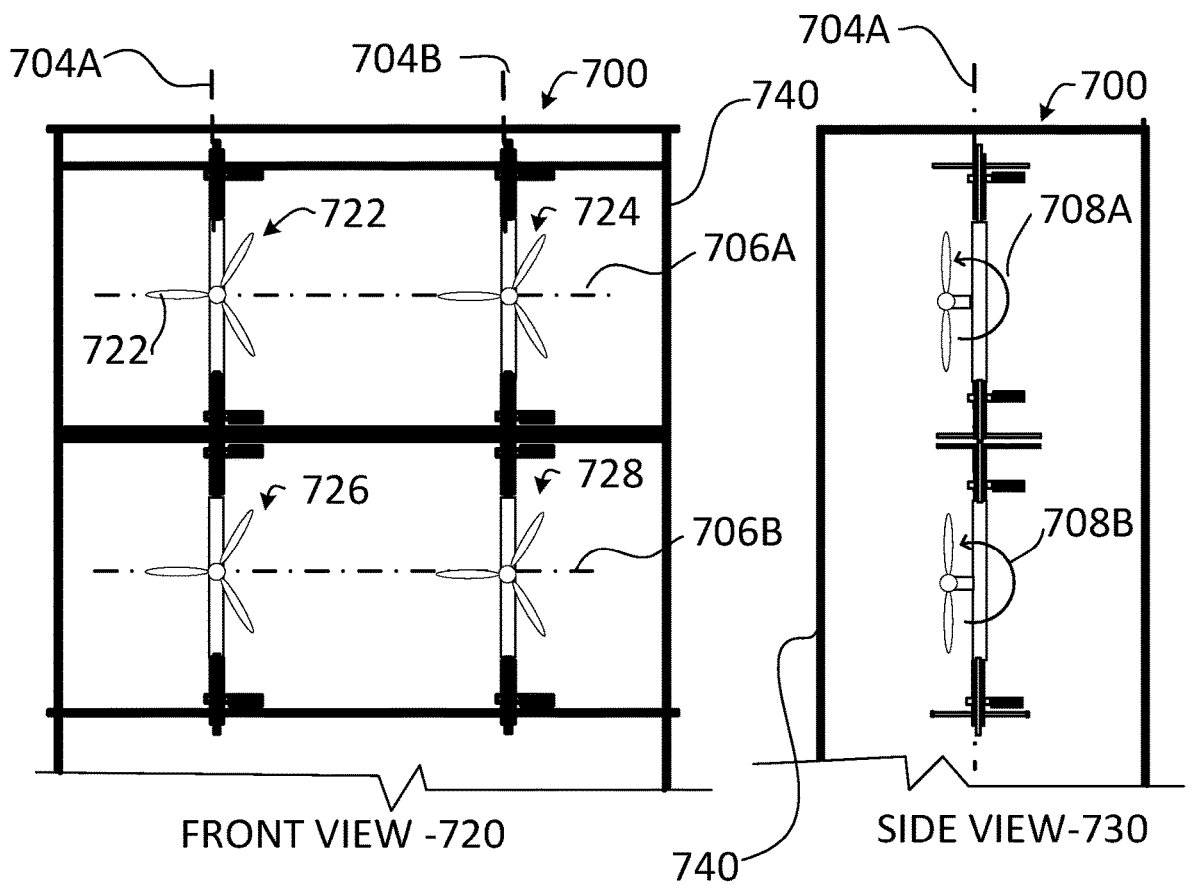

FIG. 9
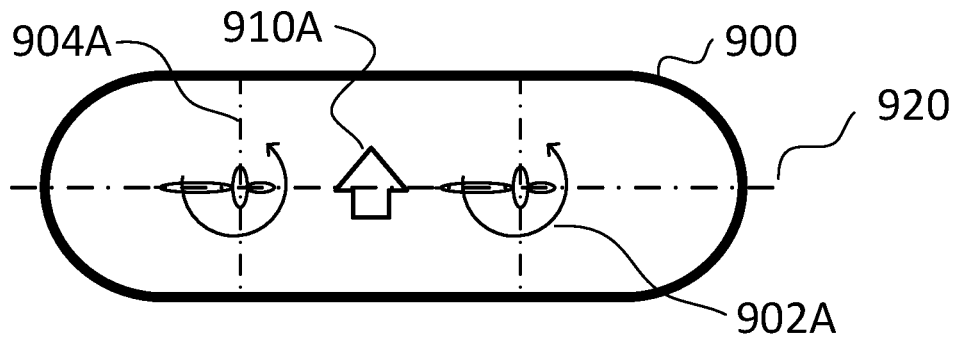
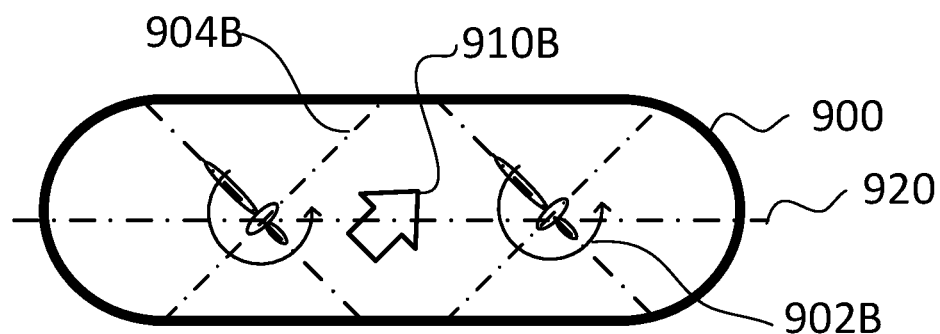
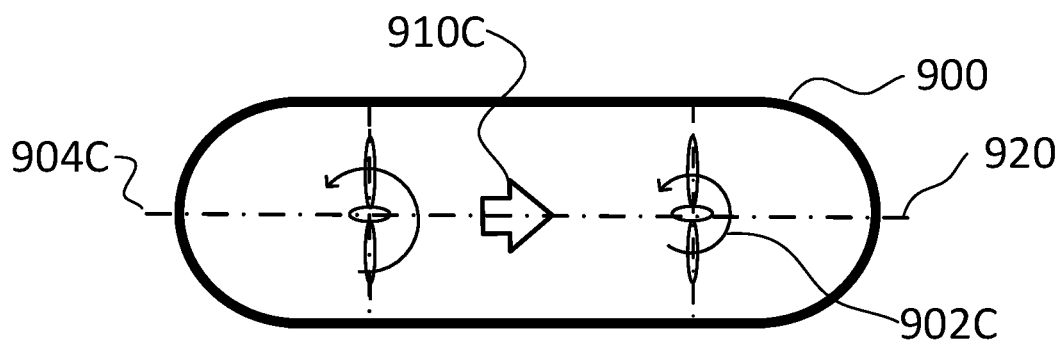
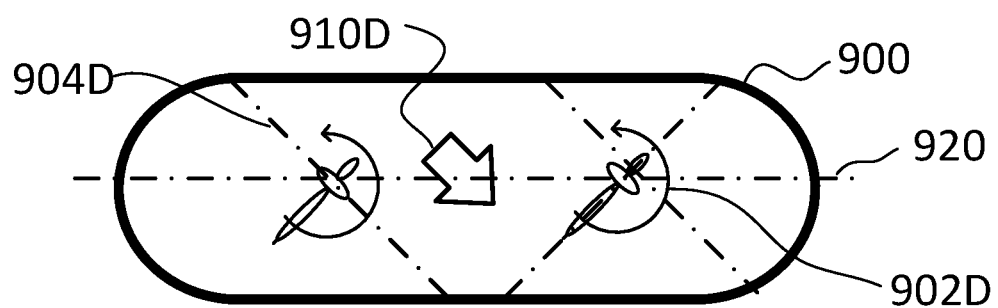

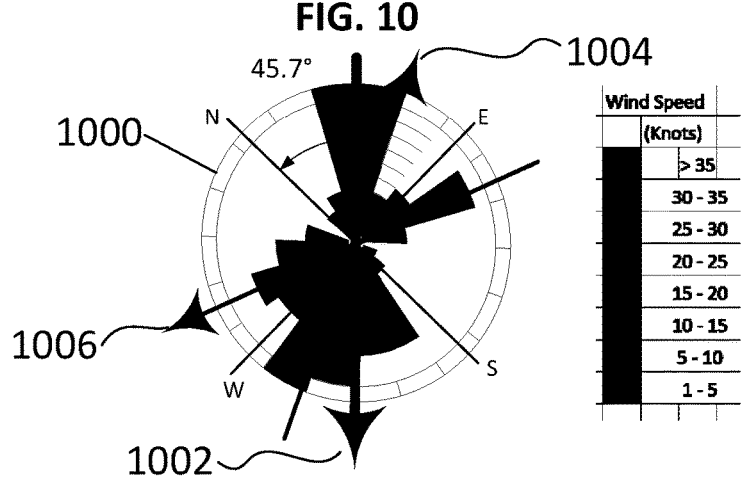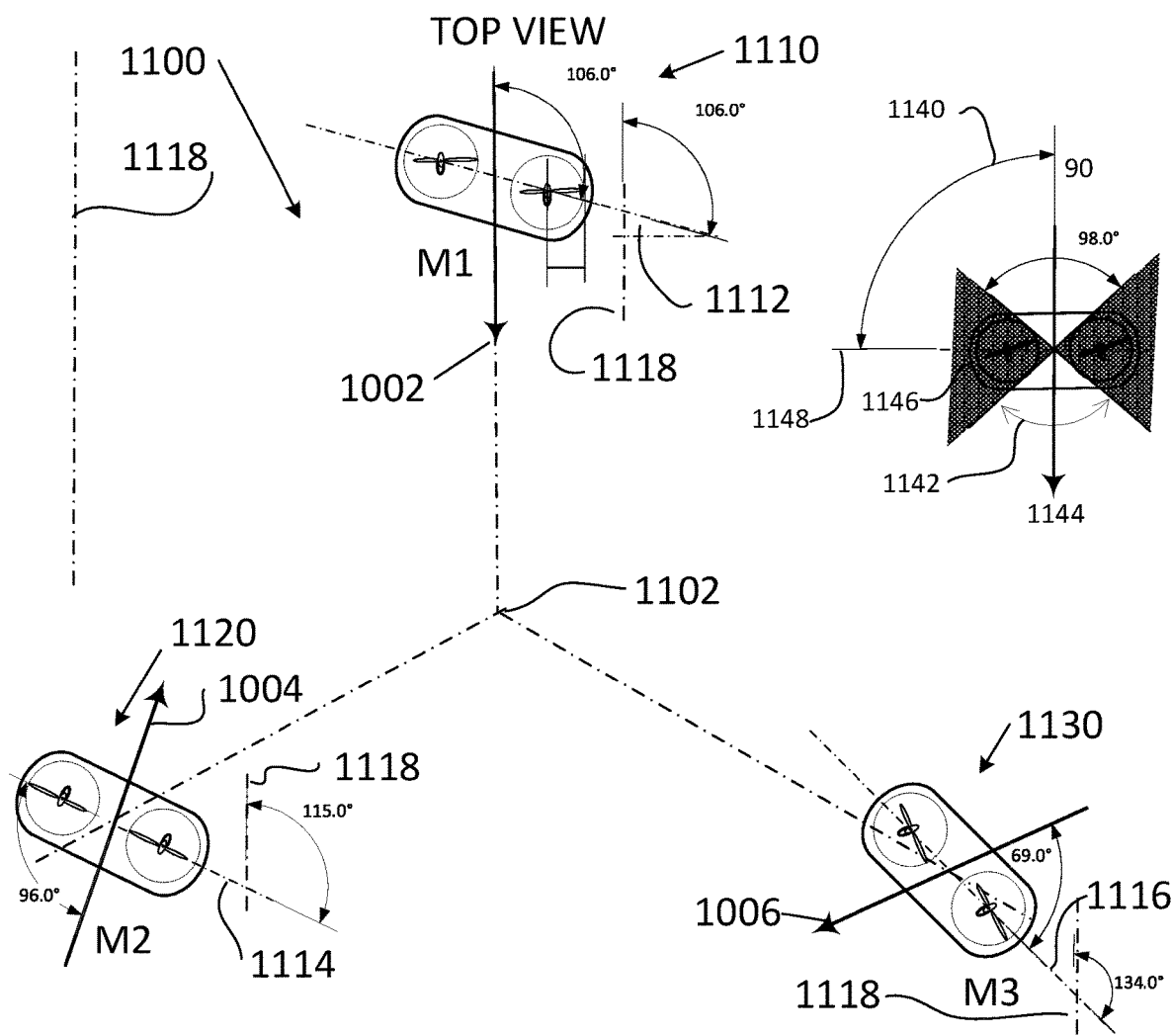

FIG 22
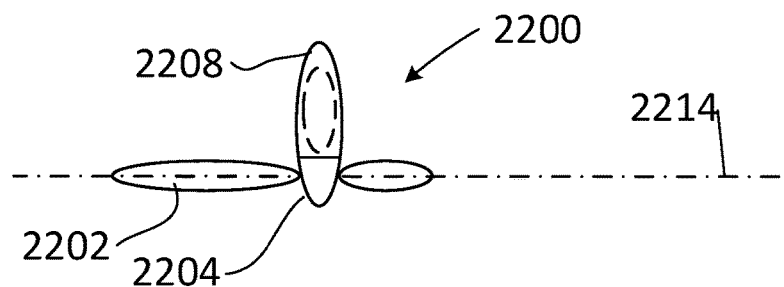
TOP VIEW - 2210
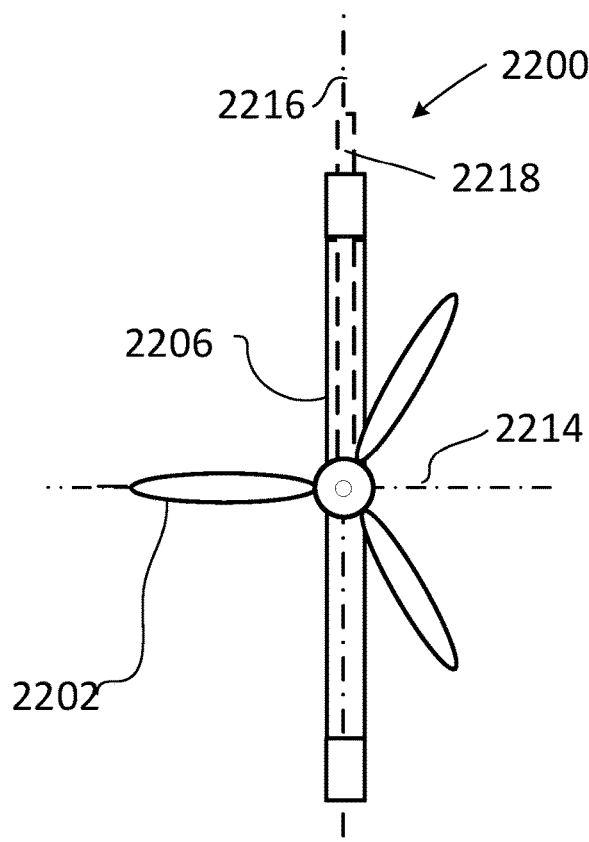
FRONT VIEW - 2220
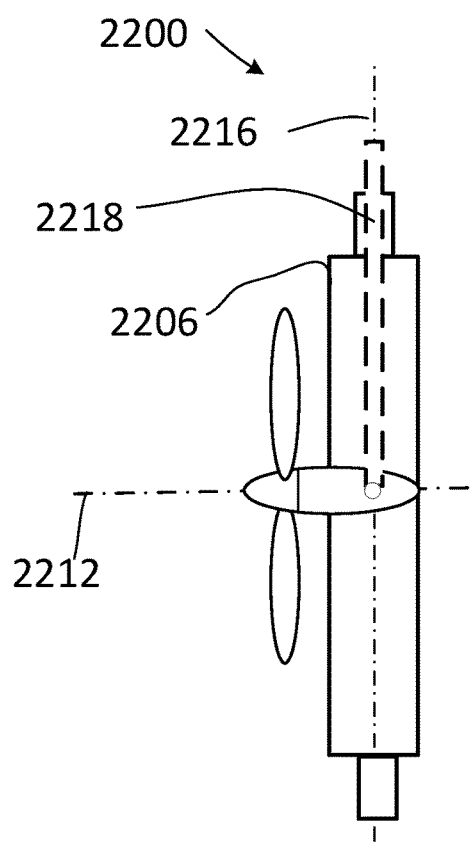
SIDE VIEW - 2230

FIG. 24
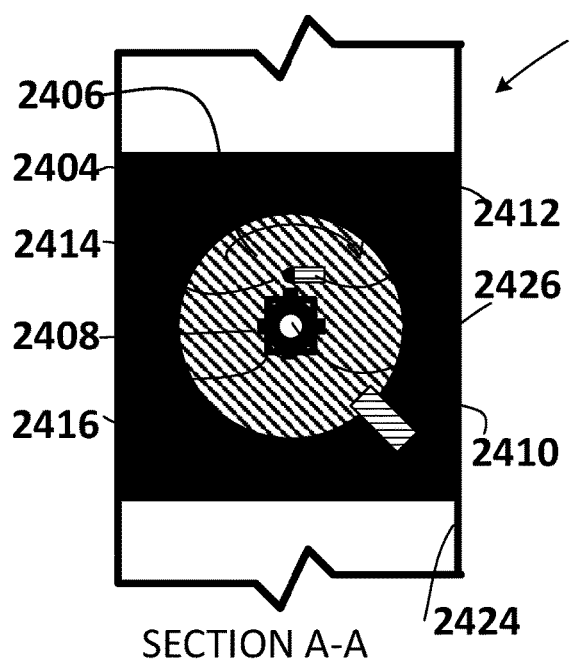
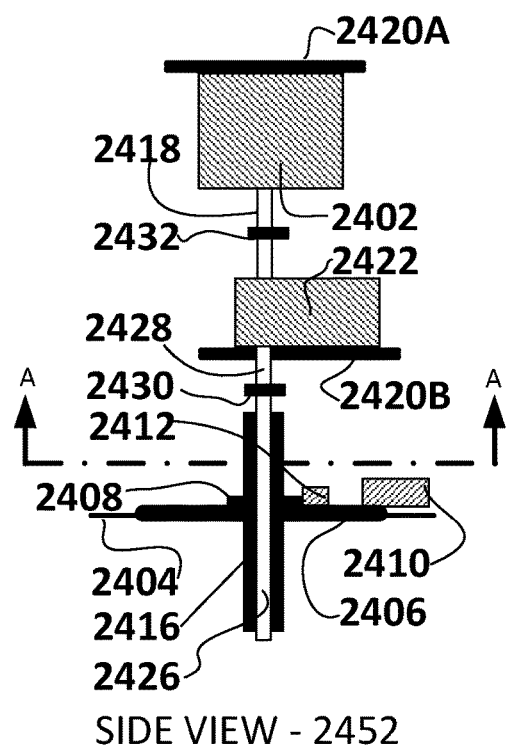
SECTION A-A
TOP VIEW - 2450
SIDE VIEW - 2452
FIG. 25
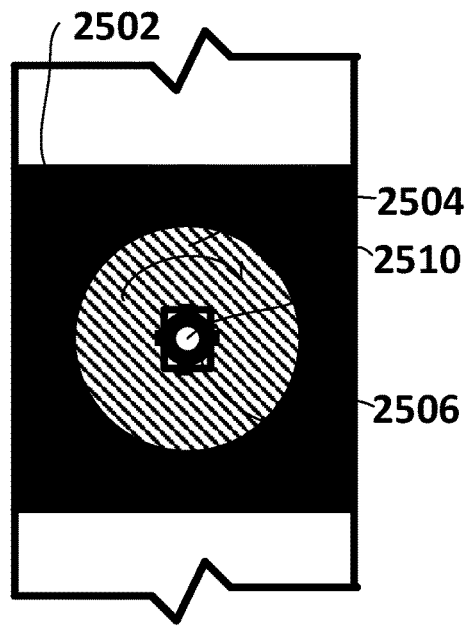
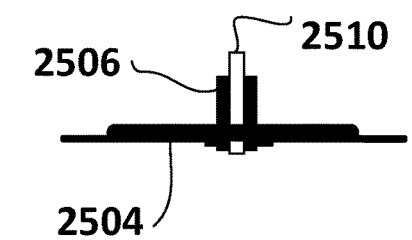
TOP VIEW - 2550
SIDE VIEW - 2552

SECTION A-A
TOP VIEW - 2650

SIDE VIEW - 2750

TOP VIEW - 2850

SIDE VIEW - 2950

SIDE VIEW - 3050

SIDE VIEW - 3150

FIG. 32
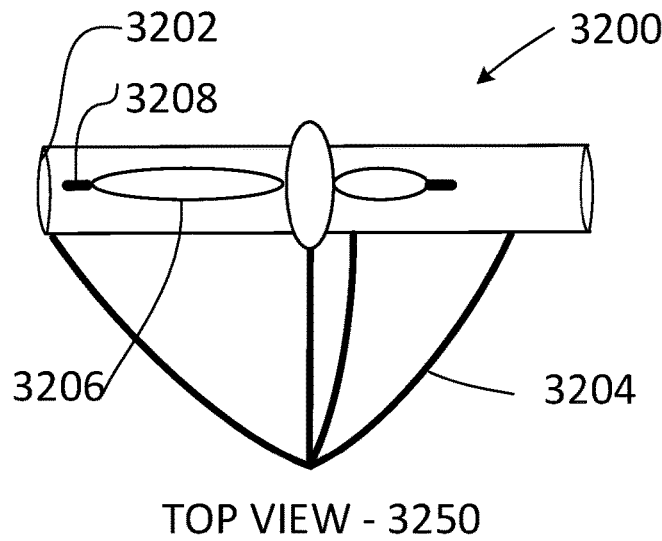
TOP VIEW - 3250
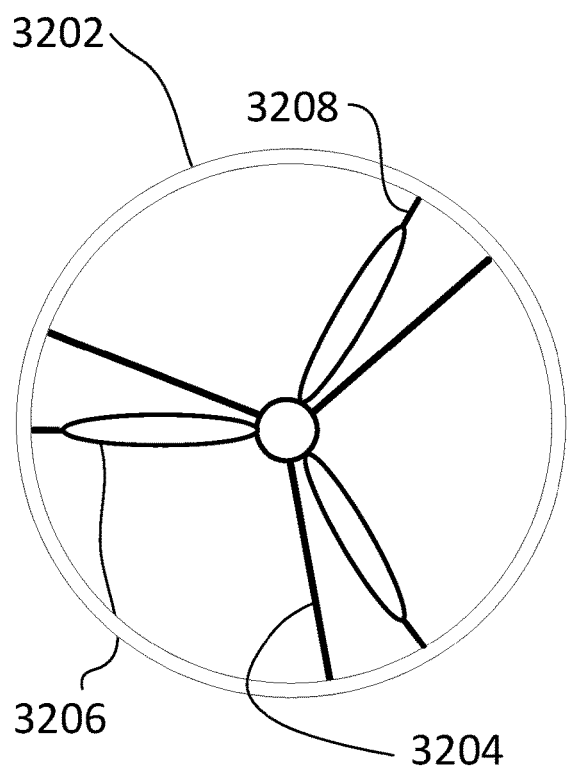
FRONT VIEW - 3252
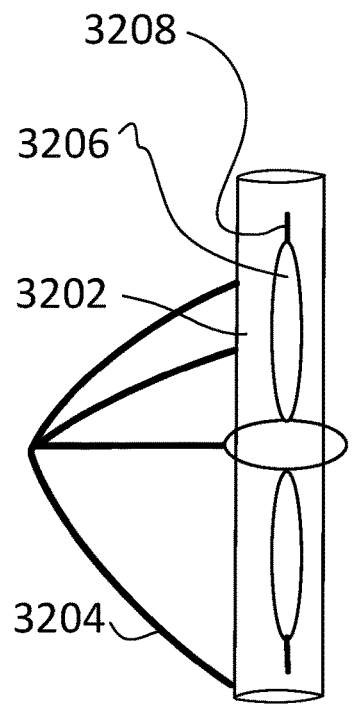
SIDE VIEW - 3254

SIDE VIEW - 3350

FIG. 34
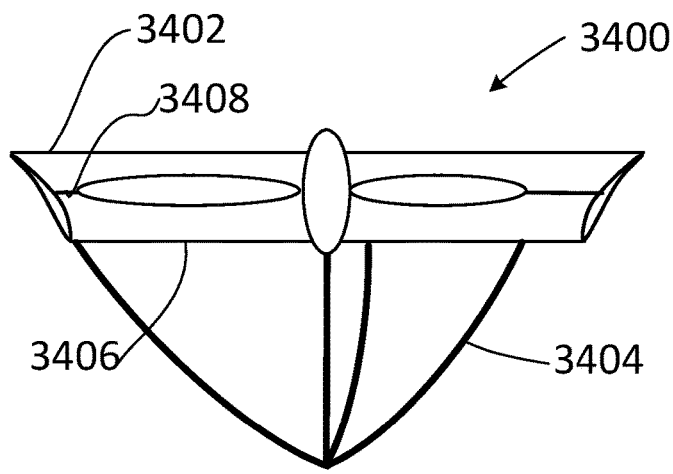
TOP VIEW - 3450
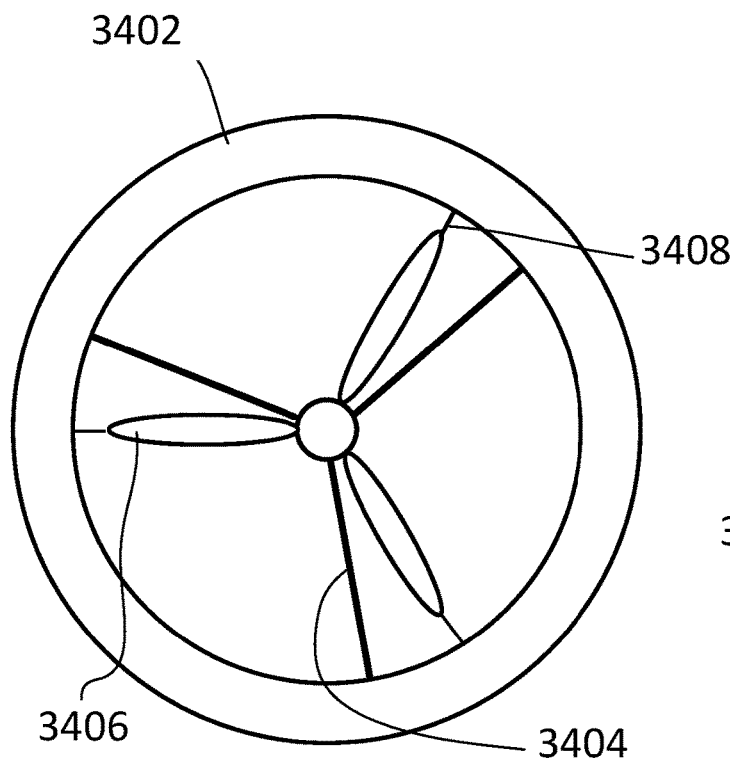
FRONT VIEW - 3452
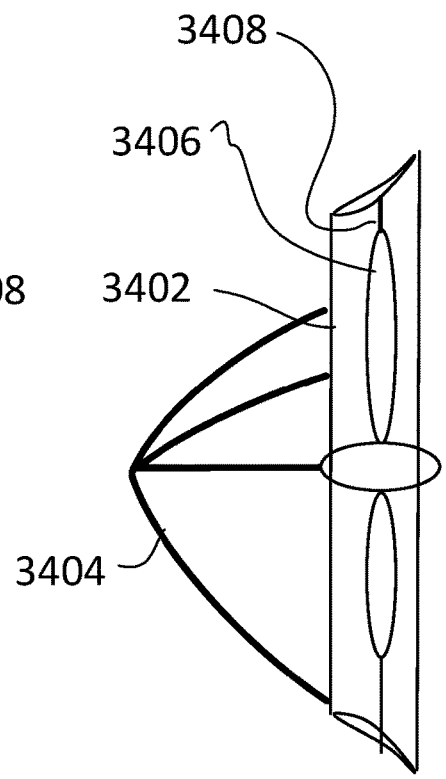
SIDE VIEW - 3454

SIDE VIEW - 3550

FRONT VIEW - 3650

SIDE VIEW - 3652

TOP VIEW - 3850

TOP VIEW - 3950

FIG. 40
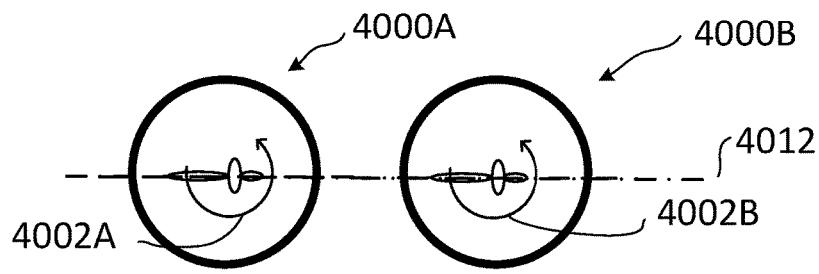
TOP VIEW - 4010
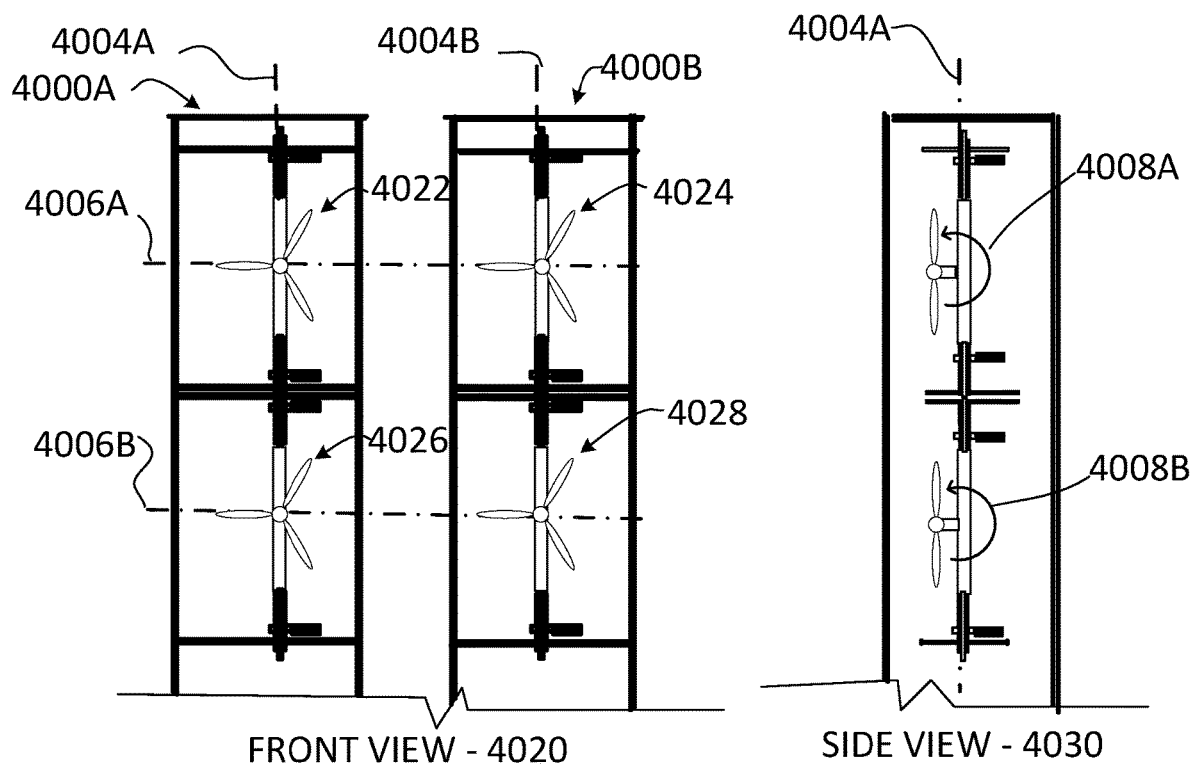
FRONT VIEW - 4020
SIDE VIEW - 4030

FIG. 41
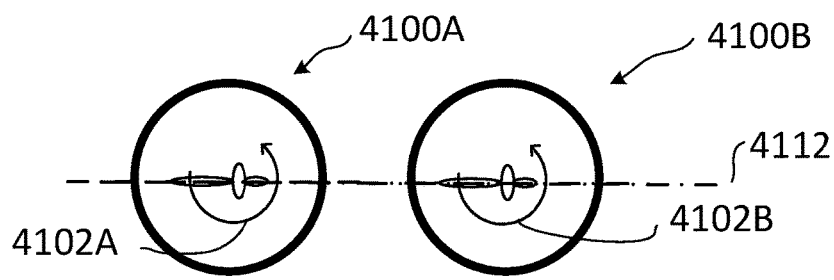
TOP VIEW - 4110
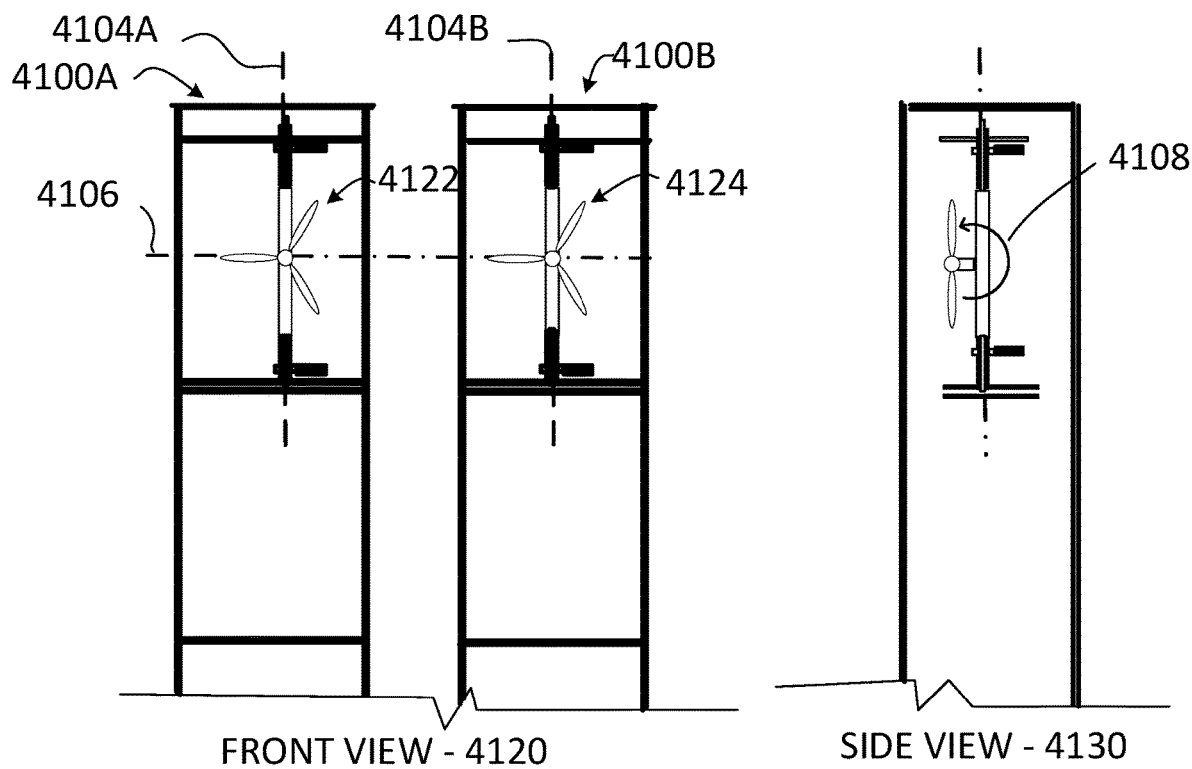
FRONT VIEW - 4120            SIDE VIEW - 4130

FIG. 45
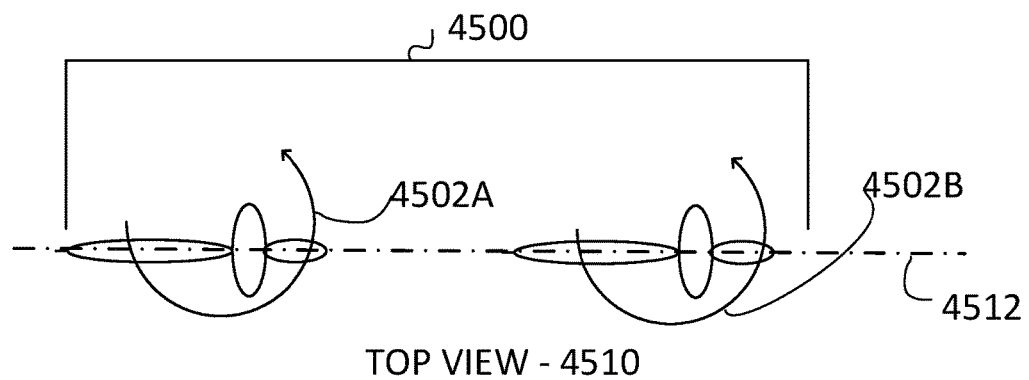
TOP VIEW - 4510
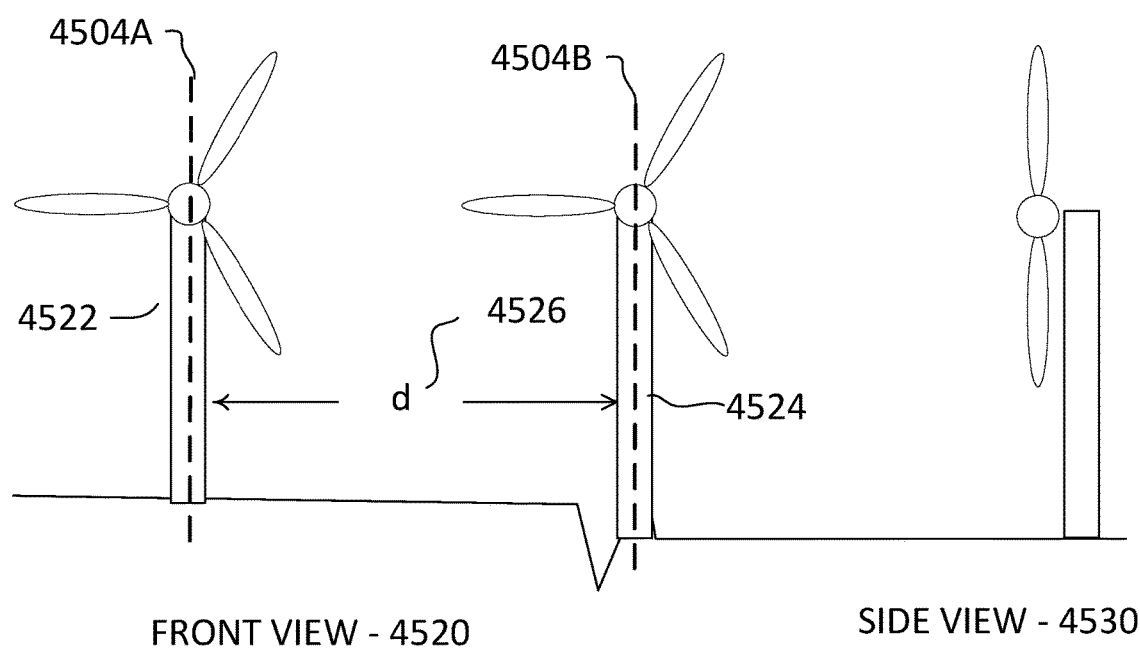
FRONT VIEW - 4520
SIDE VIEW - 4530

WIND TURBINE FARM

BACKGROUND

The amount of energy that can be extracted from the wind is directly proportional to the surface area of the rotor. To increase the amount of energy that can be generated and to take advantage of economies of scale, wind turbine blades have become longer. But wind turbines have become so large, they are reaching the limit of what is practical.

FIG. 1 is a prior art illustrative representation of a conventional wind turbine 100. As illustrated, conventional wind turbine 100 includes blades 102, nacelle 104, hub 108, and monopole tower 106. Typically, the elevating structure for conventional wind turbines is a monopole tower. To generate more power in a conventional wind turbine, the blades must be made longer and longer. Currently the largest conventional wind turbine undergoing prototype testing and soon to be offered is 12 Megawatts with blades 107 meters in length with a hub-nacelle height of around 250 meters. This requires a very strong and costly monopole tower. These very long or heavy components are costly and difficult to transport and to assemble. The large diameters of the area swept by these very large conventional wind turbines create a very large wake downwind which requires large distances between conventional wind turbines in a conventional wind farm, thereby reducing the total wind energy that can be extracted from a fixed surface area. Furthermore, conventional wind turbines are subject to damage and curtailments from flying animal deaths, lightning, and icing weather conditions. Conventional wind turbines are also subject to shutdowns at high wind speeds. FIG. 1 further illustrates how a conventional wind turbine responds to a change in wind direction. As illustrated, in response to wind direction 112A, nacelle 104 and hub 108 rotate (110A) about monopole tower 106 so that blades 102 are perpendicular to wind direction 112A. Furthermore, for wind direction 112B, nacelle 104 and hub 108 rotate (110B) about monopole tower 106 so that blades 102 are perpendicular to wind direction 112B.

FIG. 2 is a prior art illustrative representation of a conventional wind turbine array 200. As illustrated, conventional wind turbine array is a 2×2 matrix having four wind turbines 202A, 202B, 202C, and 202D. The wind turbines are supported on monopole tower 204 by support structure 206. Importantly, adjacent turbines 202A and 202B are fixedly aligned along axis 210. The nacelle 212 is fixed on the support structure 206 and does not rotate relative to the support structure 206 but turns to capture the wind with the support structure 206 as the support structure 206 rotates relative to the monopole tower 204. The nacelle supports the hub 208 which rotates relative to the nacelle 212 to support the blades 214 and allow them to rotate with the wind. Because of this alignment, adjacent turbines are oriented to a particular wind direction equally as seen for FIGS. 3 to 5 below.

FIG. 3 is a prior art illustrative representation of a conventional wind turbine array 300. As illustrated, wind turbines 308A and 308B are aligned along axis 304 and oriented to wind direction 306. Correct orientation is achieved by rotating wind turbine array 300 as illustrated by line 302. FIG. 4 is a prior art illustrative representation of a conventional wind turbine array 400. As illustrated, wind turbines 408A and 408B are aligned along axis 404 and oriented to wind direction 406. Correct orientation is achieved by rotating wind turbine array 400 as illustrated by line 402. FIG. 5 is a prior art illustrative representation of a conventional wind turbine array 500. As illustrated, wind turbines 508A and 508B are aligned along axis 504 and oriented to wind direction 506. Correct orientation is achieved by rotating wind turbine array 500 as illustrated by line 502. FIG. 6 is a prior art illustrative representation of a conventional wind turbine 600 with nacelle 601 that supports blades 607 and hub 606. Nacelle 601 supports and encloses support bearing 605, high-ratio gearbox 603 and generator 604. Other heavy components, not shown, are also sometimes enclosed in the nacelle. Monopole tower 602 supports nacelle 601 and allows the nacelle 601 to rotate to adjust to changes in wind direction.

As such wind turbine farms are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, wind turbine farms are presented including: a number of steerable wind turbines each having a turbine diameter, where the number of steerable wind turbines is grouped pairwise into a number of monopole wind tower pairs, where each monopole wind tower pair is placed in a fixed pair placement and oriented in one of a number of fixed pair orientations, where each one of the number of fixed pair orientations corresponds with one of a number of prevailing wind directions, and where the number of monopole wind tower pairs is placed in a number of fixed pair positions. In some embodiments, each steerable wind turbine in a monopole wind tower pair includes an azimuthal rotational axis, and where an azimuthal rotational axes separated by no less than 1.05 times the turbine diameter and by no more than 4.00 times the turbine diameter. In some embodiments, the number of fixed pair positions includes: a first fixed pair position oriented along a first axis; and a second fixed pair position oriented along a second axis and parallel with the first axis, where each of the pairs of the second fixed pair position are rotated 180 degrees with respect to the pairs in the first fixed pair position. In some embodiments, each fixed pair orientation is oriented within approximately 15 degrees to the corresponding prevailing wind direction. In some embodiments, each of the number of steerable wind turbines is horizontally steerable.

In other embodiments, methods for configuring wind turbine farms defined by an area are presented including: creating a rose graph of the area, the rose graph graphically illustrating a number of wind characteristics of the area; analyzing the rose graph to determine a number of prevailing wind directions; placing a number of sets in a number of fixed set positions, where each of the number of sets includes: a number of monopole wind tower pairs each placed in a fixed pair placement and oriented in one of a number of fixed pair orientations, where each one of the number of fixed pair orientations corresponds with one of the number of prevailing wind directions, where each of the number of monopole wind tower pairs is each positioned no closer than approximately six turbine diameters and no further than approximately fifteen turbine diameters from each another, and where each of the number of monopole wind tower pairs includes: a pair of steerable wind turbines each having a turbine diameter. In some embodiments, the analyzing the rose graph includes: determining a first prevailing wind direction based on a first highest wind direction and speed probability distribution; determining a second prevailing wind direction based on a second highest wind direction and speed probability distribution, where the second highest wind direction and speed probability distribution is equal to or lower than the first highest wind direction and speed probability distribution; and determining a third prevailing wind direction based on a third highest wind direction and speed probability distribution, where the third highest wind direction and speed probability distribution is equal to or lower than the second highest wind direction and speed probability distribution. In some embodiments, methods further include: determining at least one additional prevailing wind based on at least one additional highest wind direction and speed probability distribution, where the at least one highest wind direction and speed probability distribution is equal to or lower than the third highest wind direction and speed probability distribution. In some embodiments, the analyzing the rose graph includes: determining at least one prevailing wind based on at least one highest wind direction and speed probability distribution. In some embodiments, the wind characteristics are selected from the group consisting of: a wind direction, a wind speed, and a wind duration. In some embodiments, the number of fixed set positions includes: a first fixed pair position oriented along a first axis, where a second fixed pair position oriented along a second axis and parallel with the first axis, and where each of the sets of the second fixed pair position are rotated 180 degrees with respect to the sets in the first fixed pair position.

In other embodiments, methods for operating wind turbine farms are presented including: steering a current turbine, where the current turbine is one of a number of steerable wind turbines each having a turbine diameter, where the number of steerable wind turbines is grouped pairwise into a number of monopole wind tower pairs, where each monopole wind tower pair is placed in a fixed pair placement and oriented in one of a number of fixed pair orientations, where each one of the number of fixed pair orientations corresponds with one of a number of prevailing wind directions, and where the number of monopole wind tower pairs is separated into a number of pairs placed in a number of fixed pair positions; determining a turbine control mode based on presence of one or more downwind turbines; and tuning the current turbine based on the turbine control mode. In some embodiments, the steering includes: determining a wind direction for the current turbine; setting an azimuth angle and veer for the current turbine; and determining an idle status of the current turbine. In some embodiments, the determining the turbine control mode includes: if the idle status of the current turbine is idle, setting the turbine control mode of the current turbine to an upwind interference mode; and setting a current turbine target output based on properties of the wind direction. In some embodiments, the determining the turbine control mode includes: if the idle status of the current turbine is not idle, determining whether the one or more downwind turbines is in a same pair as the current turbine; if the one or more downwind turbines is in the same pair, setting the status of the one or more downwind turbines to idle; reading the current wind speed; determining whether the one or more downwind turbines is located within a range of less than approximately 15 turbine diameters; if the one or more downwind turbines is within a range of less than 15 turbine diameters, setting the turbine control mode of the current turbine to a downwind interference mode and adding a downwind turbine output to a current turbine output; and if the one or more downwind turbines is within a range of more than 15 turbine diameters, setting the turbine control mode of the current turbine to a non-interference mode.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a prior art illustrative representation of a conventional wind turbine;

FIG. 7 is an illustrative representation of a wind farm turbine module in accordance with embodiments of the present invention;

FIG. 9 is an illustrative top view representation of a turbine steering corresponding with different wind directions in accordance with embodiments of the present invention;

FIG. 10 is an illustrative representation of a wind rose diagram in accordance with embodiments of the present invention;

FIG. 11 is an illustrative representation of an initial configuration of a wind farm set in accordance with embodiments of the present invention;

FIG. 22 is an illustrative representation of a non-ducted wind turbine in accordance with embodiments of the present invention;

FIG. 24 is an illustrative representation of drive elements in accordance with embodiments of the present invention;

FIG. 25 is an illustrative representation of drive elements in accordance with embodiments of the present invention;

FIG. 32 is an illustrative representation of a non-lift-ducted wind turbine in accordance with embodiments of the present invention;

FIG. 34 is an illustrative representation of a duct assisted wind turbine in accordance with embodiments of the present invention;

FIG. 40 is an illustrative representation of a 2×2 wind farm turbine configuration in accordance with embodiments of the present invention;

FIG. 41 is an illustrative representation of a 1×2 wind farm turbine configuration in accordance with embodiments of the present invention;

FIG. 45 is an illustrative representation of a monopole wind tower pair in accordance with embodiments of the present invention;

DETAILED DESCRIPTION

Figure 2:
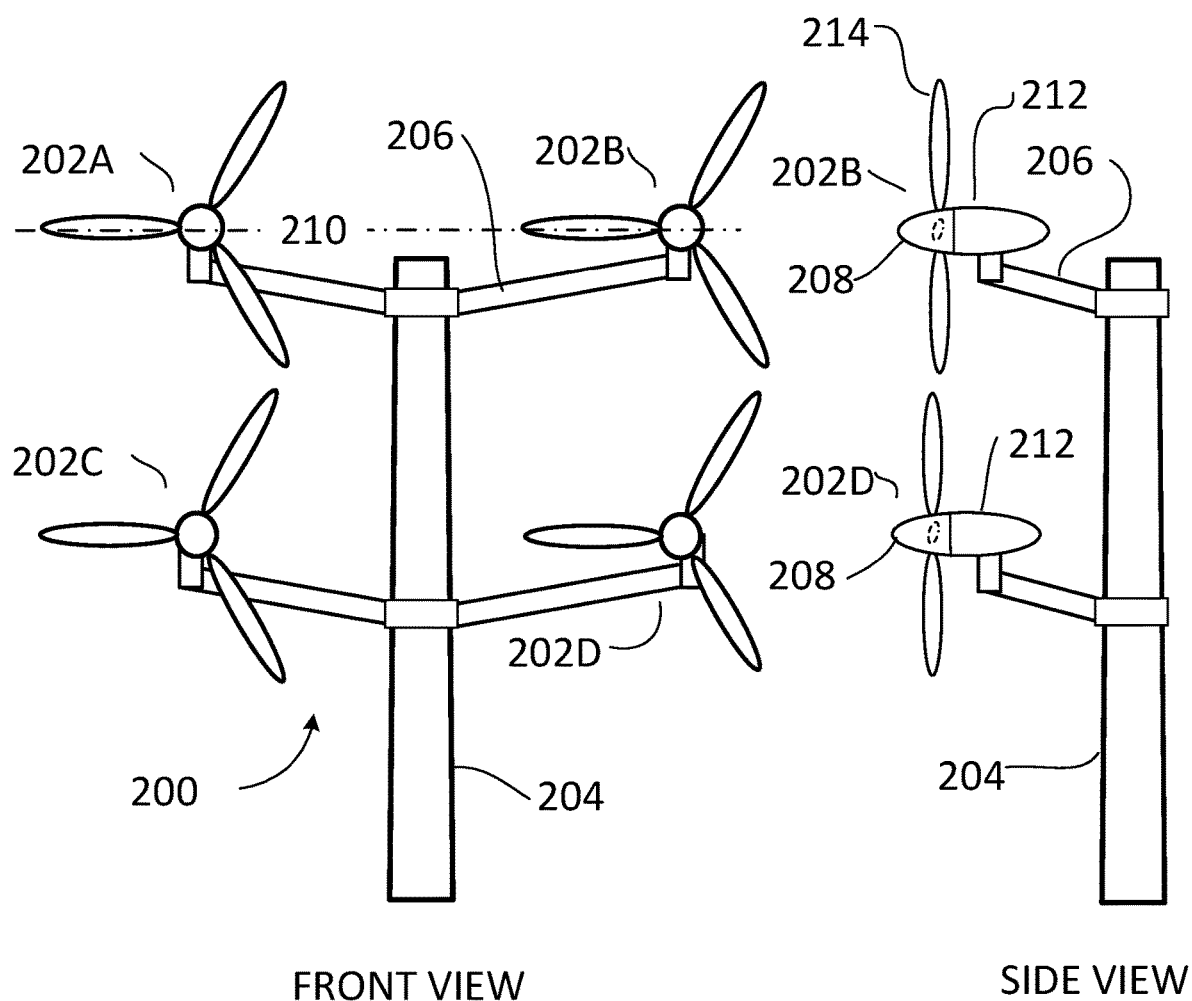
FIG. 2 is a prior art illustrative representation of a conventional wind turbine array.
Figure 3:
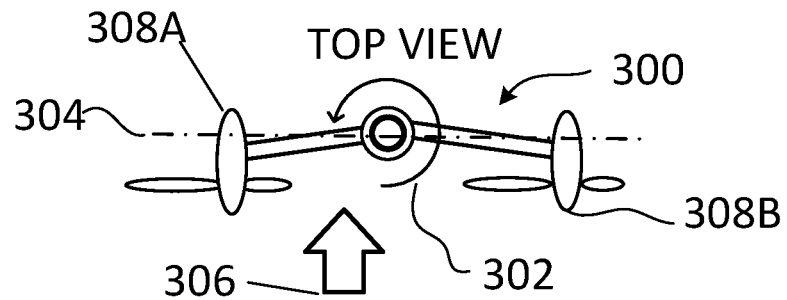
FIG. 3 is a prior art illustrative representation of a conventional wind turbine array.
Figure 4:
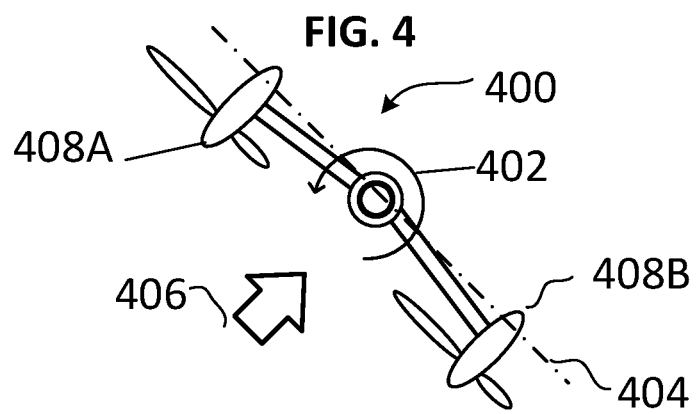
FIG. 4 is a prior art illustrative representation of a conventional wind turbine array.
Figure 5:
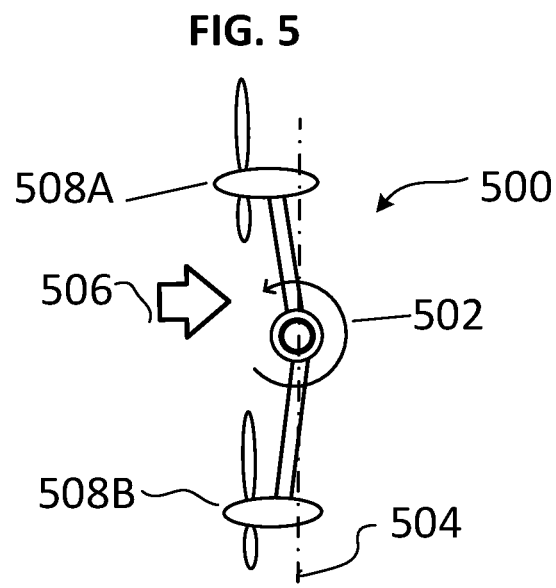
FIG. 5 is a prior art illustrative representation of a conventional wind turbine array.
Figure 6:
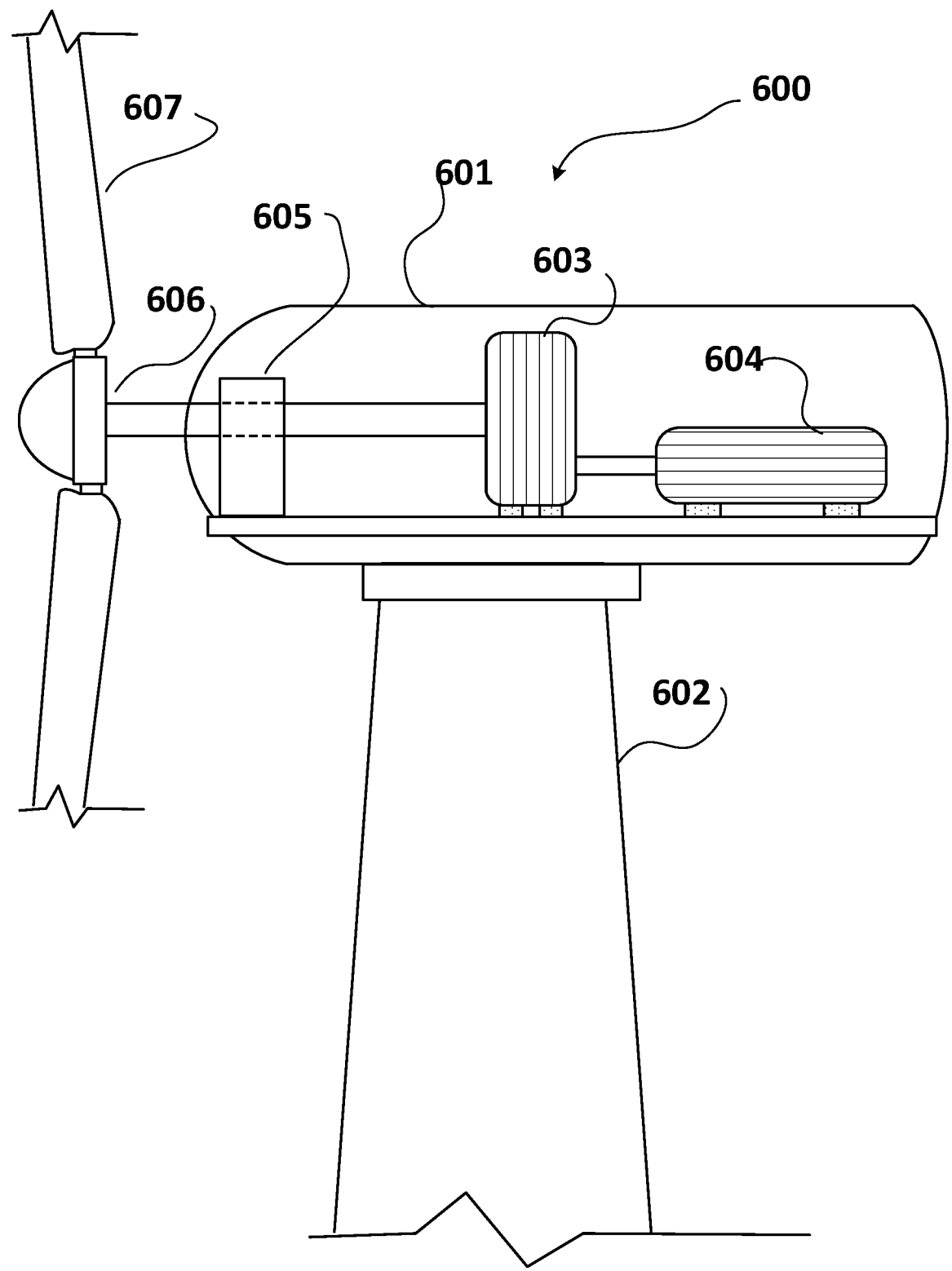
FIG. 6 is a prior art illustrative representation of a conventional wind turbine.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Terminology

Matrix: As utilized herein, the term matrix refers to the number of wind turbines and their configuration. For example, a 2×2 matrix of turbines is two turbines along the width and two turbines along the height of a module. Any number of matrix configurations may be utilized without limitation in embodiments provided herein.

Module: As utilized herein, the term module refers a group of wind steerable turbines all turning about their own vertical azimuthal axes into the wind. Groupings of turbines are utilized to improve efficiency of smaller turbines and to optimize placement and orientation.

Set: As utilized herein, the set refers to a group of modules. A set is constructed of one module, two modules, three modules (preferred), four, or more modules. Modules in a set are placed relative to each other and relative to the best wind direction. Groupings of modules are utilized to reduce wind interference from adjacent sets and to maximize coverage of modules for a given surface area.

Azimuthal: As utilized herein, the term azimuthal refers to horizontal steering of steerable wind turbines. Horizontal steering is utilized to orient the wind turbine in the compass direction to optimum energy capture from the wind and to orient the wind turbine to reduce wind interference to adjacent and downwind turbines.

Altitudinal: As utilized herein, the term altitudinal refers to vertical steering of steerable wind turbines. Vertical steering or veer is utilized to reduce wind interference to adjacent and downwind turbines.

Optimum wind angle: As utilized herein, the term optimum wind angle refers to the module orientation that is best suited to receive a prevailing wind. The optimum wind angle is perpendicular to the module and is aligned with the prevailing wind to which a module is oriented, plus or minus 15 degrees in most cases, but up to plus or minus 25 degrees if necessary, to improve total efficiency of the set.

Turbine useable wind range: As utilized herein, the term turbine useable wind range is the range between the two largest wind angles for which the wakes of the upwind turbine do not enter the rotors of adjacent downwind turbines in a module.

Embodiments provided herein apply multiple smaller wind turbine rotors to replace a single large wind turbine rotor. Steerable wind turbine embodiments are configured to rotate about their individual vertical and horizontal axes so the planes of the rotors remain approximately parallel, but not always on the same plane. Unfortunately, this configuration creates wake interference to some wind turbine rotors closely and directly downwind of other wind turbine rotors for some wind directions. To overcome the wake interference, one embodiment utilizes two turbines side by side and two turbines high in a module in a 2×2 matrix. This configuration limits the number of closely spaced turbines in the same module that can be directly in line causing wake interference although more than two turbine rotors side by side and higher than two turbines may be desirable in some embodiments.

In addition, in embodiments, modules are grouped in sets. In an embodiment, three modules are included in a set although more or fewer modules may be desirable in some conditions. In embodiments, three modules are likely an optimum number for most applications. A three-module set allows 12 turbines to replace a single large conventional wind turbine. This configuration also allows the modules to be physically located to minimize wake interference from the other modules in a set. Twelve rotors allow the multiple turbines to be only 29% of the diameter of the single large rotor the set replaces. Furthermore, the modules in a set are placed with respect to each other and to the primary wind directions at a wind farm location such that only one module at a time has its own wind turbine rotors directly inline, creating wake interference.

Still further, when two turbines in the same module are oriented into the wind such that one is directly behind the other, control embodiments adjust the blade pitch to significantly reduce the energy production from the downwind turbine, thereby reducing the turbulence stress on the downwind turbine and allowing the upwind turbine to produce at near capacity. Other control methods may also be applied without limitation to maximize energy output or to reduce stress on the turbines. This reduces the number of rotors not producing full power to two in a 2×2 matrix. Still further, many sets are installed to create a wind farm in embodiments. Sets are arranged to minimize wake interference among sets and modules.

Embodiments provided present different combinations and configurations including:

Two turbines arranged side-by-side (preferred), or more than two side-by-side;

Two turbines or three turbines high, four turbines high, or more than four turbines high installed as a module;

Non-monopole structure (preferred), or monopole structure;

Open rotor, Neutral Non-lift Duct, or duct with aerodynamic lift to augment energy extraction;

Mechanical elements located in duct instead of hub to replace the gearbox, ninety-degree angle gears in hub to move gearbox to structure, or gearbox in hub;

Pitch control (preferred), or no pitch control;

Hub front support element, or no hub front support element;

Vertical rotor plane adjustment (altitudinal) for wake steering, or no vertical rotor plane adjustment;

Roof with solar, roof with no solar, or no roof;

Guard elements, or no guard elements; and

A second circumferential ring or duct, with or without aerodynamic lift.

FIG. 7 is an illustrative representation of a wind farm turbine module in accordance with embodiments of the present invention. In particular, FIG. 7 illustrates top view 710, front view 720, and side view 730 of module 700. As illustrated, module includes four turbines 722, 724, 726, and 728 in a 2×2 matrix installed in a support structure 740. In embodiments, modules may include any number of turbines in any configuration of matrices without departing from embodiments provided herein. For example, one skilled in the art will readily recognize that: one module may include two turbines configured in a 2×1 matrix; another module may include six turbines configured in a 2×3 matrix; yet another module may include eight turbines configured in a 2×4 matrix; and so on. In this manner, modules may be selected to optimize power generation for a given location.

In embodiments, each of the turbines is independently steerable. As illustrated, turbines are steerable about axes 704A and 704B as illustrated by azimuthal steering 702A and 702B. In addition, turbines are steerable about axes 706A and 706B as illustrated by altitudinal steering 708A and 708B. Further illustrated is fixed module orientation axis 712 which corresponds with an initial configuration of a wind farm in embodiments. Configuration of windfarms will be discussed in further detail below for FIGS. 11-13. Still further illustrated are turbine blades 722. As illustrated, each turbine includes three turbine blades. However, in embodiments, turbines may include two or more turbine blades without limitation as may be appreciated by one skilled in the art.

Figure 8:
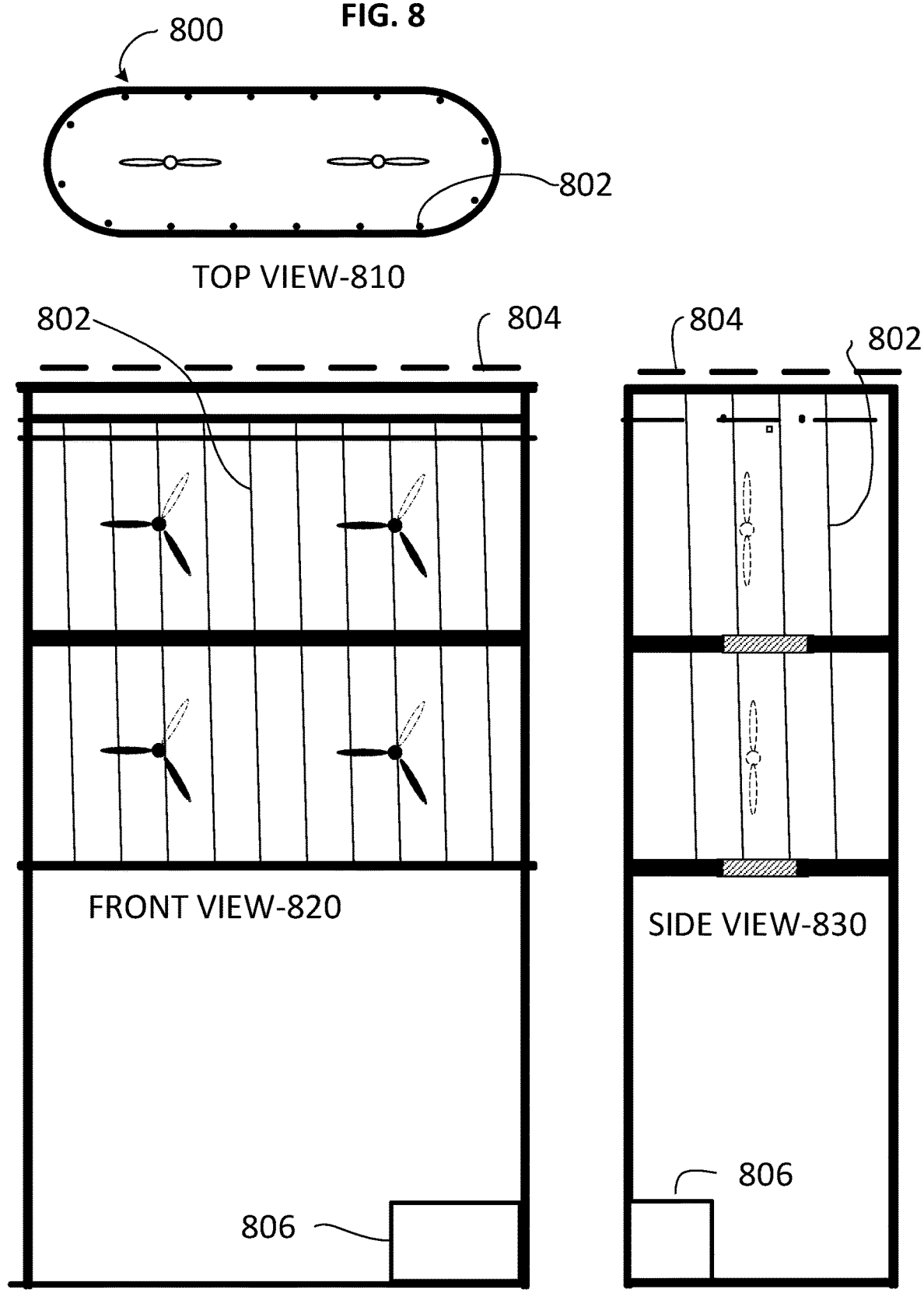
FIG. 8 is an illustrative representation of a wind farm turbine module in accordance with embodiments of the present invention.

FIG. 8 is an illustrative representation of a wind farm turbine module in accordance with embodiments of the present invention. In particular, FIG. 8 illustrates top view 810, front view 820, and side view 830 of module 800. Further, FIG. 8 illustrates various components suitable for use with wind farm turbine module embodiments. As illustrated, module 800 includes guards 802 for restricting flying animals and debris from interfering with the turbines. Guards may include bars or mesh without limitation. Further illustrated are solar collection devices 804 that may increase power production or supply power to control elements. Still further illustrated is electrical components 806 at grade. However, electrical components may be located anywhere in or along the module without limitation.

FIG. 9 is an illustrative top view representation of a turbine steering corresponding with different wind directions in accordance with embodiments of the present invention. As illustrated for wind direction 910A, module 900 includes fixed module orientation axis 920. As may be seen, fixed module orientation axis 920 remains constant for module 900 regardless of wind direction. For wind direction 910A, turbines are azimuthally steered 902A to axis 904A to align the turbines with the wind direction. Likewise, for wind direction 910B, turbines are azimuthally steered 902B to axis 904B to align the turbines with the wind direction. Likewise, for wind direction 910C, turbines are azimuthally steered 902C to axis 904C to align the turbines with the wind direction. Likewise, for wind direction 910D, turbines are azimuthally steered 902D to axis 904D to align the turbines with the wind direction. It may be noted that only when wind direction 910A is perpendicular with fixed module orientation axis 920 are the turbines oriented along the same plane. In all other wind directions, the turbines are not oriented in the same plane but are oriented with their planes approximately parallel. This configuration combined with steering and tuning provide for more efficient wind utilization.

FIG. 10 is an illustrative representation of a wind rose diagram in accordance with embodiments of the present invention. As known in the art, a wind rose is a graphic tool used by meteorologists to give a succinct view of how wind speed and direction are typically distributed at a particular location. Using a polar coordinate system of gridding, the frequency of winds over a time period is plotted by wind direction, with color bands showing wind speed ranges. The direction of the longest spoke shows the wind direction with the greatest frequency. As illustrated and based on the wind rose 1000, three prevailing wind directions 1002, 1004, and 1006 are illustrated. In some embodiments, one of the three prevailing wind directions is the primary prevailing wind direction or the wind direction having the highest wind potential. The wind rose illustrated is presented for clarity in presenting and understanding embodiments disclosed herein. The data represented by the wind rose in this illustration does not represent actual data and provided to illustrated how wind farm embodiments are configured and operated.

FIG. 11 is an illustrative top view representation of an initial configuration of a wind farm set in accordance with embodiments of the present invention. In particular, FIG. 11 illustrates a set of three modules in a fixed orientation corresponding with a rose graph (see FIG. 10). As illustrated, set 1100 includes three modules 1110 (M1), 1120 (M2), and 1130 (M3). For convenience, sets may be designated S1, S2, S3, etc. In addition, modules may be designated M1, M2, M3. Still further steerable wind turbines may be designated T1, T2, T3, etc. Thus, in a large wind farm configuration, a particular steerable wind turbine may be found according to the designation S3.M2.T4 which is the fourth steerable wind turbine in the second module of the third set. This naming convention will be utilized throughout the disclosure. As illustrated, the three modules are positioned equidistant from each other and spaced approximately ten turbine diameters apart in a fixed module placement. In embodiments, modules are placed no closer than approximately six turbine diameters apart and no further than approximately fifteen turbine diameters apart in a fixed module placement. As utilized herein, a turbine diameter, is the diameter of a circle defined by the steerable wind turbine blade rotation. In embodiments, a steerable wind turbine has a turbine diameter in a range of approximately 50 to 100 meters. In embodiments, where a set includes three modules, the modules are placed 120° apart in a fixed module placement. In embodiments, where a set includes four modules, the modules are placed 90° apart in a fixed module placement.

In the embodiments illustrated, each module has a fixed orientation corresponding with one prevailing wind direction and the module orientation axis 1118 as determined by a rose graph. Referring briefly to FIG. 10, rose graph 1000 includes three prevailing wind directions 1002, 1004, and 1006. Returning to FIG. 11, it may be seen that module M1 1110 has a fixed module orientation 106° from prevailing wind direction 1002 and 106° from the set orientation axis 1118, which, in this case, is parallel with wind direction 1002; module M2 1120 has a fixed module orientation 96° from prevailing wind direction 1004 and 1150 from the set orientation axis 1118; and module M3 1130 has a fixed module orientation 69° from prevailing wind direction 1006 and 1340 from the set orientation axis 1118. In embodiments, each module orientation is adjusted to approximately 90° plus or minus 15 degrees from its corresponding prevailing wind directions positioned within the plus or minus 15 degrees such that the remaining prevailing wind directions fall within the turbine useable wind range as much as possible. In this manner, each module in a set is oriented to one corresponding prevailing wind direction with the best compromise for the remaining prevailing wind directions. In addition, for a particular prevailing wind direction, the wind steerable turbines in the same module corresponding with that particular prevailing wind direction are in approximately parallel planes and, as such, are optimally oriented for that particular prevailing wind direction. In embodiments, as utilized and illustrated herein, optimum wind angle 1140 is 90 degrees with respect to module orientation 1148 and thereby defines the optimum wind direction 1144. As such, the optimum wind angle is perpendicular to module 1146 and the module orientation 1148. In embodiments, turbine modules are oriented to within 15 degrees of the optimum wind angle. In some embodiments, turbine modules are oriented to within 25 degrees of the optimum wind direction. In addition, the turbine useable wind range 1142 is the range between the two largest wind angles for which the wakes of the upwind turbine do not enter the rotors of adjacent downwind turbines in a module.

Figure 12:
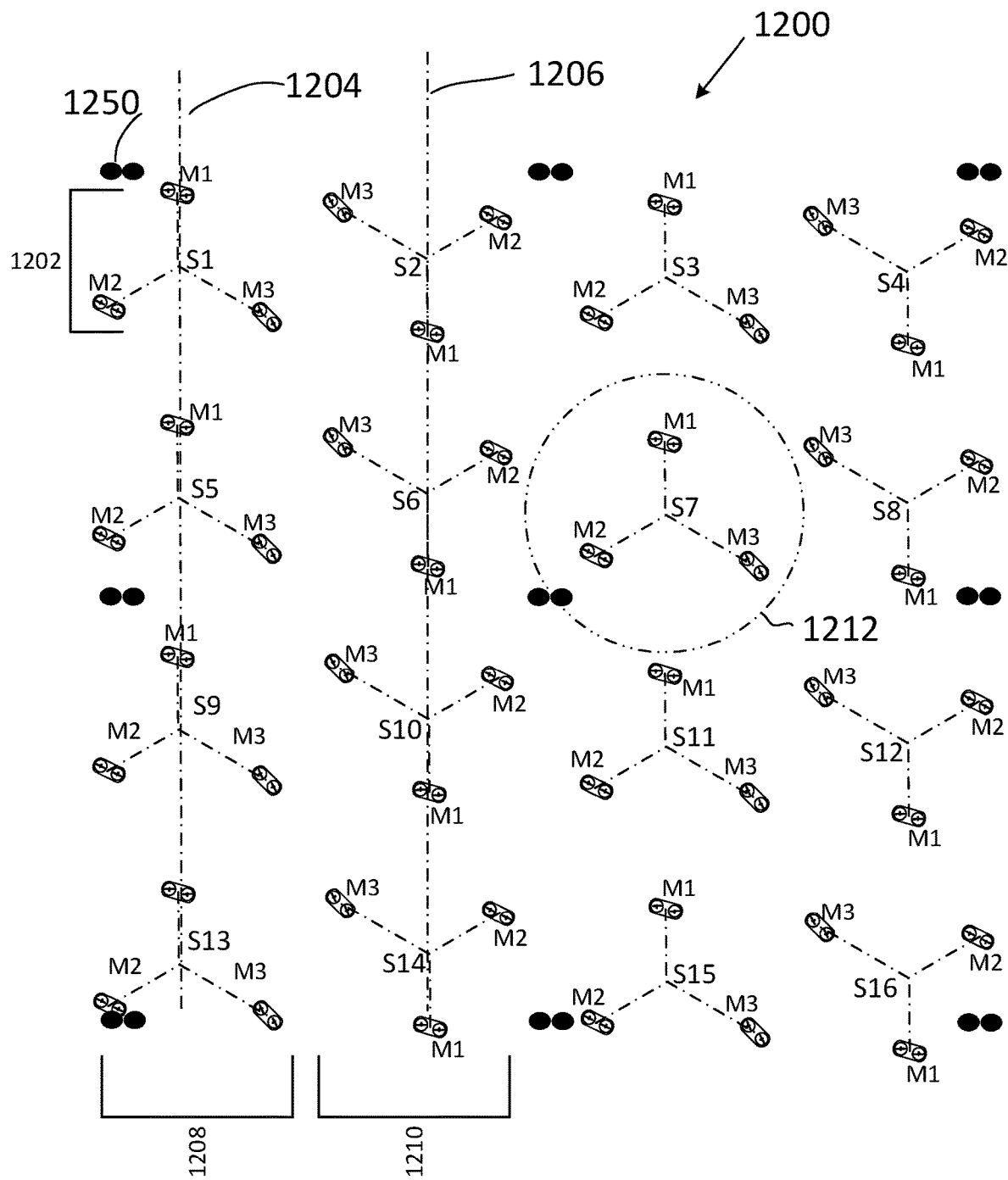
FIG. 12 is an illustrative representation of a wind farm in accordance with embodiments of the present invention.

FIG. 12 is an illustrative representation of a wind farm 1200 in accordance with embodiments of the present invention. In addition, FIG. 12 includes placement of conventional single turbines 1250 imposed over wind farm 1200 embodiment. In this manner, the increased density of turbine sets in embodiments is demonstrated over conventional configurations and demonstrates more energy generation per unit area on the earth surface for embodiments disclosed herein. As illustrated, windfarm includes a number of sets 1202 each located in a fixed set position. Groups of sets are aligned along axes such as 1204 and 1206 which, in embodiments, are parallel. Group 1208, for example, is aligned along axis 1204. In addition, as illustrated, group 1210 is aligned along axis 1206. Importantly, each set of group 1210 is rotated 180° with respect to the modules in group 1208. This pattern allows for maintaining a distance in a range of approximately six to fifteen turbine diameters between modules of different sets. As noted above, a turbine diameter, is the diameter of a circle defined by the steerable wind turbine blade rotation. Maintaining the distance between modules of different sets reduces potential wake interference from upwind and downwind turbines.

Figure 13:
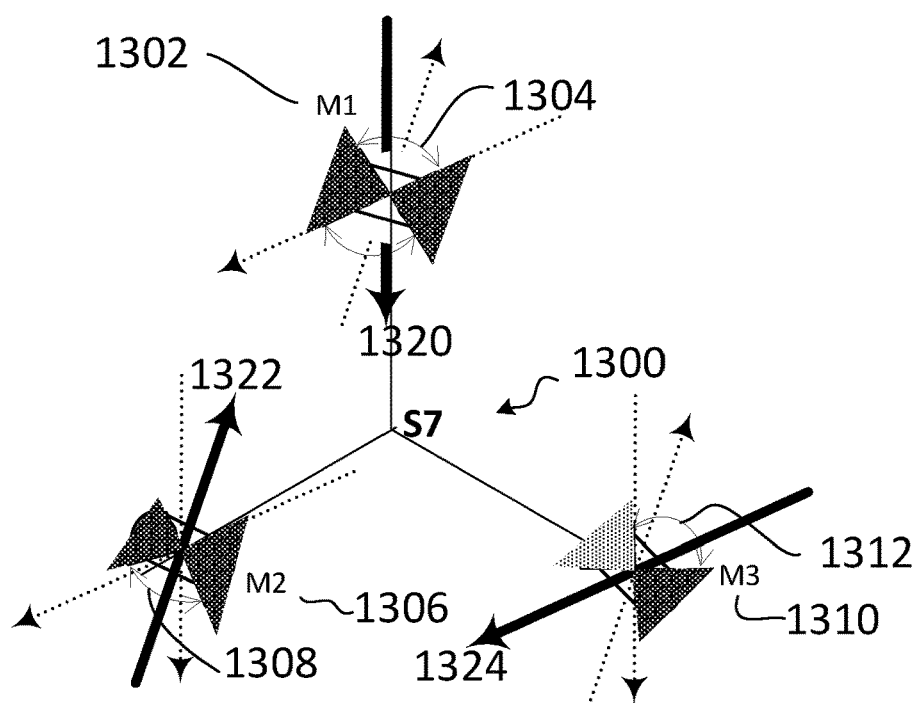
FIG. 13 is an illustrative representation of a wind farm set in accordance with embodiments of the present invention.

FIG. 13 is an illustrative representation of a wind farm set 1300 in accordance with embodiments of the present invention. In particular, FIG. 13 is an expanded representation of set 1212 (FIG. 12). As illustrated, set S7 1300 includes modules M1 1302, M2 1306, and M3 1310. As noted previously, modules are set into a fixed orientation based on wind direction. As such, module M1 1302 is placed in a fixed orientation corresponding with prevailing wind direction 1320. An example of prevailing wind directions is provided in FIG. 10. As illustrated, module M1 1302 is placed in a fixed orientation corresponding with prevailing wind direction 1320 within turbine module usable wind range 1304. Likewise, as illustrated, module M2 1306 is placed in a fixed orientation corresponding with prevailing wind direction 1322 within turbine usable wind range 1308. And again, as illustrated, module M3 1310 is placed in a fixed orientation corresponding with prevailing wind direction 1324 within turbine usable wind range 1312. In this manner, each module is oriented to a particular prevailing wind direction plus or minus 15 degrees from the optimum wind angle such that optimum efficiency for the module is maximized for that prevailing wind direction. The remaining prevailing wind directions in a module are oriented to fall within a module's turbine useable wind range (see 1142, FIG. 11) to maximize the efficiency for the remaining prevailing wind directions. As noted above, in embodiments, the module's optimum wind direction aligns with the module's assigned prevailing wind direction within plus or minus 15 degrees based on a compromise with the remaining prevailing wind directions falling within the turbine useable wind range In some cases, it may be necessary to allow plus or minus 25 degrees between the module optimum wind direction and the prevailing wind direction to allow the remaining prevailing wind directions to fall within the turbine useable wind range. In addition, a turbine useable wind range is the range between the two largest wind angles for which the wakes of the upwind turbine do not enter the rotors of adjacent downwind turbines in a module.

Figure 14:
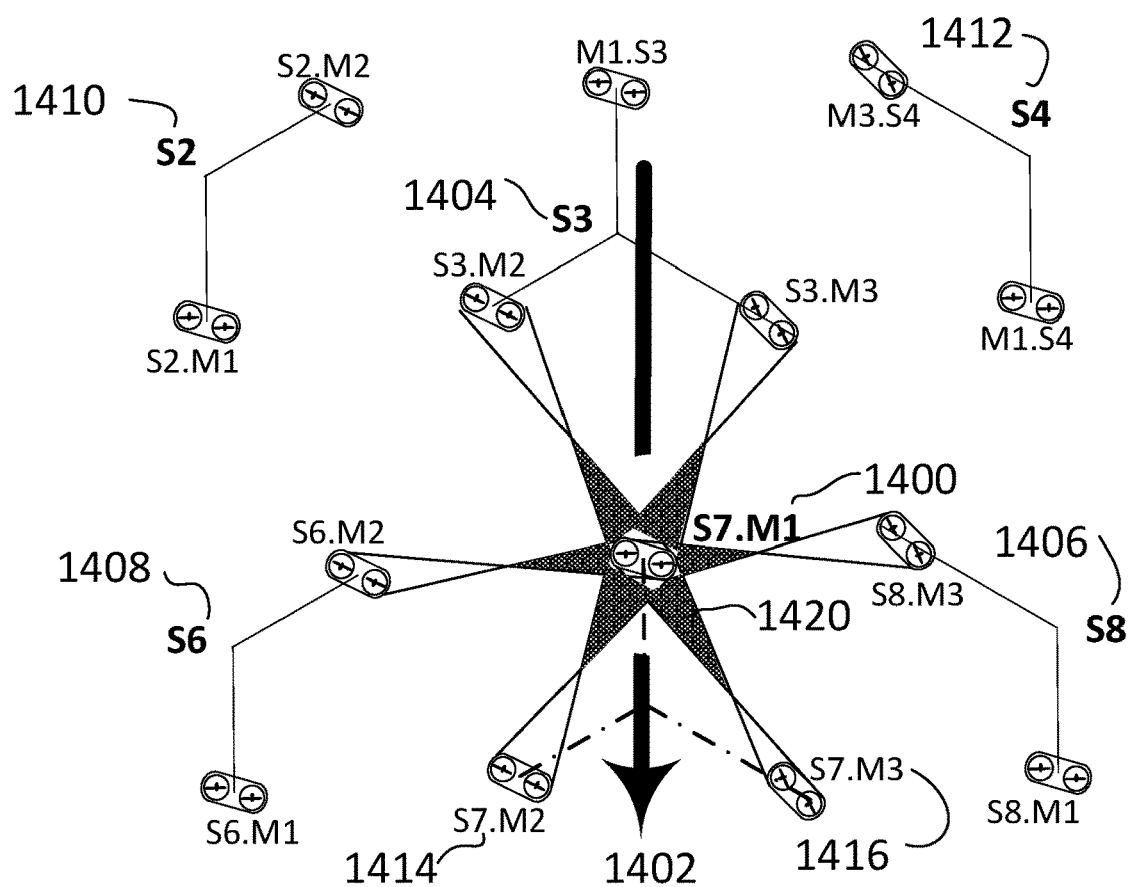
FIG. 14 is an illustrative representation of a module interference pattern in accordance with embodiments of the present invention.

FIG. 14 is an illustrative representation of a module interference pattern in accordance with embodiments of the present invention. In particular, FIG. 14 illustrates interference patterns for module M1 1302 of FIG. 13. As illustrated module S7.M1 1400 is placed in a fixed orientation corresponding with prevailing wind direction 1402. Further illustrated, it may be seen that sets S3 1404, S8 1406, and S6 1408 are adjacent to module S7.M1 1400 and include modules that are affected by interference pattern 1420. In addition, modules S7.M2 1414 and S7.M3 1416 of the same set as S7.M1 1400 are affected by interference pattern 1420. In embodiments, all of the turbines affected by interference patterns of a module are positioned approximately ten turbine diameters or less apart. Turbines farther than approximately ten turbine diameters, such as turbines in sets S4 1412 and S2 1410 illustrated, are not considered in the control system analysis for this module, so those interference patterns are not shown. For layouts of modules and wind farms where spacing is below or above 10 diameters, the selected spacing is used to determine which turbines are considered interfering and which ones are not.

Figure 15:
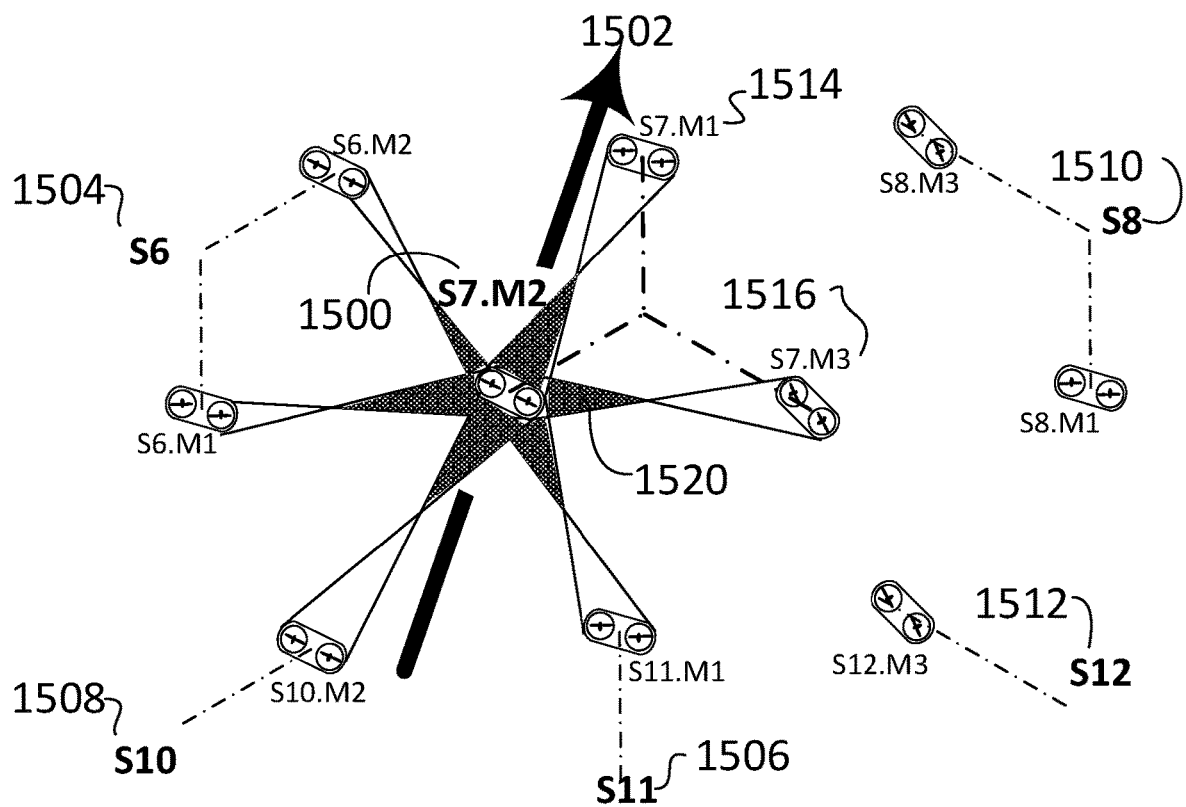
FIG. 15 is an illustrative representation of a module interference pattern in accordance with embodiments of the present invention.

FIG. 15 is an illustrative representation of a module interference pattern in accordance with embodiments of the present invention. In particular, FIG. 15 illustrates interference patterns for module M2 1306 of FIG. 13. As illustrated module S7.M2 1500 is placed in a fixed orientation corresponding with prevailing wind direction 1502. Further illustrated, it may be seen that sets S6 1504, S11 1506, and S10 1508 are adjacent to module S7.M2 1500 and include modules that are affected by interference pattern 1520. In addition, modules S7.M1 1514 and S7.M3 1516 of the same set as S7.M2 1500 are affected by interference pattern 1520. In embodiments, all of the turbines affected by interference patterns of a module are positioned approximately ten turbine diameters or less apart. Turbines farther than ten turbine diameters, such as turbines in sets S12 1512 and S8 1510 illustrated, are not considered in the control system analysis for this module, so those interference patterns are not shown.

Figure 16:
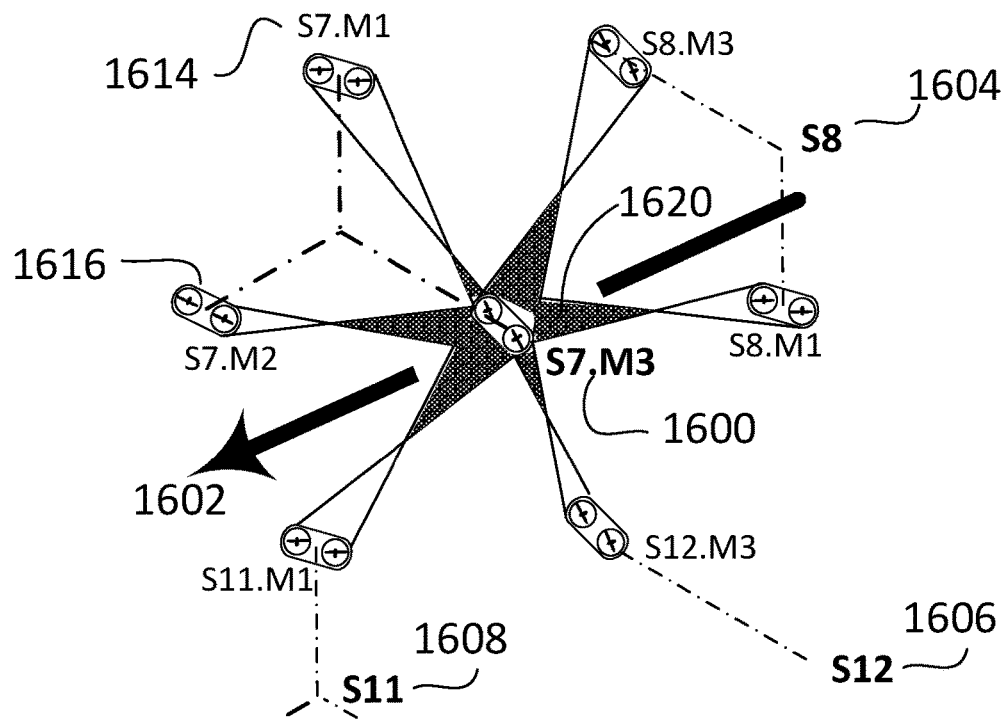
FIG. 16 is an illustrative representation of a module interference pattern in accordance with embodiments of the present invention.

FIG. 16 is an illustrative representation of a module interference pattern in accordance with embodiments of the present invention. In particular, FIG. 16 illustrates interference patterns for module M3 1310 of FIG. 13. As illustrated module S7.M3 1600 is placed in a fixed orientation corresponding with prevailing wind direction 1602. Further illustrated, it may be seen that sets S8 1604, S11 1608, and S12 1606 are adjacent to module S7.M3 1600 and include modules that are affected by interference pattern 1620. In addition, modules S7.M1 1614 and S7.M2 1616 of the same set as S7.M3 1600 are affected by interference pattern 1620. In embodiments, all of the turbines affected by interference patterns of a module are positioned approximately ten turbine diameters or less apart. Turbines farther than approximately ten turbine diameters are not considered in the control system analysis for this module, so those interference patterns are not shown.

Methods for Configuring a Wind Farm

Figure 17:
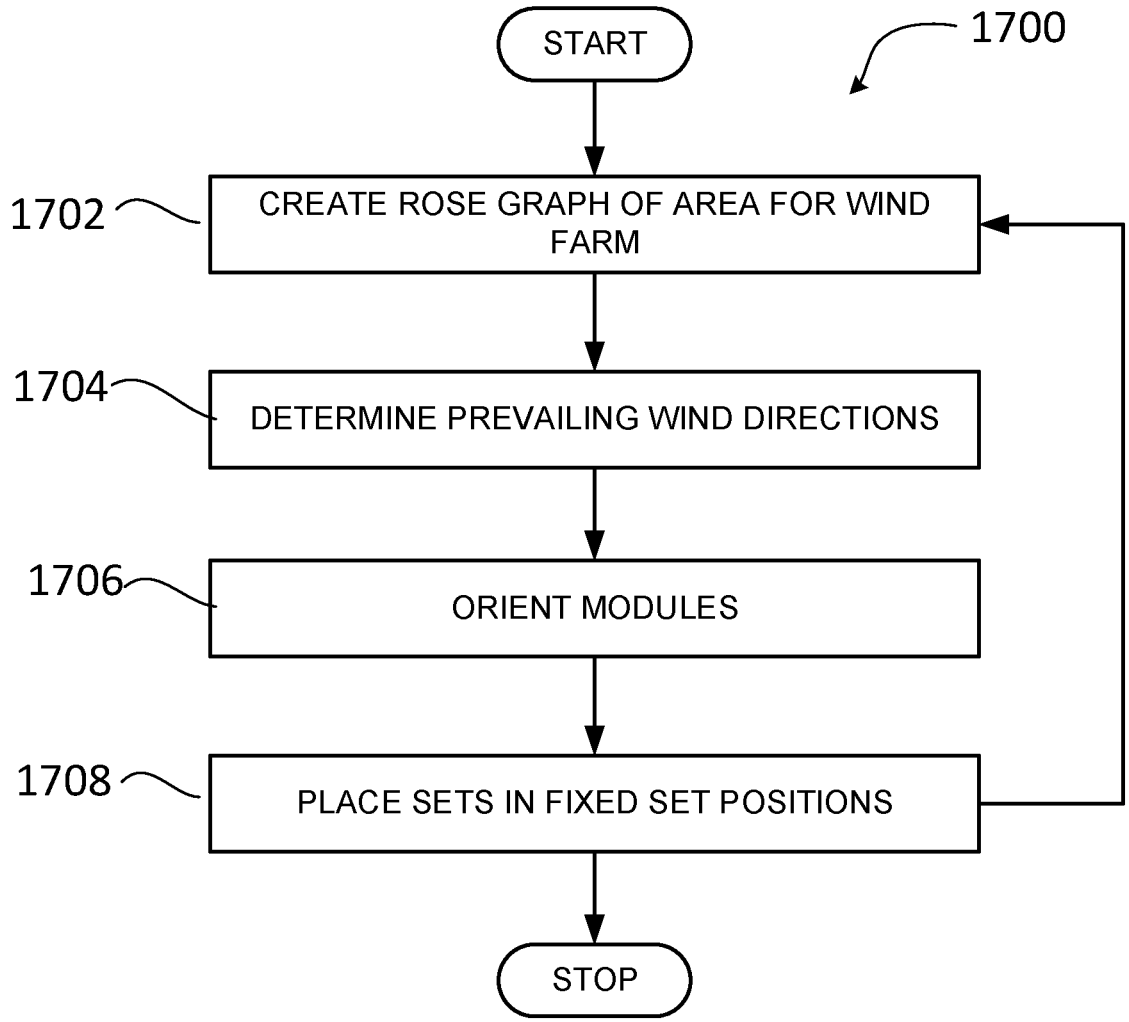
FIG. 17 is an illustrative flow chart of methods for configuring a wind farm in accordance with embodiments of the present invention.

FIG. 17 is an illustrative flow chart 1700 of methods for configuring a wind farm in accordance with embodiments of the present invention. At a first step 1702, the method creates a rose graph of an area designated for a wind farm embodiment. A rose graph is disclosed in detail above for FIG. 10. In general, a rose graph graphically illustrates a number of wind characteristics for a given area. In embodiments, wind characteristics include: wind direction, wind speed, and wind duration. From these wind characteristics, the method continues to a step 1704 to determine prevailing wind directions by analyzing the wind graph. In embodiments, prevailing wind directions are based on highest wind direction and speed probability distributions. In many areas several prevailing wind directions may be found having the same or different direction and speed probability distributions. For example, as illustrated in FIG. 10, three prevailing wind directions 1002, 1004, and 1006 are illustrated where prevailing wind direction 1002 has the highest wind direction and speed probability distribution and prevailing wind directions 1004 and 1006 have lower wind direction and speed probability distributions. In some embodiments at least one highest wind direction and speed probability distribution is found.

Returning to FIG. 17, at a next step 1706, the method orients the modules in a fixed module orientation such as illustrated in FIG. 11. In embodiments, each module is oriented to approximately 90° (optimum wind angle) plus or minus 15° from its corresponding prevailing wind direction to enable the remaining prevailing wind directions to fall within the turbine useable wind range, if possible. In this manner, each module in a set is oriented to one corresponding prevailing wind direction. For each prevailing wind direction, all wind steerable turbines are approximately parallel and, as such, are optimally oriented for that wind direction.

Returning to FIG. 17, at a next step 1708, the method places sets of modules in a fixed set positions such as illustrated for FIG. 12. In FIG. 12, groups of sets are aligned along axes such as 1204 and 1206 which, in embodiments, are parallel. Group 1208, for example, is aligned along axis 1204. In addition, as illustrated, group 1210 is aligned along axis 1206. Importantly, each set of group 1210 is rotated 180° with respect to the modules in group 1208. This pattern allows for maintaining a distance in a range of approximately six to fifteen turbine diameters between modules of different sets. In embodiments, sets include one or more modules placed in a fixed module placement. Modules of each set are placed in a fixed module placement such as illustrated in FIG. 11. As illustrated in FIG. 11, the three modules are positioned equidistant from each other and spaced approximately ten turbine diameters apart in a fixed module placement. In embodiments, modules are placed no closer than approximately six turbine diameters apart and no further than approximately fifteen turbine diameters apart in a fixed module placement.

Methods for Controlling a Wind Farm

Figure 18:
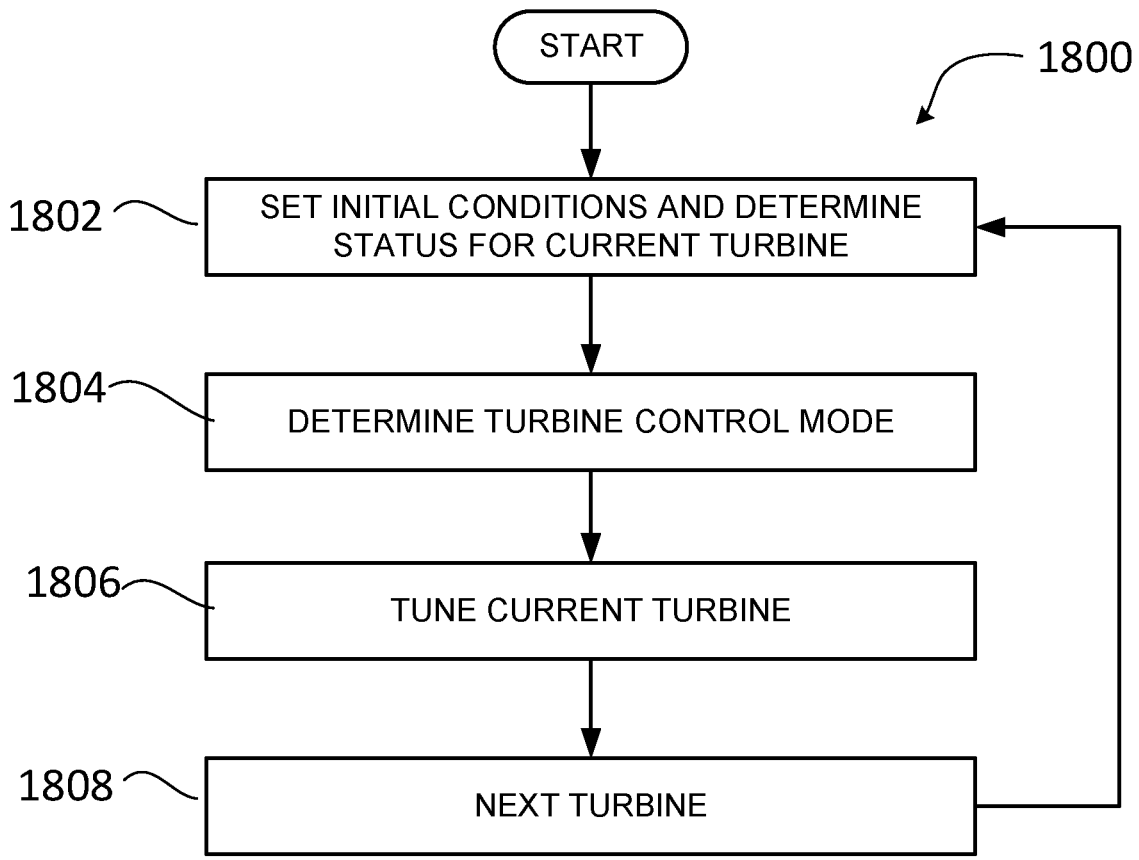
FIG. 18 is an illustrative flow chart of methods for controlling a wind farm in accordance with embodiments of the present invention.

FIG. 18 is an illustrative flow chart 1800 of methods for controlling a wind farm in accordance with embodiments of the present invention. In particular, flow chart 1800 illustrates an overview of control methods for a wind farm. As such, at a first step 1802, the method sets initial conditions and determines status for a current turbine. As utilized herein, a current turbine is a turbine currently under inspection by methods disclosed herein. A step 1802 will be discussed in further detail below for FIG. 19. At a next step 1804, the method determines turbine control mode and continues to a step 1806 to tune the current turbine. Steps 1804 and 1806 will be discussed in further detail below for FIG. 20. At a next step 1808, the method selects a next turbine and continues to a step 1802.

Figure 19:
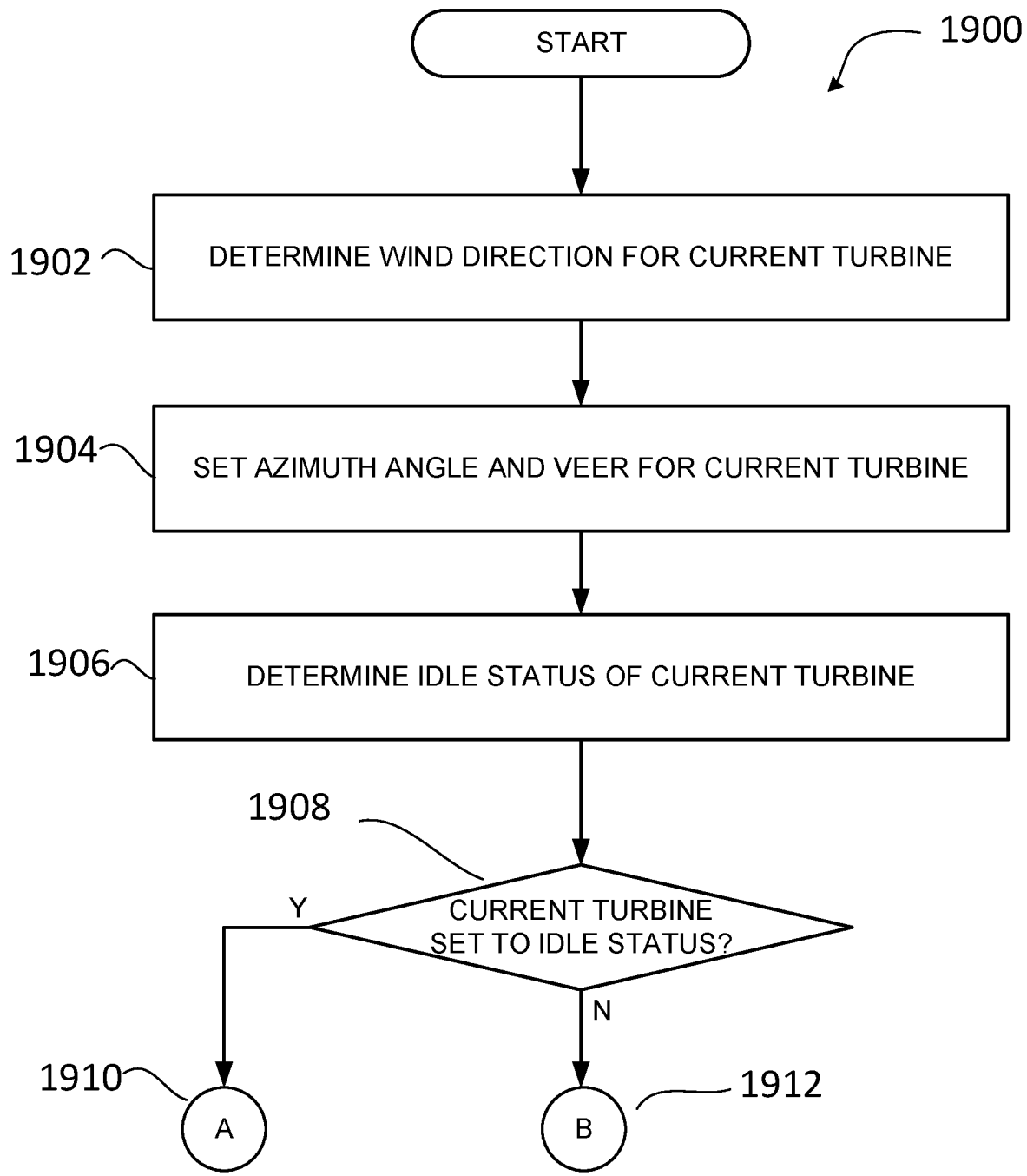
FIG. 19 is an illustrative flow chart of methods for controlling a wind farm in accordance with embodiments of the present invention.
Figure 21:
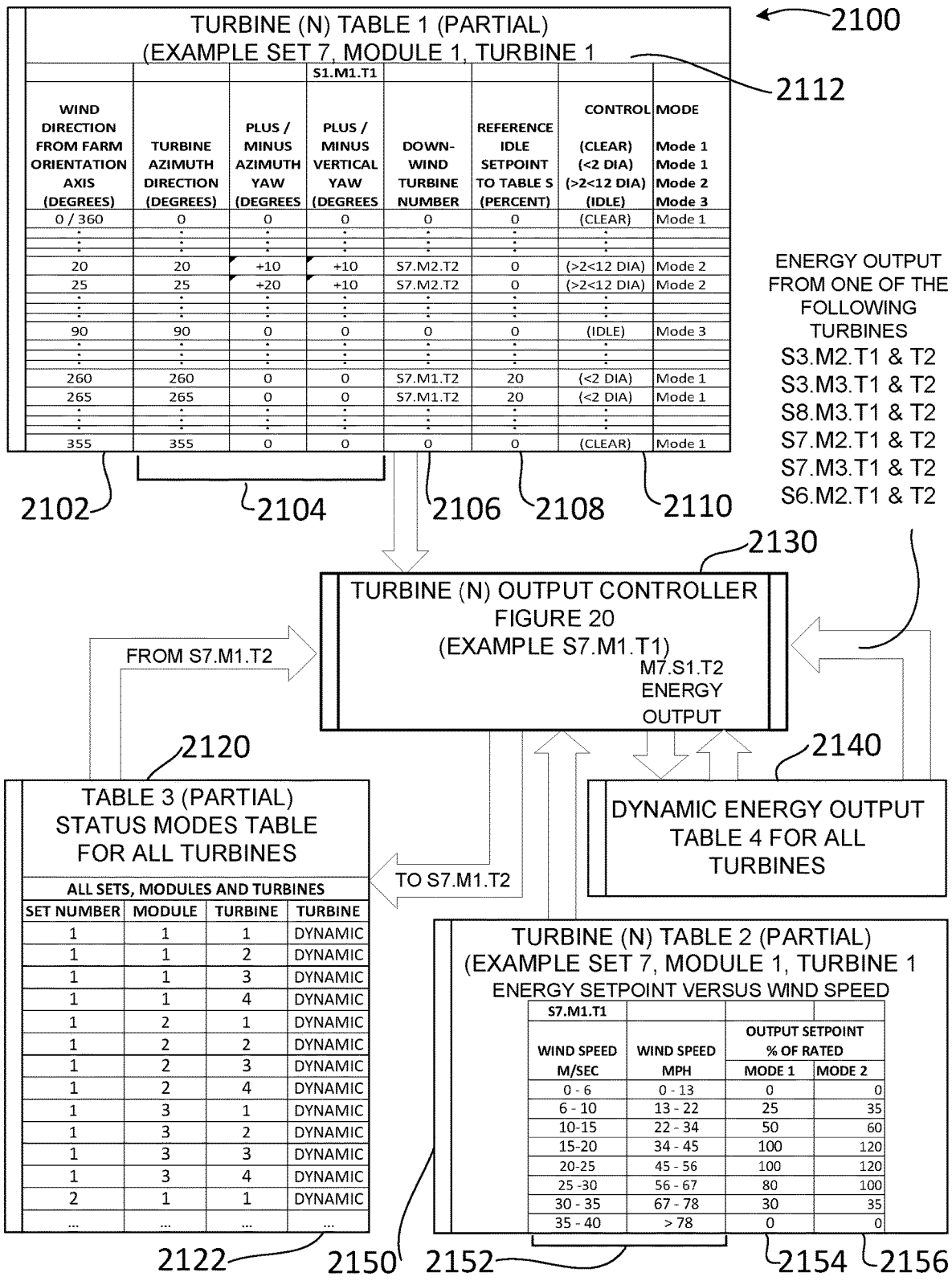
FIG. 21 is an illustrative representation of tables and control diagrams utilized for methods of controlling a wind farm in accordance with embodiments of the present invention.

FIG. 19 is an illustrative flow chart 1900 of methods for controlling a wind farm in accordance with embodiments of the present invention. In particular, flow chart 1900 further illustrates methods corresponding with a step 1802 (FIG. 18). As such, at a first step 1902, the method determines the wind direction for the current turbine. In embodiments, wind direction may be determined in any manner known in the art without limitation. At a next step 1904, the method sets azimuth angle and veer for the current turbine. In embodiments, tabulated data is utilized such as illustrated in FIG. 21, which is an illustrative representation of tables and control diagrams utilized for methods of controlling a wind farm in accordance with embodiments of the present invention. In FIG. 21, Table 1 (2100) includes tabulated data for use in methods provided herein. Table 1 (2100) includes wind direction data 2102, steering data 2104, downwind turbine data 2106, idle setpoint data 2108, control mode data 2110, and turbine I.D. data 2112. Thus, for a determined wind direction, wind direction data 2102 is utilized to find corresponding steering data 2104 to set azimuth angle and veer for the current turbine in a step 1904.

At a next step 1906, the method determines the idle status of the current turbine. Idle status is determined from Table 1 (2100) in FIG. 21. Therein illustrated, control mode data 2110 includes an "IDLE" status. Thus, it may be seen from the table that for a given wind direction (i.e., 90°), the current turbine is set to "IDLE." The method continues to a step 1908 to determine whether the current turbine is set to "IDLE." If the method determines at a step 1908 that the current turbine is set to "IDLE," the method continues to a step 1910, which is further illustrated in FIG. 20. If the method determines at a step 1908 that the current turbine is not set to "IDLE," the method continues to a step 1912, which is further illustrated in FIG. 20.

Figure 20:
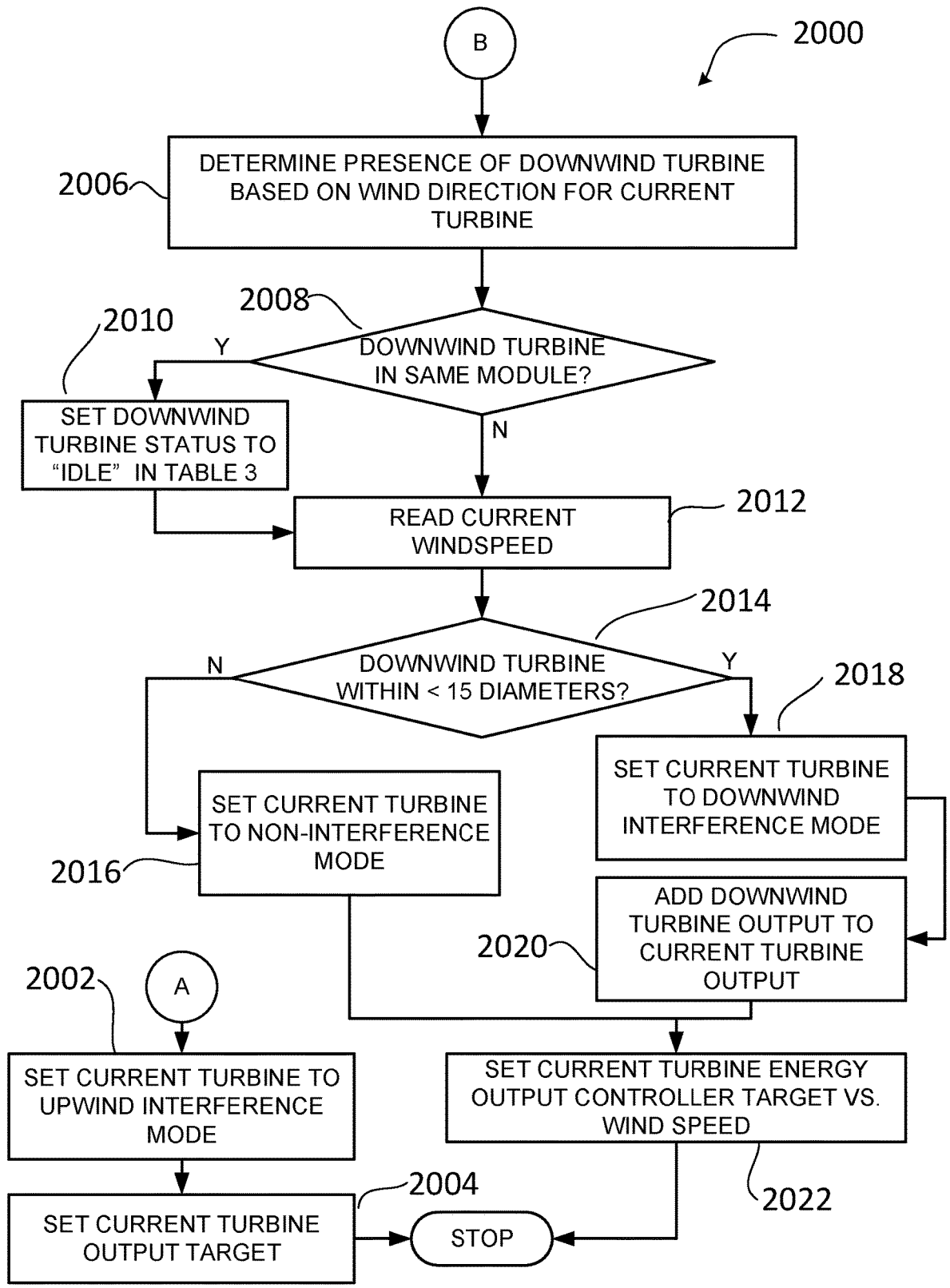
FIG. 20 is an illustrative flow chart of methods for controlling a wind farm in accordance with embodiments of the present invention.

FIG. 20 is an illustrative flow chart 2000 of methods for controlling a wind farm in accordance with embodiments of the present invention. In particular, flow chart 2000 further illustrates methods corresponding with steps 1908 and 1910 (FIG. 19). As such, for the (A) path at a step 2002, after the method determines that the current turbine is set to "IDLE," the method sets the current turbine to upwind interference mode. Upwind interference mode indicates that there is some upwind interference caused by an upwind turbine. At a next step 2004, the method continues to set the current turbine output target as from tabulated data such as in Table 1 (2100, FIG. 21; see 2108). The method for the (A) path then ends.

For the (B) path at a step 2006, after the method determines that the current turbine is not set to "IDLE," the method determines presence of a downwind turbine based on the wind direction of the current turbine from tabulated data such as in Table 1 (2100, FIG. 21). Downwind turbine data 2106 indicates whether a downwind turbine is present with respect to the current turbine and wind direction. At a next step 2008, the method determines whether a downwind turbine is in the same module. As noted previously, turbines may be configured in a matrix. At some wind directions, turbines in the same matrix may interfere with each other. If the method determines at a step 2008 that a downwind turbine is in the same module, the method continues to a step 2010 to set the downwind turbine status to "IDLE." In some embodiments, status is tabulated such as in Table 3 (2120, FIG. 21). The method continues to a step 2012 to read the current windspeed. If the method determines at a step 2008 that a downwind turbine is in not the same module, the method continues to a step 2012 to read the current windspeed. At a next step 2014, the method determines whether a downwind turbine is within less than 15 turbine diameters of the current turbine. If the method determines at a step 2014 that there is no downwind turbine within less than 15 turbine diameters of the current turbine, the method continues to a step 2016 to set the current turbine to non-interference mode. At this step, either there exists no downwind turbine or the downwind turbine is located a distance greater than 15 turbine diameters from the current turbine and therefore it does not cause wake interference to any downwind turbines. The method continues to a step 2022 discussed below.

If the method determines at a step 2014 that there is a downwind turbine within less than 15 turbine diameters of the current turbine, the method continues to a step 2018 to set the current turbine to downwind interference mode. The method continues to a step 2020 to add the downwind turbine output to the current turbine output for purposes of tuning based on total output of the current turbine output plus the downwind turbine output. The method continues to a step 2022 to set the current turbine energy output controller target based on wind speed from tabulated data such as Table 2 (2150, FIG. 21), whereupon the method ends. Turning to FIG. 21, Table 2 includes windspeed data 2152, non-interference mode data 2154, and downwind interference mode data 2156, which include output setpoints for controlling output of the current turbine. For clarity, the following Table A is provided for the various control modes as contemplated herein:

TABLE A

| Mode 1 | Non-interference mode | a. | No interference from upwind turbine |
| | | b. | All downwind turbines are >15 diameters |
| | | c. | Interference to downwind turbine in same module that is set to Idle status |
| Mode 2 | Downwind interference mode | | Current turbine wake interferes with downwind turbine not in the same module as current turbine |
| Mode 3 | Upwind interference mode | | Upwind interference from turbine in the same module, set the current turbine to Idle |

FIG. 21 is an illustrative representation of tables and control diagrams utilized for methods of controlling a wind farm in accordance with embodiments of the present invention. As illustrated, Table 1 (2100) includes wind direction data 2102, steering data 2104, downwind turbine data 2106, idle setpoint data 2108, control mode data 2110, and turbine I.D. data 2112. Further illustrated is Table 2 (2150) that includes windspeed data 2152, non-interference mode data 2154, and downwind interference mode data 2156, which include output setpoints for controlling output of the current turbine. Still further illustrated is Table 3 (2120) that includes the current status modes 2122 for all turbines as they are modified by the control. Further, Table 4 (2140) includes the current dynamic energy output for all turbines as the control tunes the turbine for changes in the wind speed and direction. It may be seen that data from the various tables provide input to output controller 2130 utilizing methods disclosed herein.

FIG. 22 is an illustrative representation of non-ducted wind turbine 2200 in accordance with embodiments of the present invention. In particular, FIG. 22 illustrates top view 2210, front view 2220, and side view 2230 of non-ducted wind turbine 2200. As illustrated, blades 2202 and hub 2204 are referenced. In addition, three axes of rotation, turbine blade rotation axis 2212, turbine azimuthal vertical axis 2216, and turbine elevation horizontal axis 2214. Three blades 2202 are shown, however, any number of blades may be utilized without limitation in embodiments as known in the art. FIG. 22 illustrates an embodiment where the blades 2202 are supported by the hub 2204 that is supported by the nacelle 2208. A nacelle support column 2206 is shown that supports the nacelle 2208 from above and below the blades which is possible in the structure (see FIG. 7, 740) of this invention. The hub support column 2206 can alternatively support the hub from only the top or only from the bottom of the blades and is smaller, with less wind blockage than the support elements in a prior-art wind turbine. The nacelle 2208 is fixed immobile to the nacelle support column 2206 and does not rotate with respect to the nacelle support column. To rotate the rotational plane of the blades to the wind, the nacelle support column 2208 rotates in the structure (see FIG. 7, 740). The open wind turbines in this invention are supported above and below the rotor in FIG. 22. That is, the generator (see FIG. 23, 2308) and gearbox (see FIG. 23, 2310) are moved from the nacelle 2208 to the non-rotating fixed structure (see FIG. 7, 740 and FIG. 24, 2400) and the nacelle support column 2206 and nacelle 2208 can both be much smaller with less weight and wind blockage. When the generator and, if needed, a gearbox are supported in the fixed structure (see FIG. 7, 740) the rotational energy of the blades is transmitted to the gearbox and generator through the blade transfer shaft 2218 installed inside of the nacelle support column 2206) Alternate embodiments include supporting the blades from a neutral duct or an airfoil duct or applying vertical axis blades.

Figure 23:
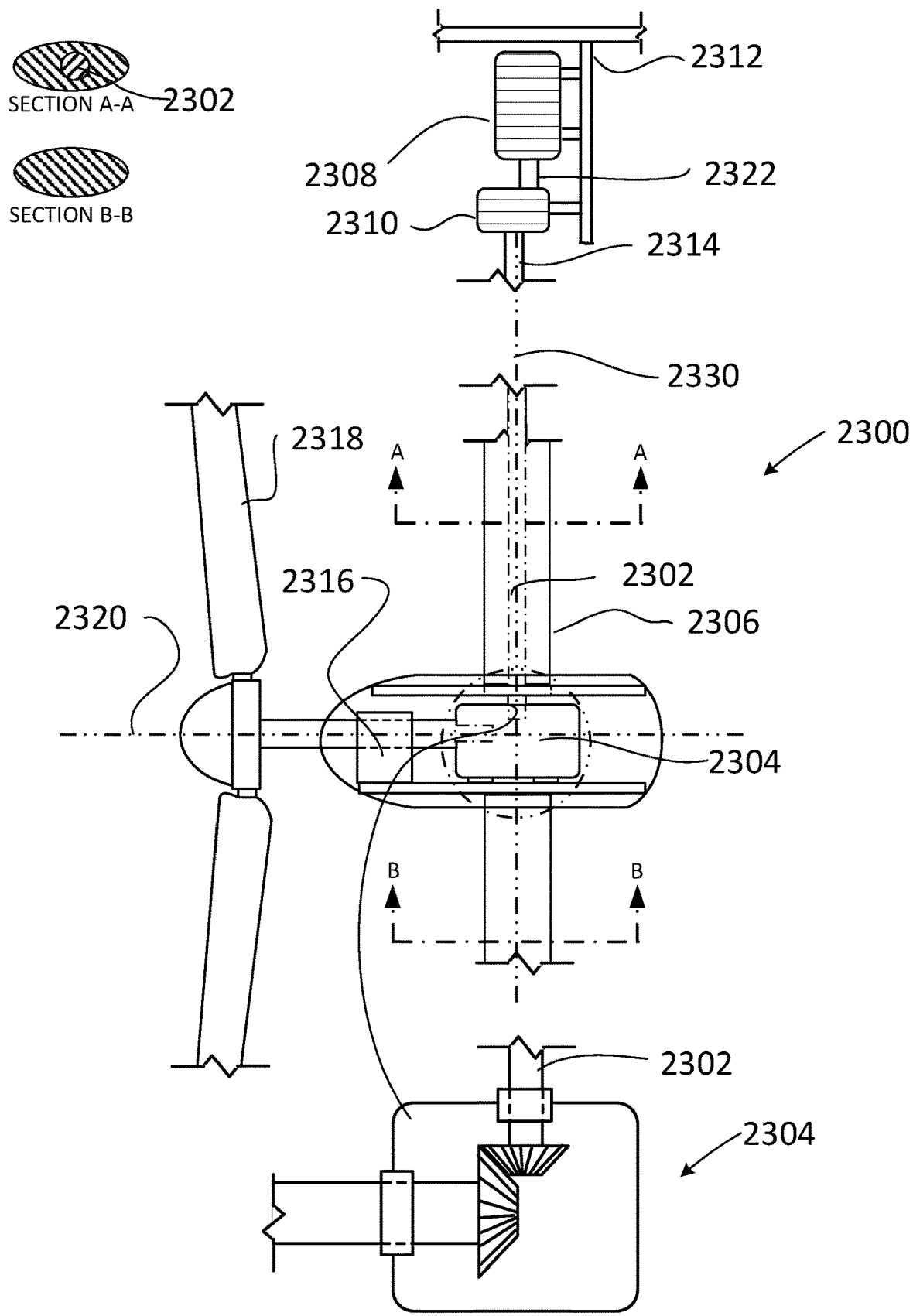
FIG. 23 is an illustrative representation of a non-ducted wind turbine in accordance with embodiments of the present invention.

FIG. 23 is an illustrative representation of non-ducted wind turbine 2300 in accordance with embodiments of the present invention. In particular, FIG. 23 illustrates additional detail on one variation of a hub embodiment where the generator 2308 and, if required the gearbox 2310, are moved out of the nacelle and into the support structure of the turbine 2312 (see FIG. 7, 740). In this embodiment, blade transfer shaft 2302 is aligned with the generator drive shaft 2322, or with the gearbox drive shaft 2314, as shown in FIG. 23 and drives the gearbox drive shaft 2314 or generator drive shaft 2322. The blade transfer shaft 2302 also is coincident with azimuthal axis of rotation 2330 so the generator 2308, or if needed, a gearbox (2310) can be located in the fixed structure 2312 and do not need to rotate with changes in the wind direction. Rotation around the azimuthal axis 2330 with changes in wind direction will momentarily add or subtract a few degrees of rotation to the gearbox drive shaft or generator drive shaft 2322 with negligible impact to energy generation while significantly reducing the weight and size of components rotating with changes in the wind direction. The nacelle only needs to enclose and support the blades support bearing 2316 and small 90 degrees gearbox 2304.

FIG. 24 is an illustrative representation of upper drive elements in accordance with embodiments of the present invention without vertical steering (altitudinal). In particular, FIG. 24 illustrates top view 2450 and side view 2452 showing one variation of upper drive elements (2400) in this invention that supports generator 2402, gearbox 2422, and other drive elements described below. The support deck 2404 connects to the fixed structure 2424 and constrains the rotating support plate 2406 from vertical movement while allowing the rotating support plate 2406 to rotate, thereby allowing the turbine to turn toward the wind direction. The pitch drive 2412 and pitch drive shaft 2414 are shown in the TOP VIEW—2450, but the pitch drive shaft 2414 is hidden from view in the SIDE VIEW—2452. The pitch drive shaft 2414 connects to elements in the nacelle (see FIG. 31) to adjust the pitch of the blades as commanded by the control system. The turbine support column 2416 is held to the rotating support plate 2406 by the non-pivoting support 2408. The turbine support column 2416 encloses the blade transfer shaft 2426. The azimuth drive 2410 constrains and changes the angular rotation of the rotating support plate 2406, thereby turning the turbine into the wind as commanded by the control. The generator 2402 and gearbox 2422 are supported by elements of the fixed structure 2420A and 2420B respectively. The blade transfer shaft 2426 connects to the gearbox drive shaft 2428 through mechanical coupling 2430 and the generator drive shaft 2418 connects to the gearbox through mechanical coupling 2432. This is one embodiment for providing azimuthal rotation plus a pitch drive 2412 for wind turbines with or without a duct. The embodiment can be applied for all types of wind turbines applicable to the invention. The gearbox may not be required for circumferential-duct-supported blades or other embodiments.

FIG. 25 is an illustrative representation of lower drive elements in accordance with embodiments of the present invention without vertical steering (altitudinal). In particular, FIG. 25 illustrates top view 2550 and side view 2552 of one variation of lower drive elements (2500) in this invention without vertical steering (altitudinal). The support deck 2502 constrains the rotating support plate 2504 from vertical movement while allowing the rotating support plate 2504 to rotate, thereby allowing the turbine to turn toward the wind direction. The duct support column 2506 constrains the idle shaft 2510 when an idle shaft 2510 is required. This embodiment can be applied for all types of wind turbines applicable to the invention.

Figure 26:
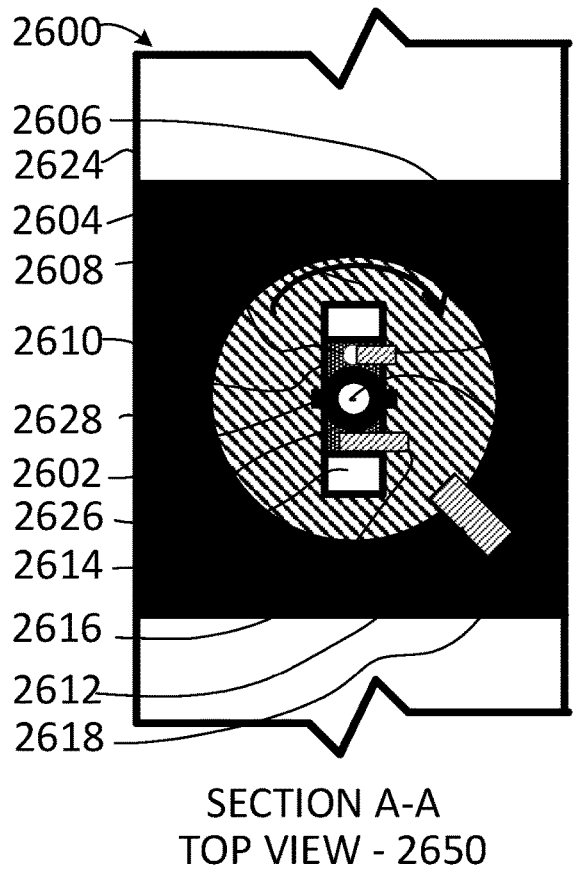
FIG. 26 is an illustrative representation of drive elements in accordance with embodiments of the present invention.

FIG. 26 is an illustrative representation of upper drive elements in accordance with embodiments of the present invention with vertical steering (altitudinal). In particular, FIG. 26 illustrates top view 2650 between the rotating support dome 2704 and the generator rotating support dome 2722 (SECTION A-A, see FIG. 27, 2704, 2722) showing one variation of upper drive elements (2600) in this invention that supports drive elements described below and in FIG. 27. The support deck 2602 connects to the fixed structure 2624 and constrains the rotating support dome 2604 from vertical movement while allowing the rotating support dome 2604 to rotate, thereby allowing the turbine to turn toward the wind direction. The pitch drive 2606 and pitch drive shaft 2608 are shown in the TOP VIEW—2650, but the pitch drive shaft 2608 is hidden from view in the SIDE VIEW FIG. 27. The pitch drive shaft 2608 connects to elements in the nacelle (see FIG. 31) to adjust the pitch of the blades as commanded by the control system. The turbine support column 2626 is held to the sliding support element 2610 by the pivoting support 2628. The sliding support element 2610 rides in a slot 2614 in the rotating support dome 2604 and constrains the turbine support column 2626 from vertical movement while allowing movement along the circumference of the rotating support dome 2604 in the slot 2614 to allow vertical steering of the wind turbine. The altitudinal drive 2616 connects to the sliding support element 2610 constraining and adjusting the sliding support element 2610 position in the slot 2614 to adjust the altitudinal position of the turbine to steer it in the vertical direction. The turbine support column 2626 encloses the blade transfer shaft 2618. The azimuth drive 2612 constrains and changes the angular rotation of the rotating support dome 2604, thereby turning the turbine into the wind as commanded by the control. This is one embodiment for providing azimuthal and altitudinal rotation plus a pitch drive 2606 for wind turbines with or without a duct. The embodiment can be applied for all types of wind turbines applicable to the invention.

Figure 27:
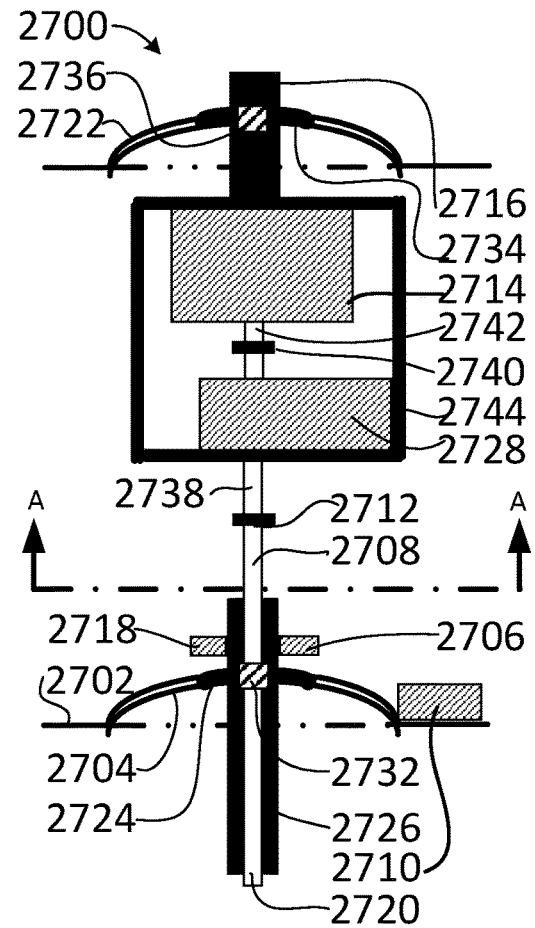
FIG. 27 is an illustrative representation of drive elements in accordance with embodiments of the present invention.

FIG. 27 is an illustrative representation of upper drive elements in accordance with embodiments of the present invention. In particular, FIG. 27 illustrates side view 2750 showing one variation of upper drive elements (2700) in this invention with altitudinal steering that supports drive elements described below. Support deck 2702 constrains the rotating support dome 2704; the rotating support dome 2704 rotates while constraining the turbine support column 2726 vertically allowing the turbine support column 2726 to rotate to adjust to the wind direction. The azimuth drive 2710 constrains and adjusts the rotation of the rotating support dome 2704 to adjust the turbine for changes in wind direction. The sliding support element 2724 rides in a slot (see FIG. 26, 2610) in the rotating support dome 2704 and is connected by the pivoting support 2732 to the turbine support column 2726 and constrains the turbine support column 2726 from vertical movement while allowing movement along the circumference of the rotating support dome 2704 in the slot (see FIG. 26 2610) to allow vertical steering of the wind turbine. The altitudinal drive 2718 constrains the sliding support element 2724 and varies the sliding support element 2724 position in the slot to change the vertical or altitudinal direction of the turbine. The pitch drive 2706 powers the pitch drive shaft (see FIG. 26, 2608) to adjust the pitch of the turbine. The turbine support column 2708 encloses the blade transfer shaft 2720. The generator 2714 and gearbox 2728 are supported by the generator rotating support dome 2722, the generator sliding element 2734, the generator pivoting support 2722, the generator support frame 2748, and the generator support beam 2716. The blade transfer shaft 2720 connects to the gearbox drive shaft 2738 through mechanical coupling 2712 and the generator drive shaft 2742 connects to the gearbox through mechanical coupling 2740. The gearbox 2728 may not be required for circumferential-duct-supported blades or other embodiments.

Figure 28:
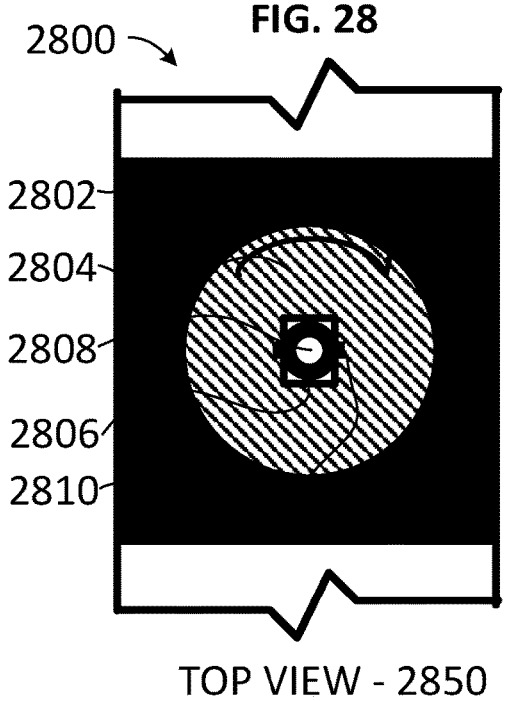
FIG. 28 is an illustrative representation of drive elements in accordance with embodiments of the present invention.

FIG. 28 is an illustrative representation of lower drive elements in accordance with embodiments of the present invention. In particular, FIG. 28 illustrates top view 2850 showing one variation of lower drive elements (2800) in this invention with altitudinal steering that supports drive elements described below. Support deck 2802 constrains the rotating support plate 2804 which connects together the pivoting support 2810 and the turbine support column 2806. The turbine support column 2806 encloses the blade idle shaft 2808. The illustrated embodiment can be applied for all types of wind turbines applicable to the invention.

Figure 29:
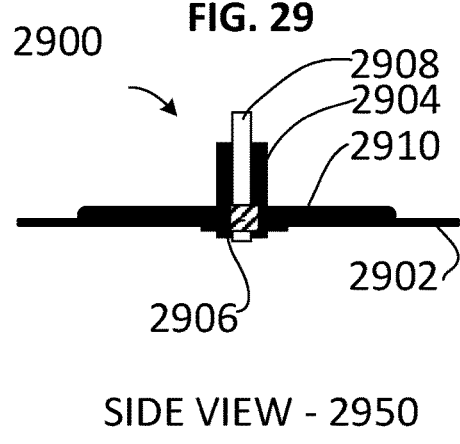
FIG. 29 is an illustrative representation of drive elements in accordance with embodiments of the present invention.

FIG. 29 is an illustrative representation of lower drive elements in accordance with embodiments of the present invention. In particular, FIG. 29 illustrates side view 2950 showing one variation of lower drive elements (2900) in this invention with altitudinal steering that supports drive elements described below. Support deck 2902 constrains the rotating support plate 2910 which connects the pivoting support 2906 and the turbine support column 2904. The turbine support column 2904 encloses the blade idle shaft 2908. The illustrated embodiment can be applied for all types of wind turbines applicable to the invention.

Figure 30:
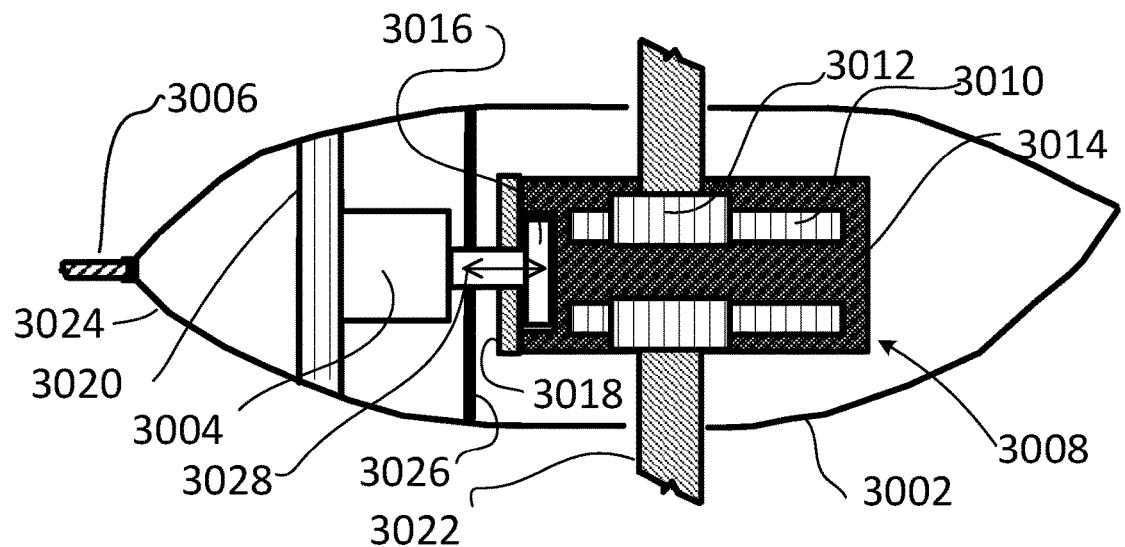
FIG. 30 is an illustrative representation of hub elements in accordance with embodiments of the present invention.

FIG. 30 is an illustrative representation of hub and nacelle elements in accordance with embodiments of the present invention. In particular, FIG. 30 illustrates side view 3050 of an embodiment of hub 3002 and nacelle 3024 for circumferential supported blades (see FIG. 32 and FIG. 34) in this invention with the pitch drive 3004 installed in the nacelle 3024, near the rotating bearing 3026. The rotating bearing 3026 separates the fixed nacelle 3024 from the rotating hub 3002. Note that the nacelle is upwind of the hub which is reversed from usual designs. The hub support 3006 is needed in this embodiment to supply power to the pitch drive 3004 which is located inside the nacelle 3024. The power may be electric, hydraulic, pneumatic, or other suitable source without restriction. One possible embodiment of the mechanical elements 3008 is shown with the hub rack gear 3010, blade pitch gear 3012, blade pitch angle drive and support shaft 3022, rack gear support element 3014, rotating pocket connection 3016, pocket connection retaining element 3018, pitch linear drive shaft 3028, and pitch drive support 3020. A geared mechanism is shown to rotate the blade pitch angle drive and support shaft 3022, but other means may be employed. Any practical means to transfer the pitch drive 3004 motion to the blade pitch angle drive and support shaft 3022 to adjust pitch can be used, worm gears for example. These mechanical elements 3008 allow the pitch drive 3004 to remain in a fixed position in the nacelle while the blade pitch angle drive and support shaft 3022 rotates with the hub 3002 with the energy from the wind. Through these mechanical elements 3008, the pitch drive changes the energy capture from the wind as commanded by the control (see FIG. 17 through FIG. 21).

Figure 31:
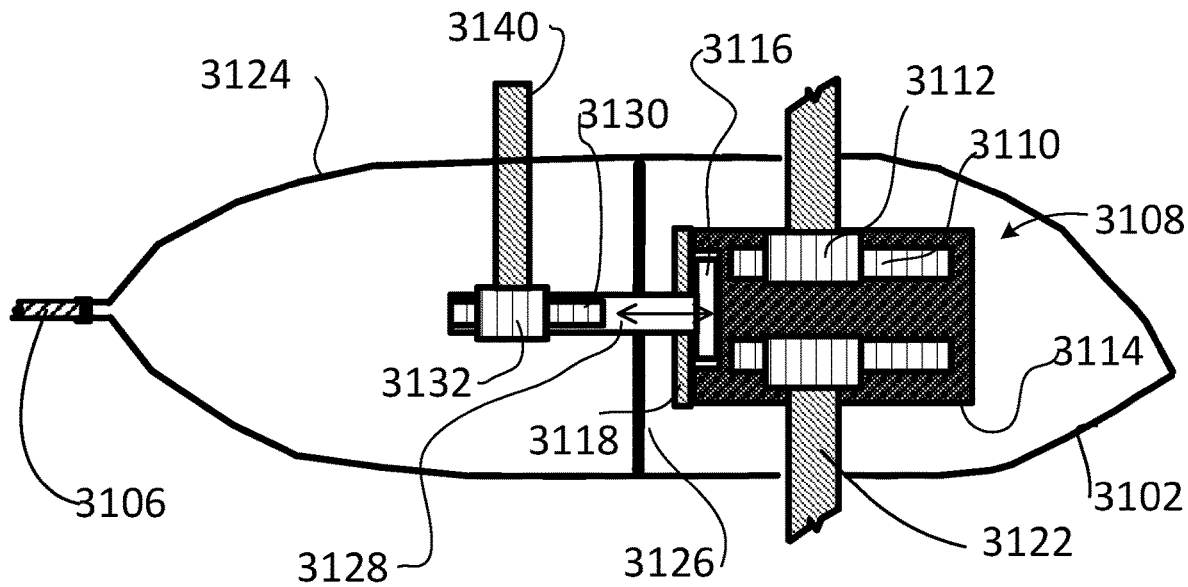
FIG. 31 is an illustrative representation of hub elements in accordance with embodiments of the present invention.

FIG. 31 is an illustrative representation of hub and nacelle elements in accordance with embodiments of the present invention. In particular, FIG. 31 illustrates side view 3150 of an embodiment of hub 3102 and nacelle 3124 for circumferential supported blades (see FIG. 32 and FIG. 34) in this invention with the pitch drive installed in the structure (see FIG. 24 through FIG. 27). The rotating bearing 3126 separates the fixed nacelle 3124 from the rotating hub 3102. Note that the nacelle 3124 is upwind of the hub 3102 which is reversed from usual designs. The hub support 3106 may be needed in this embodiment for mechanical support and may also be used to supply a maintenance function for the hub 3102 or nacelle 3124, such as lubrication or heating, for example. One possible embodiment of the mechanical elements 3108 is shown with the hub rack gear 3010, blade pitch gear 3112, blade pitch angle drive and support shaft 3122, rack gear support element 3114, rotating pocket connection 3116, pitch linear drive shaft 3128, pocket connection retaining element 3118, blade pitch angle drive and support shaft transfer gear 3132, blade pitch angle drive and support shaft transfer rack gear 3130, blade pitch drive shaft 3140, blade pitch angle and support shaft 3122. A geared mechanism is shown to rotate the blade pitch angle drive and support shaft 3122, but other means may be employed. Any practical means to transfer the pitch drive 3104 motion to the blade pitch angle drive and support shaft 3122 to adjust pitch can be used, worm gears for example. These mechanical elements 3108 allow the pitch drive shaft 3140 to remain in a fixed position in the nacelle while the blade pitch angle drive and support shaft 3122 rotates with the hub 3102 with the energy from the wind. Through these mechanical elements 3108, the pitch drive shaft 3140 changes the energy capture from the wind as commanded by the control (see FIG. 17 through FIG. 21).

FIG. 32 is an illustrative representation of a wind turbine with an aerodynamically neutral duct, that is with no aerodynamic lift, in accordance with embodiments of the present invention. In particular, FIG. 32 illustrates top view 3250, front view 3252, and side view 3254 of a wind turbine embodiment 3200 applying a neutral aerodynamic duct 3202 enclosing circumferential rings (see FIG. 33, 3308). The neutral aerodynamic duct 3202 provides an alternate means to support the blades 3206 which avoids blade 3206 tip flutter and other mechanical issues with blades 3206 flexing. It also provides a protected location for a set of circumferential rings (see FIG. 33, 3310 and 3316) or other mechanical devices to use the mechanical advantage of the large diameter of the duct 3202 higher angular velocity to replace a high-ratio gear box (see FIG. 23, 2310). The neutral aerodynamic duct 3202 protects the circumferential rings (see FIGS. 33, 3310 and 3316) from the environment and reduces the aerodynamic drag that the circumferential rings would create without the duct. Blade tip supports 3208 connect the blades 3206 with the duct 3202. The optional hub front support 3204 is shown.

Figure 33:
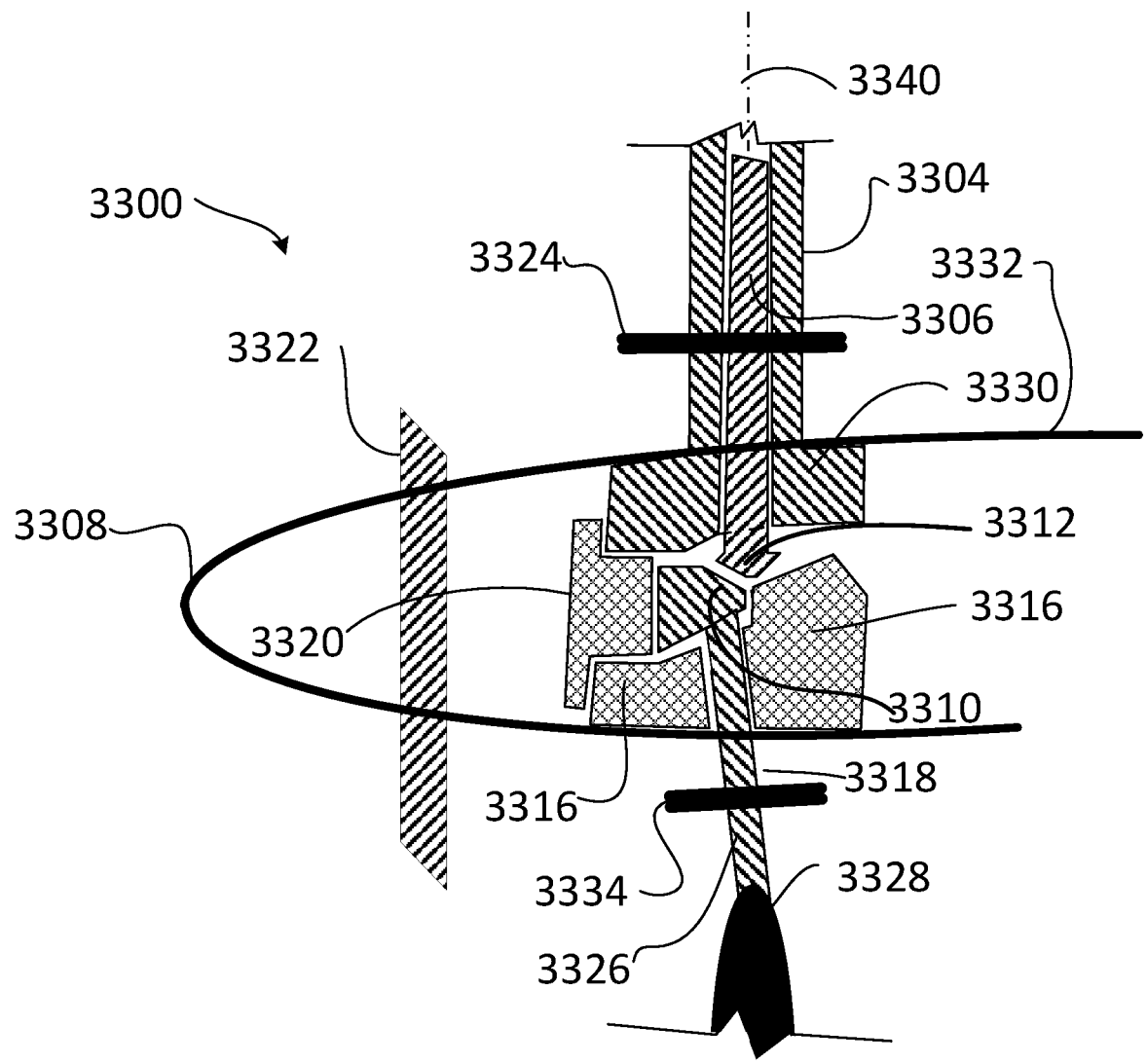
FIG. 33 is an illustrative representation of internal elements of a wind turbine in accordance with embodiments of the present invention.

FIG. 33 is an illustrative representation of internal elements of a wind turbine in accordance with embodiments of the present invention. In particular, FIG. 33 illustrates side view 3350 of internal elements of the present invention showing one embodiment of duct support elements 3300 for a duct 3308 with no aerodynamic lift. This embodiment has the duct support column 3304 creating the turbine azimuthal vertical axis 3340 lying on the plane created by the rotation of the blades 3358. The duct 3308 is supported by the duct support column 3304. One embodiment for supporting the duct 3308 and transmitting the power from the rotating circumferential ring 3310 uses blade drive shaft 3306 with its angle gear 3312 and the circumferential ring 3318 with its angle gear 3310. Duct support column 3304 connects to the duct support bracket 3330 via mechanical coupling 3324. The nonrotating circumferential ring 3316, along with hub support bracket 3330 and circumferential ring retaining cap 3320 constrain the vertical and horizontal movement of the rotating circumferential ring 3318 while allowing it to rotate when forced by the wind reaction to the blades 3328. For embodiments with the pitch drive located in the structure (see FIG. 24 through FIG. 29), the pitch drive shaft 3322 passes through the duct 3308. It is also possible to use any other mechanical means as well as mounting a generator in the duct 3308. The blade tip support element 3334 supports the blades 3328 from the blades' tip to the rotating circumferential ring 3318 via mechanical coupling 3334, creating an open area not obstructed by the plane covered by the blades 3328 rotation. The blade tip support element 3326 can be of any suitable cross-section and material. It usually does not have airfoil properties but could have an airfoil shape. The rotating circumferential ring 3318, non-rotating circumferential ring 3316, duct support column 3304, blade drive shaft 3306, blade tip support element 3326, and blades 3328 can be of any suitable material.

FIG. 34 is an illustrative representation of a wind turbine with an aerodynamical duct, that is with aerodynamic lift, in accordance with embodiments of the present invention. In particular, FIG. 34 illustrates top view 3450, front view 3452, and side view 3454 of a wind turbine embodiment 3400 applying a aerodynamic duct 3402 to improve the energy extraction from the wind and enclosing circumferential rings (see FIGS. 35, 3516 and 3518). Duct augmentation has the following advantages: five to twenty percent additional energy production over an open turbine of the same rotor diameter as the duct maximum diameter, generating energy at a lower wind speed, and operation over a wider range of misalignment with the wind than open turbines. The aerodynamic duct 3402 has the disadvantages of additional weight, additional horizontal thrust against the wind, and longer wake recovery, possibly requiring wider spacing and less wind turbines per acre. The aerodynamic duct 3402 provides an alternate means to support the blades 3406 which avoids blade 3406 tip flutter and other mechanical issues with blades 3406 flexing. It also provides a protected location for a set of circumferential rings (see FIG. 35, 3516 and 3518) or other mechanical devices to use the mechanical advantage of the large diameter of the duct 3402 higher angular velocity to replace a high-ratio gear box (see FIG. 23, 2310). The aerodynamic duct 3402 protects the circumferential rings (see FIGS. 35, 3516 and 3518) from the environment and reduces the aerodynamic drag that the circumferential rings would create without the duct. Blade tip supports 3408 connect the blades 3406 with the duct 3402. The optional hub front support 3404 is shown.

Figure 35:
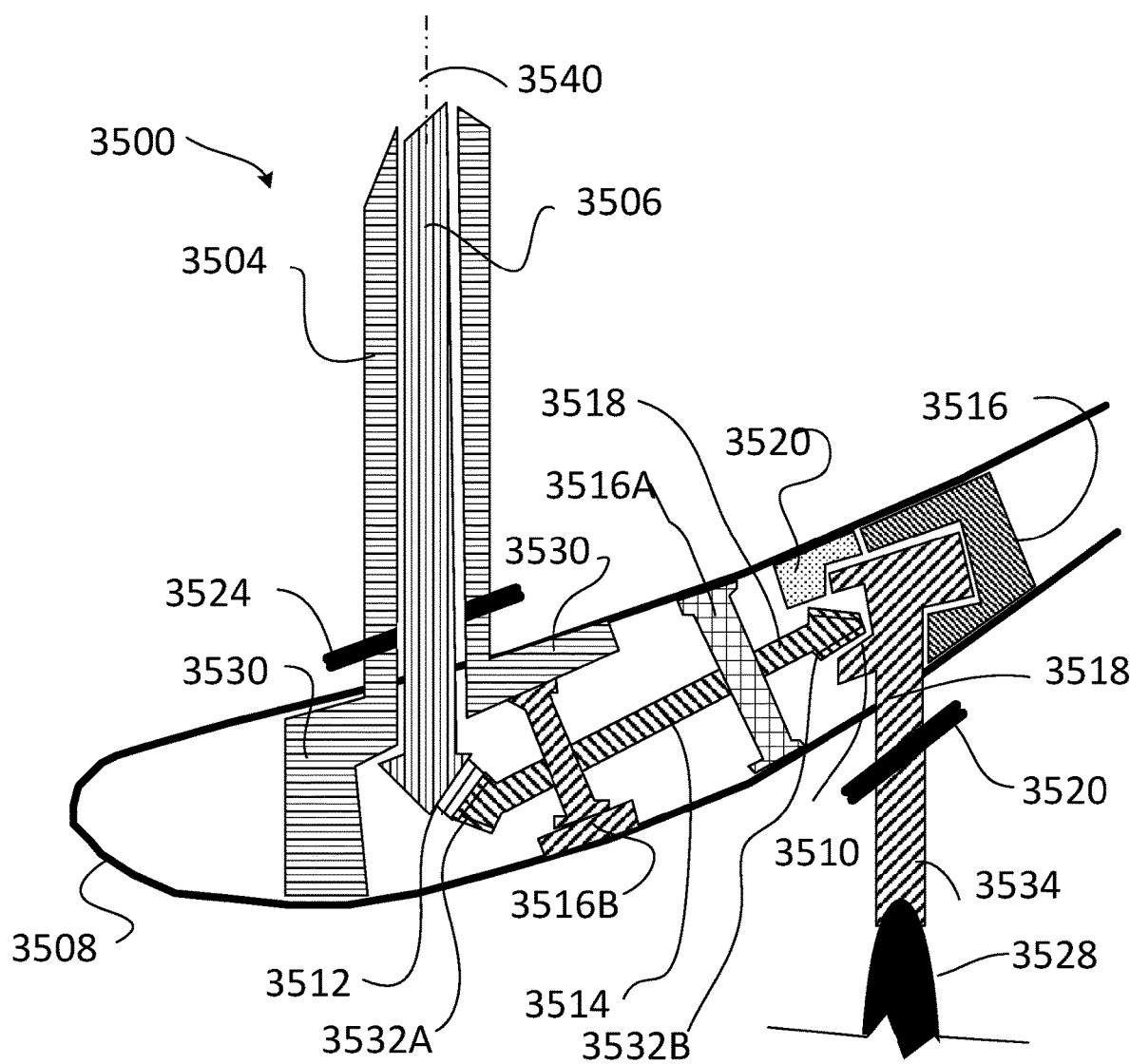
FIG. 35 is an illustrative representation of wind turbine support elements in accordance with embodiments of the present invention.

FIG. 35 is an illustrative representation of internal elements of a wind turbine in accordance with embodiments of the present invention. In particular, FIG. 35 illustrates side view 3350 of internal elements of the present invention showing one embodiment of duct support elements 3500 for a duct 3508 with aerodynamic lift. This embodiment has the duct support column 3504 creating the turbine azimuthal vertical axis 3540 not lying on the plane created by the rotation of the blades 3528. The duct 3508 is supported by the duct support column 3504. One embodiment for supporting the duct 3508 and transmitting the power from the rotating circumferential ring 3518 uses blade drive shaft 3506 with its angle gear 3512 and the transfer shaft 3514 with its angle gears 3532A and 3532B, and circumferential ring 3518 with its angle gear 3510. The transfer shaft 3514 is held in place by transfer shaft bearings 3516A and 3516B. The duct support shaft 3504 connects to the duct support bracket 3530 via mechanical coupling 3524. The nonrotating circumferential ring 3516 and circumferential ring retaining cap 3520 constrain the vertical and horizontal movement of the rotating circumferential ring 3518 while allowing it to rotate when forced by the wind reaction to the blades 3528. The blade tip support element 3534 supports the blades 3528 from the blade tip to the rotating circumferential ring 3518 via mechanical coupling 3520, creating an open area not obstructed by the plane covered by the blades 3528 rotation. The blade tip support element 3534 can be of any suitable cross-section and material. It usually does not have airfoil properties but could have an airfoil shape. The rotating circumferential ring 3518, non-rotating circumferential ring 3516, duct support column 3504, blade drive shaft 3506, blade tip support element 3534, and blades 3528 can be of any suitable materials.

Figure 36:
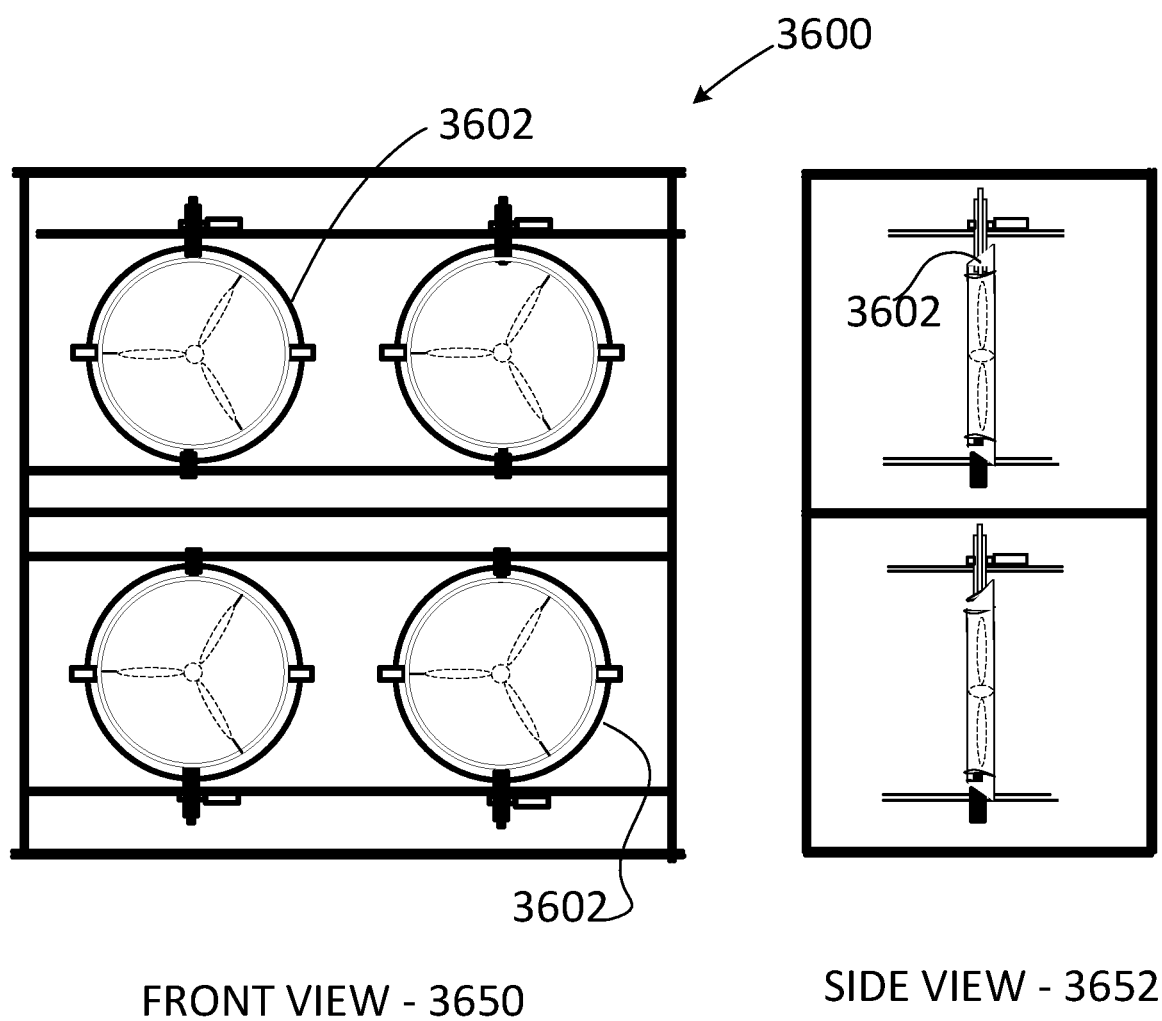
FIG. 36 is an illustrative representation of a secondary support ring wind turbine module in accordance with embodiments of the present invention.

FIG. 36 is an illustrative representation of secondary support ring wind turbine module 3600 in accordance with embodiments of the present invention. In particular, FIG. 36 illustrates front view 3650 and side view 3652 of wind turbine module 3600 having an extra outer circumferential duct 3602. This duct may be required to provide additional strength to an aerodynamic duct for augmentation or an aerodynamically neutral duct. The extra duct may have lift to assist in duct augmentation or may have neutral lift to avoid the disadvantages of augmentation of the rotor disk.

Figure 37:
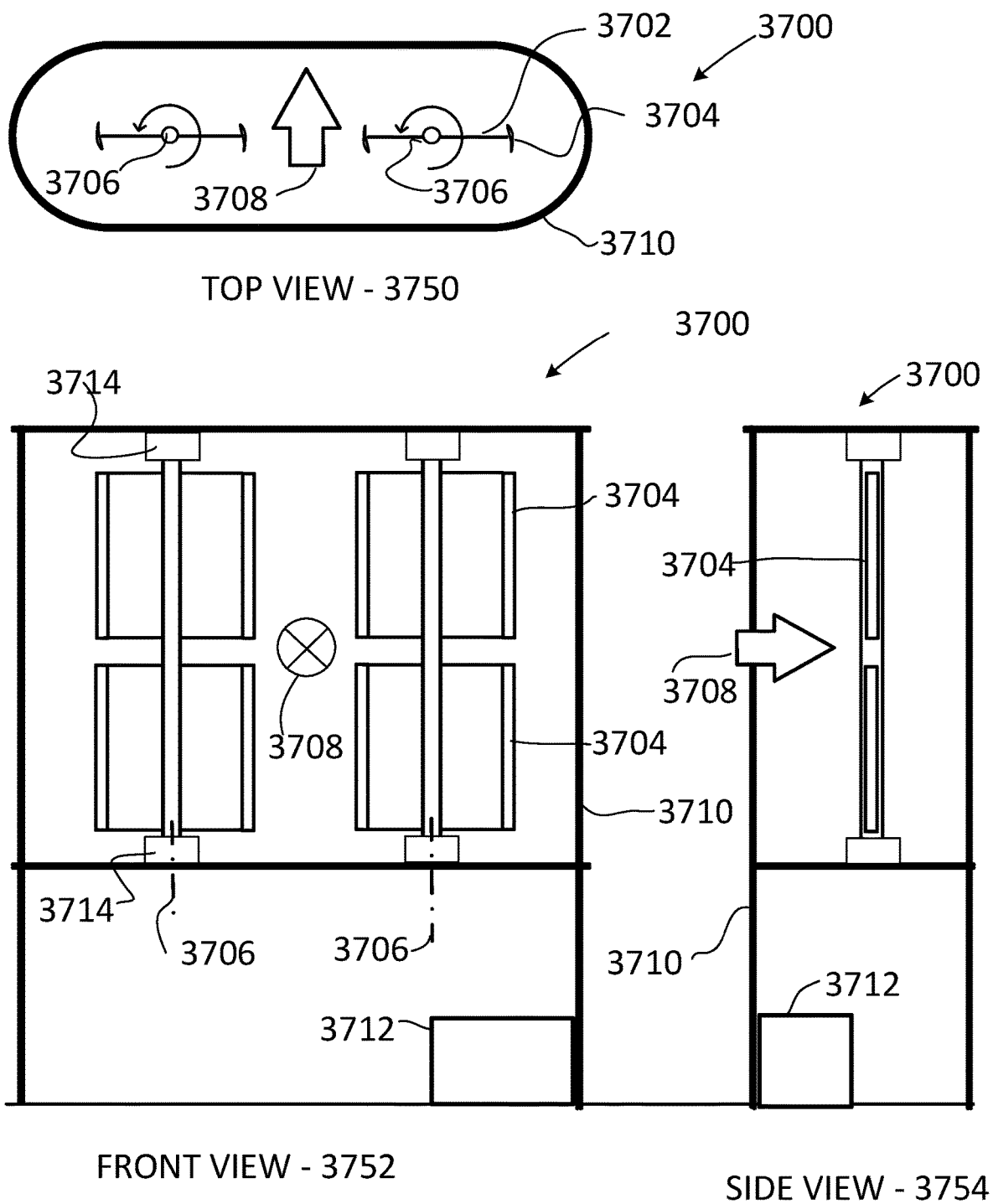
FIG. 37 is an illustrative representation of a vertical axis wind turbine module in accordance with embodiments of the present invention.

FIG. 37 is an illustrative representation of vertical axis wind turbine module 3700 in accordance with embodiments of the present invention. In particular, FIG. 37 illustrates top view 3750, front view 3752, and side view 3754 showing one embodiment of the structure (3710) applying vertical axis turbines 3702. This figure shows two vertical axis blades 3704 per turbine but the number of vertical axis blades 3704 can be more than two. The turbine blade rotation axis 3706 is vertical which eliminates the turbine azimuthal vertical axis because the turbine blade rotation axis 3706 is perpendicular to the wind direction 3708 for vertical axis turbines 3702 and the vertical axis blades 3704 face the wind no matter its direction. The rotating electrical components 3714 are located on the turbine blade rotation axis while the fixed electrical components, shown as 3712, but can be located anywhere in the structure 3710.

Figure 38:
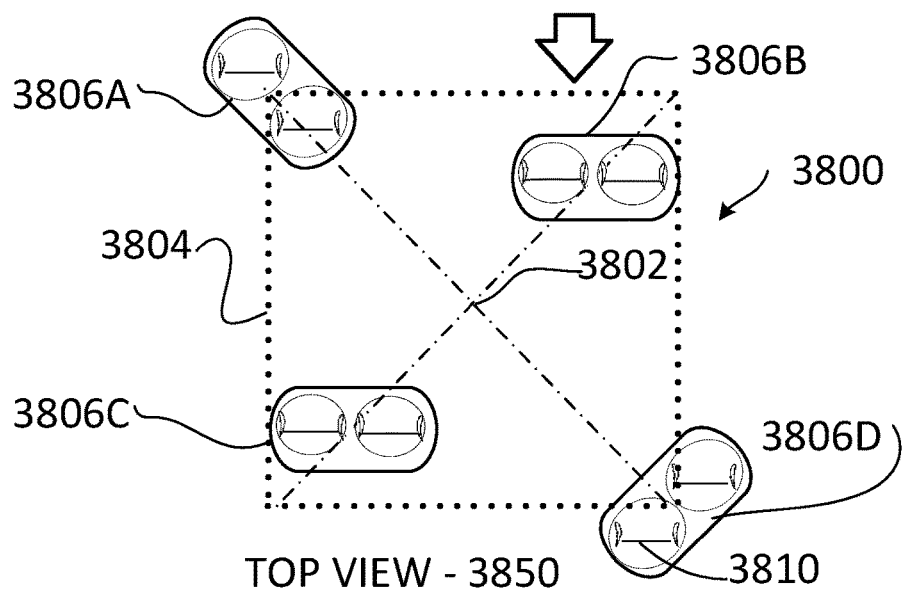
FIG. 38 is an illustrative representation of a wind farm set in accordance with embodiments of the present invention.

FIG. 38 is an illustrative representation of wind farm set 3800 in accordance with embodiments of the present invention. In particular, FIG. 38 illustrates top view 3850 of an embodiment of the present invention turbine showing a set 3800 with four turbine modules 3806A, 3806B, 3806C, and 3806D. The set geometric center is 3802 and the geometric pattern 3804 forms a square. The turbine modules 3806A, 3806B, 3806C, and 3806D are shown with two side-by-side wind turbines 3810, which is one embodiment of the number of wind turbines 3810 that are side-by-side. There could be more than two side-by-side in embodiments. Illustrated set 3800 shown with four turbine modules 3806A, 3806B, 3806C, and 3806D is an embodiment useful for an average wind speed primarily from two opposing directions, such as might be experienced in a valley between two mountains.

Figure 39:
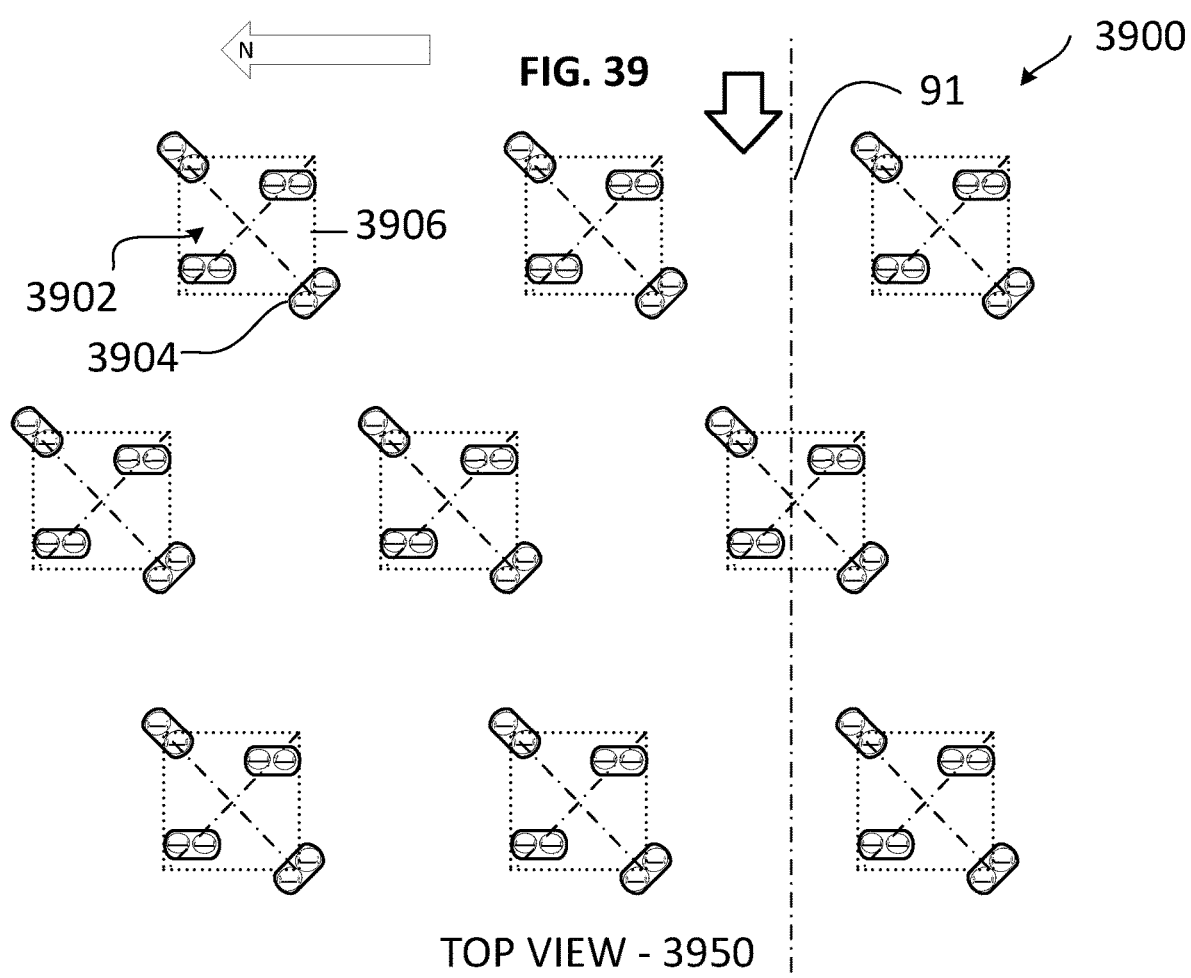
FIG. 39 is an illustrative representation of a wind farm in accordance with embodiments of the present invention.

FIG. 39 is an illustrative representation of wind farm 3900 in accordance with embodiments of the present invention. In particular, FIG. 39 illustrates top view 3950 of one embodiment of a wind farm. As illustrated, wind farm 3900 includes nine sets 3902 but the number of sets 3902 can be smaller or larger, more often larger than nine. The turbine modules 3904 are arranged four in a set 3902, but there are other number and arrangement embodiments suitable to maximize energy production based on the average wind direction and speed at the geographical site. The geometric pattern 3906 of the turbine modules 3904 in sets 3902 form a square, but other geometric patterns 3906 are needed for differing average wind direction and speed. This set 3902 and farm 3900 arrangement is useful for an average wind speed primarily from two opposing directions, such as might be experienced in a valley between two mountains.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

Benefits Over Conventional Multiturbine Arrays
1. Significantly simpler support structure with fewer heavy elevated components because each rotor in this invention turns on its own individual vertical axis to face the wind.
2. Benefits of installing multiple smaller wind turbine arrays in separate structures:
    a. Minimizes wake interference from individual rotors turning on their own axes.
    b. Allows higher density spacing of wind turbines per unit wind farm area.
    c. Reduces the cost of structures.
3. Wake interference is mitigated by installing modules and sets in specific arrangements, depending on the prevailing wind directions.
4. Energy is maximized by installing individual structures (modules) aligned to a specific compass direction for one selected prevailing wind direction.

5. Benefits realized rotating the individual turbines inside of the support structure, instead of outside and around the support structure:
   a. The support structure can be constructed from the surface up without the use of large mobile cranes.
   b. The support structure can be used for rotor and heavy component maintenance and installation without the use of a large mobile cranes.
   c. The support structure can be less costly than monopole tower.
   d. The base of the support has a larger surface area, simplifying the foundation design.
   e. A roof can be installed on the structure to mitigate icing and lightning damage and curtailments.
   f. Solar energy devices can be installed on a roof.
   g. A grid or other elements can be installed to reduce flying animal deaths.
   h. Duct augmented multirotor turbines can be easily accommodated and supported.
   i. Vertical Axis multirotor turbine can be easily accommodated and supported.
   j. Rotors supported at their tips can be easily accommodated and a circumferential ring can be used to replace the gearbox.
6. Wake interference can be offset by the controls by several methods:
   a. An upwind rotor control optimizes the output from the upwind rotor plus a rotor downwind approximately 10 diameters downwind.
   b. A downwind rotor in the same structure (module) can be set to produce no energy, leaving the wind resource for the upwind rotor.
   c. An upwind rotor in the same structure can be set to produce no energy, leaving the wind resource for the downwind rotor.
   d. Other sharing of the wind resources can be employed for rotors sharing the same wind stream, i.e., wake interference.
   e. The individual wind turbines can be steered horizontally (azimuthally) and vertically (altitudinally) to minimize wake interference.

Alternative Embodiments

FIG. 40 is an illustrative representation of a 2×2 wind farm turbine configuration in accordance with embodiments of the present invention. In particular, FIG. 40 illustrates top view 4010, front view 4020, and side view 4030 of two modules 4000A and 4000B each having two turbines. As illustrated, module 4000A includes two turbines 4022 and 4026. Likewise, module 4000B includes two turbines 4024 and 4028. In embodiments, modules may include any number of turbines in any configuration of matrices without departing from embodiments provided herein. For example, one skilled in the art will readily recognize that: one module may include two turbines configured as shown; another module may include three turbines; yet another module may include four turbines; and so on. In this manner, modules may be selected to optimize power generation for a given location. In addition, modules may be configured as open rotor, neutral non-lift duct, or duct with aerodynamic lift to augment energy extraction in embodiments.

In embodiments, each of the turbines is independently steerable. As illustrated, turbines are steerable about axes 4004A and 4004B as illustrated by azimuthal steering 4002A and 4002B. In addition, turbines are steerable about axes 4006A and 4006B as illustrated by altitudinal steering 4008A and 4008B. Further illustrated is fixed module orientation axis 4012 which corresponds with an initial configuration of a wind farm in embodiments. Configuration of windfarms will be discussed in further detail below FIGS. 42-48. Still further illustrated are turbine blades. As illustrated, each turbine includes three turbine blades. However, in embodiments, turbines may include two or more turbine blades without limitation as may be appreciated by one skilled in the art.

FIG. 41 is an illustrative representation of a 1×2 wind farm turbine configuration in accordance with embodiments of the present invention. In particular, FIG. 41 illustrates top view 4110, front view 4120, and side view 4130 of two modules 4100A and 4100B each having two turbines. As illustrated, module 4100A includes turbine 4122. Likewise, module 4100B includes turbine 4124. In addition, modules may be configured as open rotor, neutral non-lift duct, or duct with aerodynamic lift to augment energy extraction in embodiments.

In embodiments, each of the turbines is independently steerable. As illustrated, turbines are steerable about axes 4104A and 4104B as illustrated by azimuthal steering 4102A and 4102B. In addition, turbines are steerable about axis 4106 as illustrated by altitudinal steering 4108. Further illustrated is fixed module orientation axis 4112 which corresponds with an initial configuration of a wind farm in embodiments. Configuration of windfarms will be discussed in further detail below for FIGS. 42-48. Still further illustrated are turbine blades. As illustrated, each turbine includes three turbine blades. However, in embodiments, turbines may include two or more turbine blades without limitation as may be appreciated by one skilled in the art.

Figure 42:
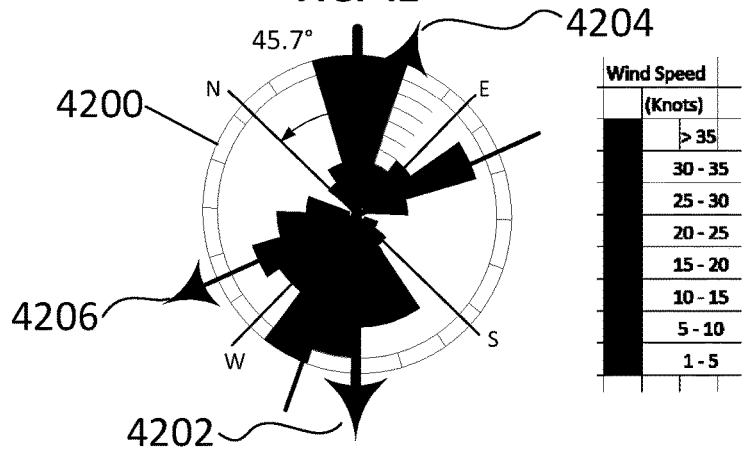
FIG. 42 is an illustrative representation of a wind rose diagram in accordance with embodiments of the present invention.

FIG. 42 is an illustrative representation of a wind rose diagram in accordance with embodiments of the present invention. As known in the art, a wind rose is a graphic tool used by meteorologists to give a succinct view of how wind speed and direction are typically distributed at a particular location. Using a polar coordinate system of gridding, the frequency of winds over a time period is plotted by wind direction, with color bands showing wind speed ranges. The direction of the longest spoke shows the wind direction with the greatest frequency. As illustrated and based on the wind rose 4200, three prevailing wind directions 4202, 4204, and 4206 are illustrated. In some embodiments, one of the three prevailing wind directions is the primary prevailing wind direction or the wind direction having the highest wind potential. The wind rose illustrated is presented for clarity in presenting and understanding embodiments disclosed herein. The data represented by the wind rose in this illustration does not represent actual data and provided to illustrated how wind farm embodiments are configured and operated.

Figure 43:
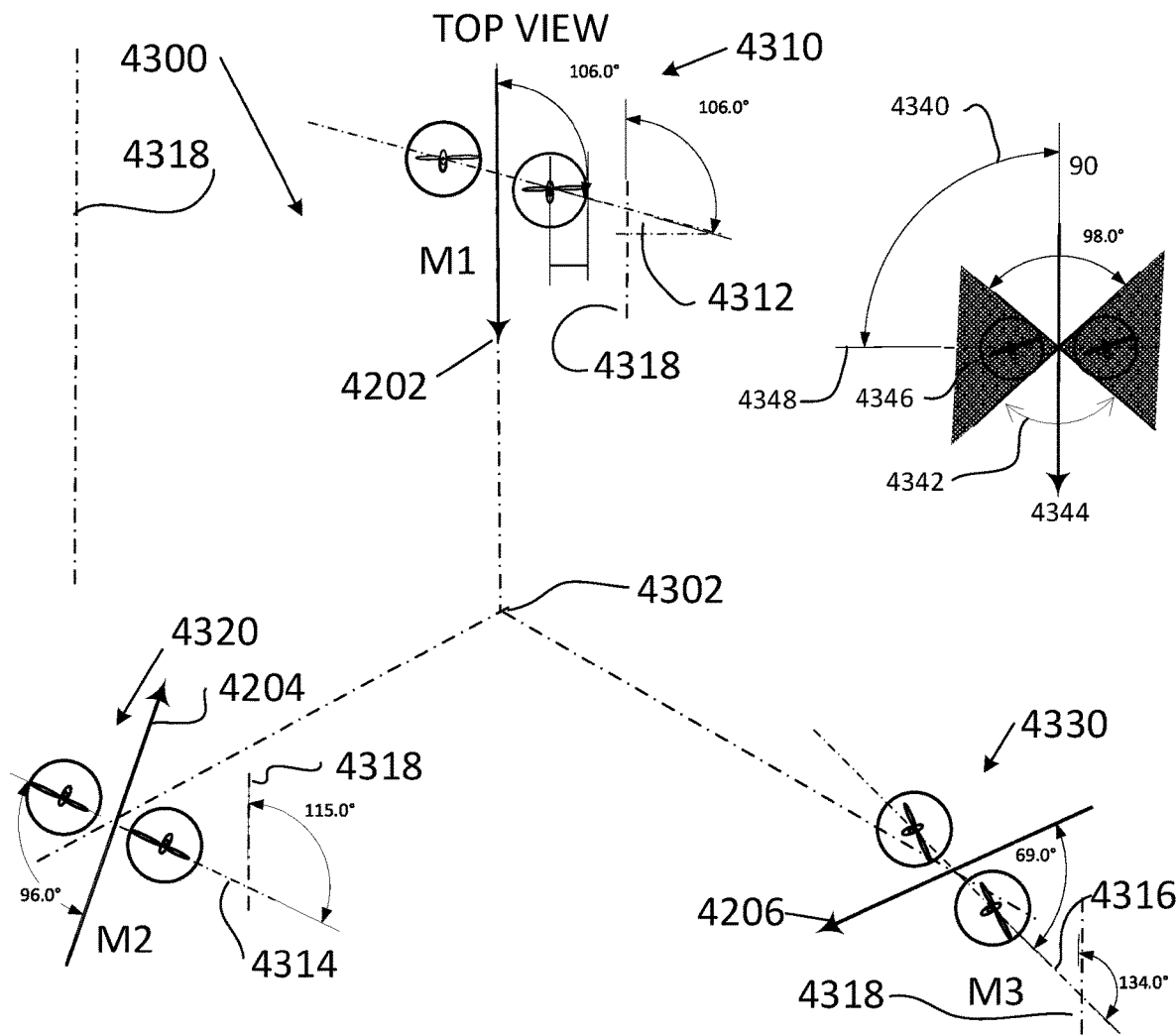
FIG. 43 is an illustrative top view representation of an initial configuration of a wind farm set in accordance with embodiments of the present invention.
Figure 44:
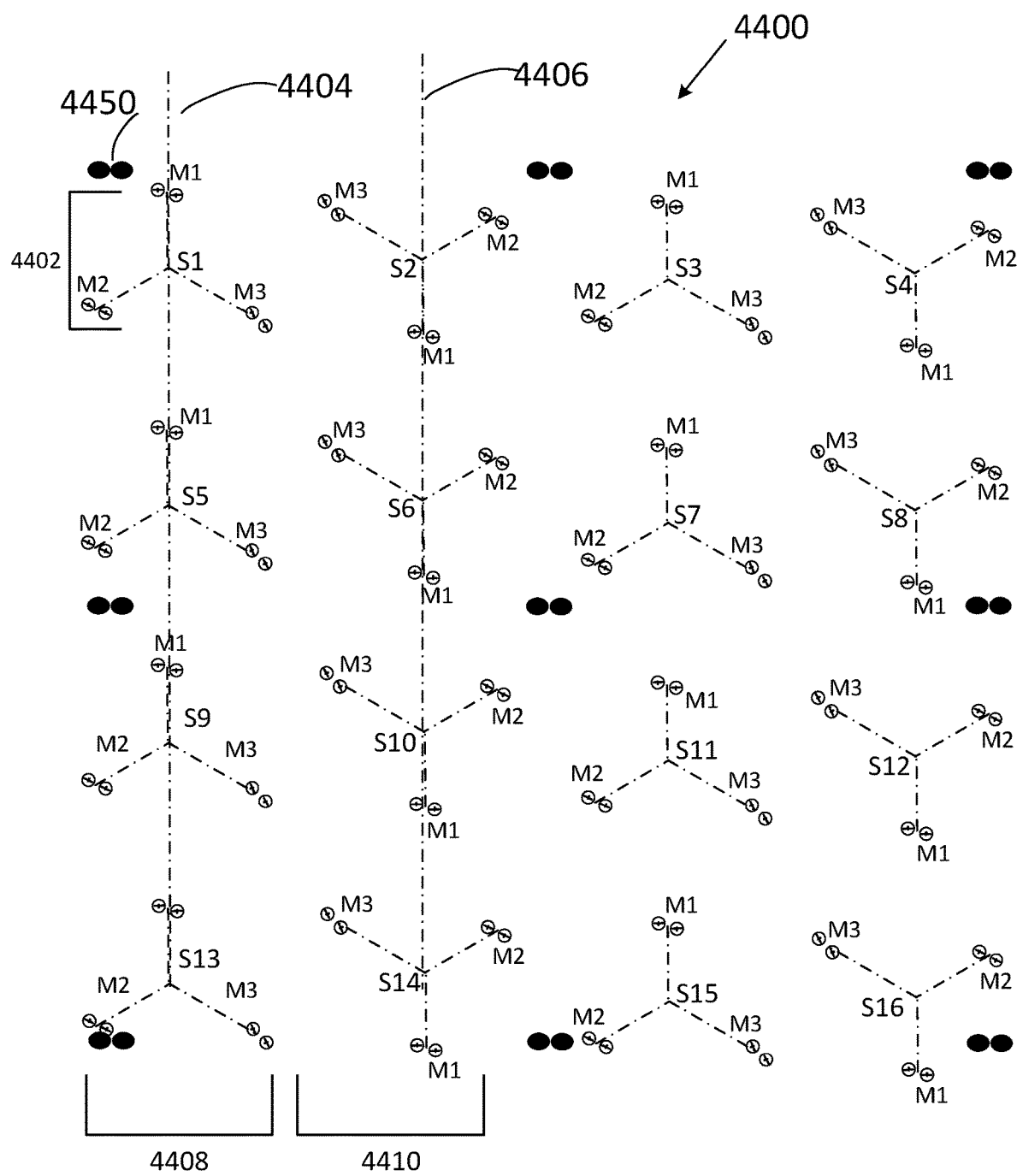
FIG. 44 is an illustrative representation of a wind farm in accordance with embodiments of the present invention.

FIG. 43 is an illustrative top view representation of an initial configuration of a wind farm set in accordance with embodiments of the present invention. In particular, FIG. 43 illustrates a set of three modules in a fixed orientation corresponding with a rose graph (see FIG. 42). As illustrated, set 4300 includes three paired modules 4310 (M1), 4320 (M2), and 4330 (M3). For convenience, sets may be designated S1, S2, S3, etc. In addition, modules may be designated M1, M2, M3. Still further steerable wind turbines may be designated T1, T2, T3, etc. Thus, in a large wind farm configuration, a particular steerable wind turbine may be found according to the designation S3.M2.T4 which is the fourth steerable wind turbine in the second module of the third set. This naming convention will be utilized throughout the disclosure. As illustrated, the three modules are positioned equidistant from each other and spaced approximately ten turbine diameters apart in a fixed module placement. In embodiments, modules are placed no closer than approximately six turbine diameters apart and no further than approximately fifteen turbine diameters apart in a fixed module placement. As utilized herein, a turbine diameter, is the diameter of a circle defined by the steerable wind turbine blade rotation. In embodiments, a steerable wind turbine has a turbine diameter in a range of approximately 50 to 100 meters. In embodiments, where a set includes three modules, the modules are placed 120 degrees apart in a fixed module placement. In embodiments, where a set includes four modules, the modules are placed 90° apart in a fixed module placement.

In the embodiments illustrated, each module has a fixed orientation corresponding with one prevailing wind direction and the module orientation axis 4318 as determined by a rose graph. Referring briefly to FIG. 42, rose graph 4200 includes three prevailing wind directions 4202, 4204, and 4206. Returning to FIG. 43, it may be seen that module M1 4310 has a fixed module orientation 106 degrees from prevailing wind direction 4202 and 106 degrees from the set orientation axis 4318, which, in this case, is parallel with wind direction 4202; module M2 4320 has a fixed module orientation 96 degrees from prevailing wind direction 4204 and 115 degrees from the set orientation axis 4318; and module M3 4330 has a fixed module orientation 69 degrees from prevailing wind direction 1006 and 134 degrees from the set orientation axis 4318. In embodiments, each module orientation is adjusted to approximately 90 degrees plus or minus 15 degrees from its corresponding prevailing wind directions positioned within the plus or minus 15 degrees such that the remaining prevailing wind directions fall within the turbine useable wind range as much as possible. In this manner, each module in a set is oriented to one corresponding prevailing wind direction with the best compromise for the remaining prevailing wind directions. In addition, for a particular prevailing wind direction, the wind steerable turbines in the same module corresponding with that particular prevailing wind direction are in approximately parallel planes and, as such, are optimally oriented for that particular prevailing wind direction. In embodiments, as utilized and illustrated herein, optimum wind angle 4340 is 90 degrees with respect to module orientation 4348 and thereby defines the optimum wind direction 4344. As such, the optimum wind angle is perpendicular to module 4346 and the module orientation 4348. In embodiments, turbine modules are oriented to within 15 degrees of the optimum wind angle. In some embodiments, turbine modules are oriented to within 25 degrees of the optimum wind direction. In addition, the turbine useable wind range 4342 is the range between the two largest wind angles for which the wakes of the upwind turbine do not enter the rotors of adjacent downwind turbines in a module. It may be appreciated that the configurations and orientations apply equally to the embodiments illustrated in FIGS. 40 and 41.

Figure 48:
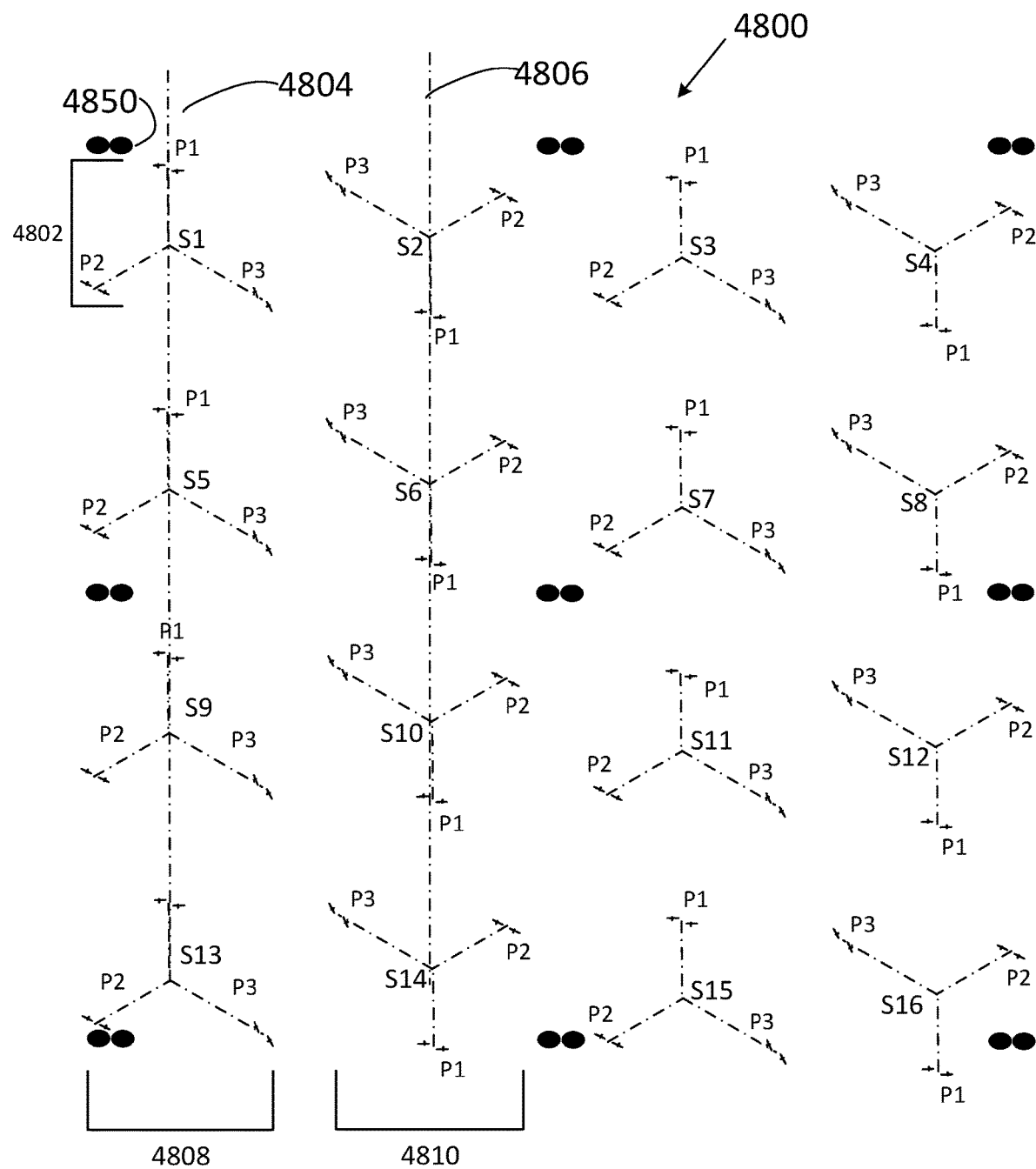
FIG. 48 is an illustrative representation of a wind farm in accordance with embodiments of the present invention.

FIG. 48 is an illustrative representation of a wind farm 4800 in accordance with embodiments of the present invention. In addition, FIG. 48 includes placement of conventional single turbines 4850 imposed over wind farm 4800 embodiment. In this manner, the increased density of turbine sets in embodiments is demonstrated over conventional configurations and demonstrates more energy generation per unit area on the earth surface for embodiments disclosed herein. As illustrated, windfarm includes a number of sets 4802 each located in a fixed set position. Groups of sets are aligned along axes such as 4804 and 4806 which, in embodiments, are parallel. Group 4808, for example, is aligned along axis 4804. In addition, as illustrated, group 4810 is aligned along axis 4806. Importantly, each set of group 4810 is rotated 180° with respect to the modules in group 4808. This pattern allows for maintaining a distance in a range of approximately six to fifteen turbine diameters between modules of different sets. As noted above, a turbine diameter, is the diameter of a circle defined by the steerable wind turbine blade rotation. Maintaining the distance between modules of different sets reduces potential wake interference from upwind and downwind turbines. It may be appreciated that configuration and control methods for a windfarm having monopole wind tower pairs may be accomplished utilizing methods substantially similar to those disclosed for FIGS. 17-21 above. Indeed, configuration and control methods disclosed herein may be utilized for any combination of integrated modules, separated modules, or monopole wind tower pairs in a single windfarm in embodiments.

FIG. 45 is an illustrative representation of a monopole wind tower pair 4500 in accordance with embodiments of the present invention. In particular, FIG. 45 illustrates top view 4510, front view 4520, and side view 4530 of two monopole wind towers 4522 and 4524 each having a turbine. As utilized herein, the term pair refers to two monopole wind towers each having wind steerable turbines in a single supporting structure or in closely spaced supporting structures, all turning about their own vertical azimuthal axes into the wind. In embodiments, each of the turbines is independently steerable. As illustrated, turbines are steerable about axes 4504A and 4504B as illustrated by azimuthal steering 4502A and 4502B. Further illustrated is fixed module orientation axis 4512 which corresponds with an initial configuration of a wind farm in embodiments. Configuration of windfarms will be discussed in further detail below for FIGS. 46-48. Still further illustrated are turbine blades. As illustrated, each turbine includes three turbine blades. However, in embodiments, turbines may include two or more turbine blades without limitation as may be appreciated by one skilled in the art.

Figure 46:
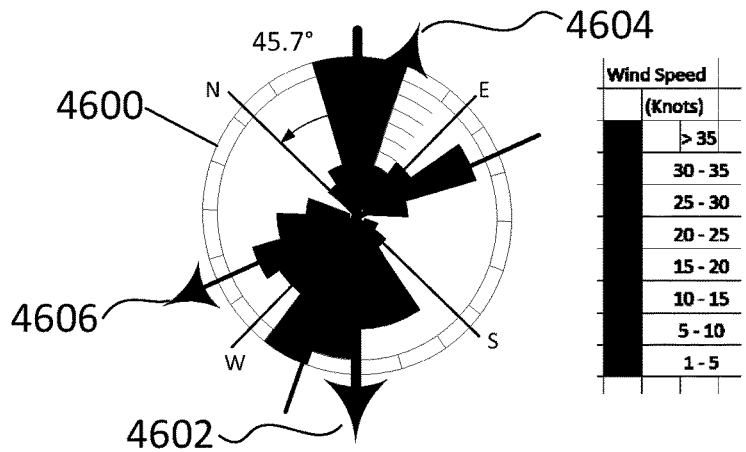
FIG. 46 is an illustrative representation of a wind rose diagram in accordance with embodiments of the present invention.

FIG. 46 is an illustrative representation of a wind rose diagram in accordance with embodiments of the present invention. As known in the art, a wind rose is a graphic tool used by meteorologists to give a succinct view of how wind speed and direction are typically distributed at a particular location. Using a polar coordinate system of gridding, the frequency of winds over a time period is plotted by wind direction, with color bands showing wind speed ranges. The direction of the longest spoke shows the wind direction with the greatest frequency. As illustrated and based on the wind rose 4600, three prevailing wind directions 4602, 4604, and 4606 are illustrated. In some embodiments, one of the three prevailing wind directions is the primary prevailing wind direction or the wind direction having the highest wind potential. The wind rose illustrated is presented for clarity in presenting and understanding embodiments disclosed herein. The data represented by the wind rose in this illustration does not represent actual data and provided to illustrated how wind farm embodiments are configured and operated.

Figure 47:
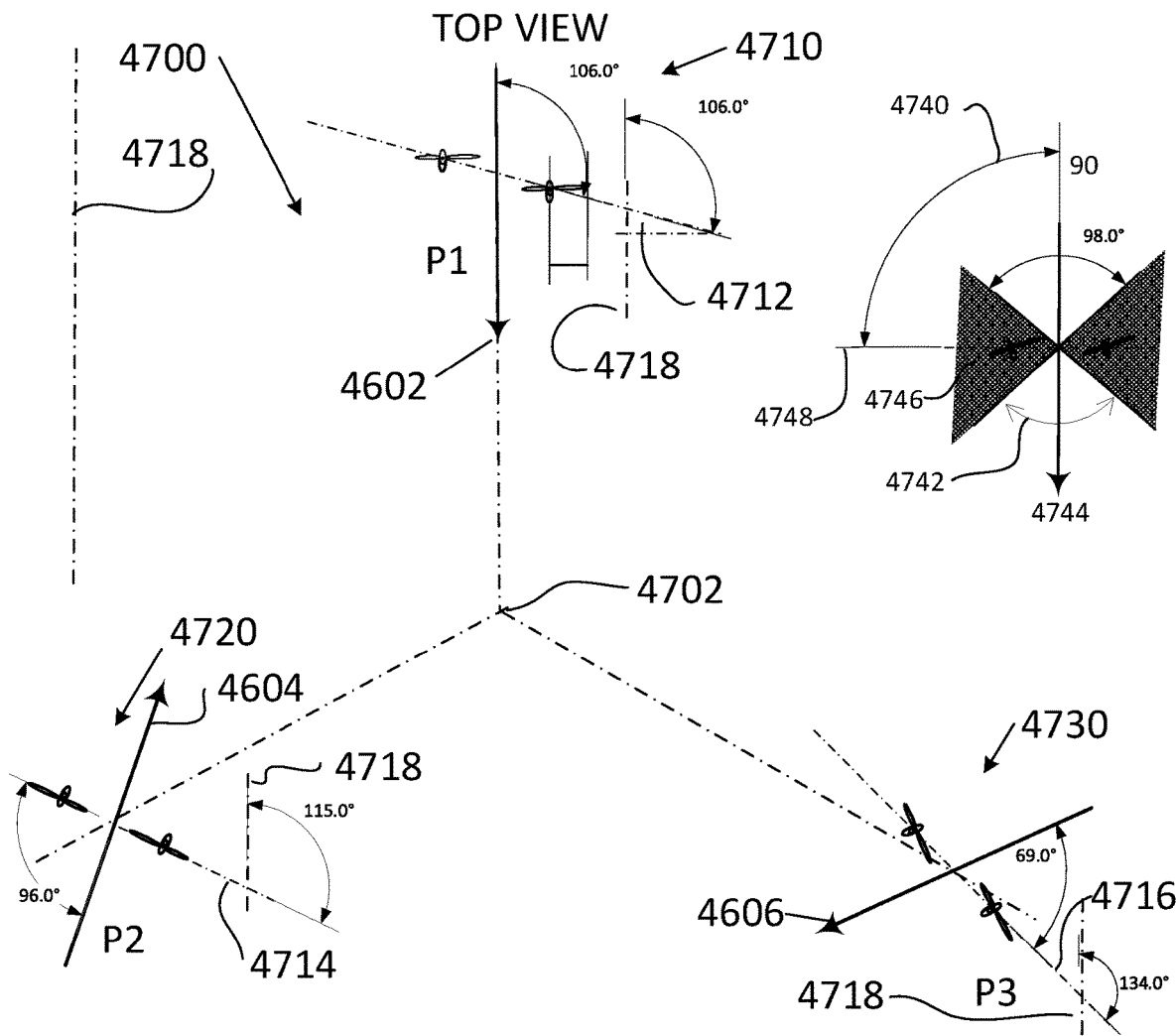
FIG. 47 is an illustrative top view representation of an initial configuration of a wind farm set in accordance with embodiments of the present invention.

FIG. 47 is an illustrative top view representation of an initial configuration of a wind farm set in accordance with embodiments of the present invention. In particular, FIG. 47 illustrates a set of three pairs in a fixed pair orientation corresponding with a rose graph (see FIG. 46). As illustrated, set 4700 includes three pairs 4710 (P1), 4720 (P2), and 4730 (P3). For convenience, sets may be designated S1, S2, S3, etc. In addition, pairs may be designated P1, P2, P3.

Still further steerable wind turbines may be designated T1 and T2. Thus, in a large wind farm configuration, a particular steerable wind turbine may be found according to the designation S3.P2.T2 which is the second steerable wind turbine in the second pair of the third set. This naming convention will be utilized throughout the disclosure. As illustrated, the three pairs are positioned equidistant from each other and spaced approximately ten turbine diameters apart in a fixed pair placement. In embodiments, pairs are placed no closer than approximately six turbine diameters apart and no further than approximately fifteen turbine diameters apart in a fixed pair placement. In embodiments, pairs are placed such that the azimuthal rotational axes are separated by no less than 1.05 times the turbine diameter and by no more than 4.00 times the turbine diameter in a fixed pair placement. As utilized herein, a turbine diameter, is the diameter of a circle defined by the steerable wind turbine blade rotation. In embodiments, a steerable wind turbine has a turbine diameter in a range of approximately 50 to 100 meters. In embodiments, where a set includes three pairs, the pairs are placed 120 degrees apart in a fixed pair position.

In the embodiments illustrated, each pair has a fixed pair orientation corresponding with one prevailing wind direction and the pair orientation axis 4718 as determined by a rose graph. Referring briefly to FIG. 46, rose graph 4600 includes three prevailing wind directions 4602, 4604, and 4606. Returning to FIG. 47, it may be seen that pair P1 4710 has a fixed pair orientation 106 degrees from prevailing wind direction 4602 and 106 degrees from the set orientation axis 4718, which, in this case, is parallel with wind direction 4602; pair P2 4720 has a fixed pair orientation 96 degrees from prevailing wind direction 4604 and 115 degrees from the set orientation axis 4718; and pair P3 4730 has a fixed pair orientation 69 degrees from prevailing wind direction 4606 and 134 degrees from the set orientation axis 4718. In embodiments, each pair orientation is adjusted to approximately 90 degrees plus or minus 15 degrees from its corresponding prevailing wind directions positioned within the plus or minus 15 degrees such that the remaining prevailing wind directions fall within the turbine useable wind range as much as possible. In this manner, each pair in a set is oriented to one corresponding prevailing wind direction with the best compromise for the remaining prevailing wind directions. In addition, for a particular prevailing wind direction, the wind steerable turbines in the same pair corresponding with that particular prevailing wind direction may be positioned in approximately parallel planes and, as such, are optimally oriented for that particular prevailing wind direction. In embodiments, as utilized and illustrated herein, optimum wind angle 4740 is 90 degrees with respect to pair orientation 4748 and thereby defines the optimum wind direction 4744. As such, the optimum wind angle is perpendicular to pair 4746 and the pair orientation 4748. In embodiments, monopole wind tower pairs are oriented to within 15 degrees of the optimum wind angle. In some embodiments, monopole wind tower pairs are oriented to within 25 degrees of the optimum wind direction. In addition, the turbine useable wind range 4742 is the range between the two largest wind angles for which the wakes of the upwind turbine do not enter the rotors of adjacent downwind turbines in a pair.

FIG. 48 is an illustrative representation of a wind farm 4800 in accordance with embodiments of the present invention. In addition, FIG. 48 includes placement of conventional single turbines 4850 imposed over wind farm 4800 embodiment. In this manner, the increased density of turbine sets in embodiments is demonstrated over conventional configurations and demonstrates more energy generation per unit area on the earth surface for embodiments disclosed herein. As illustrated, windfarm includes a number of sets 4802 each located in a fixed set position. Groups of sets are aligned along axes such as 4804 and 4806 which, in embodiments, are parallel. Group 4808, for example, is aligned along axis 4804. In addition, as illustrated, group 4810 is aligned along axis 4806. Importantly, each set of group 4810 is rotated 180° with respect to the modules in group 4808. This pattern allows for maintaining a distance in a range of approximately six to fifteen turbine diameters between pairs of different sets. As noted above, a turbine diameter, is the diameter of a circle defined by the steerable wind turbine blade rotation. Maintaining the distance between modules of different sets reduces potential wake interference from upwind and downwind turbines.

It may be appreciated that configuration and control methods for a windfarm having monopole wind tower pairs may be accomplished utilizing methods substantially similar to those disclosed for FIGS. 17-21 above. Indeed, configuration and control methods disclosed herein may be utilized for any combination of integrated modules, separated modules, or monopole wind tower pairs in a single windfarm in embodiments.

Figure 49:
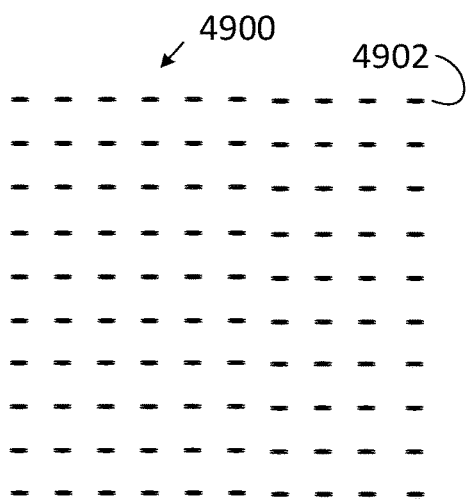
FIG. 49 is an illustrative representation of a conventional prior art wind farm having significant wake interference.

FIG. 49 is an illustrative representation of a conventional prior art wind farm 4900 having significant wake interference. As illustrated, large diameter turbines 4902 are positioned in a 10×10 grid layout for a selected area resulting in 100 turbines with significant wake interference between turbines.

Figure 50:
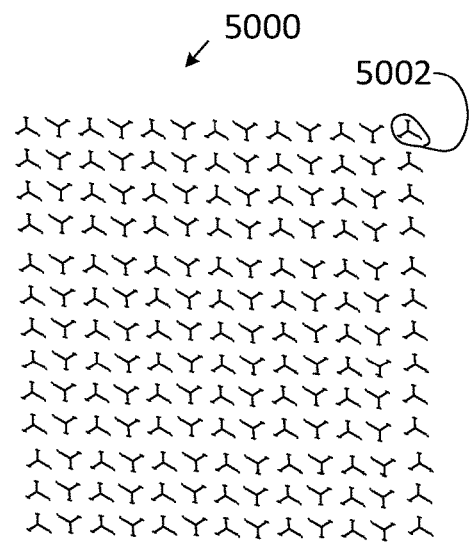
FIG. 50 is an illustrative representation of an optimized wind farm in accordance with embodiments of the present invention.

FIG. 50 is an illustrative representation of an optimized wind farm 5000 in accordance with embodiments of the present invention. As illustrated, large diameter turbine set embodiments 5002 are positioned using methods disclosed herein over a similar area as illustrated in FIG. 49 resulting in 177 equivalent turbines sets with managed wake interference.

Figure 51:
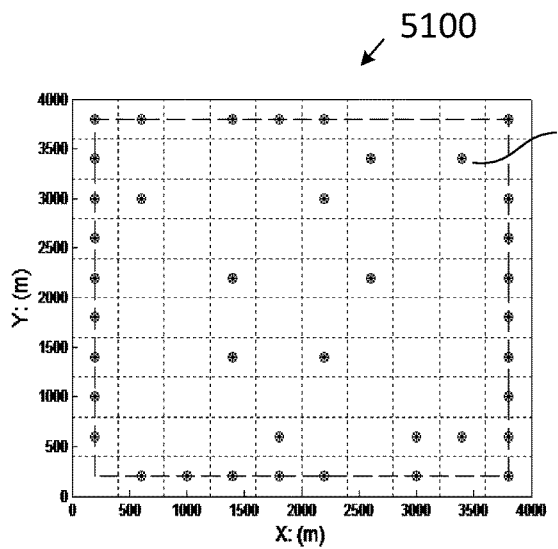
FIG. 51 is an illustrative use case representation of a prior art wind farm having reduced wake interference.

FIG. 51 is an illustrative use case representation of a prior art wind farm 5100 having reduced wake interference. As illustrated, large diameter turbines 5102 are positioned over a similar area as illustrated in FIG. 49 resulting in 39 turbines with reduced wake interference. The use case illustrated may be found at: Feng, Ju; Shen, Wen Zhong, "Optimization of Wind Farm Layout: A Refinement Method by Random Search", Proceedings of the 2013 International Conference on aerodynamics of Offshore Wind Energy Systems and Wakes (ICOWES2013).

Figure 52:
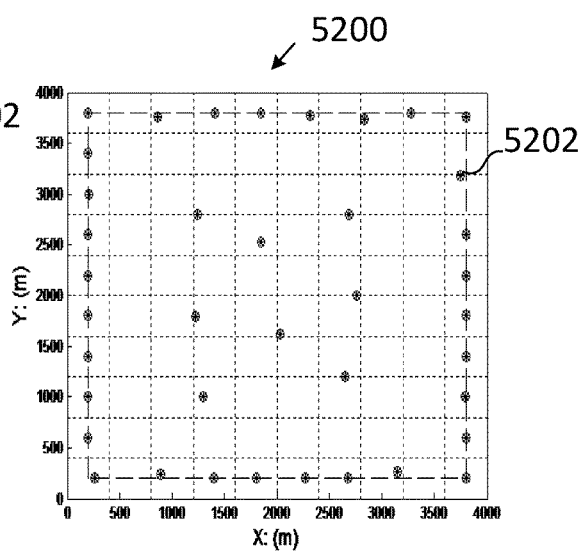
FIG. 52 is an illustrative use case representation of a prior art wind farm having reduced wake interference.

FIG. 52 is an illustrative use case representation of a prior art wind farm 5200 having reduced wake interference. As illustrated, large diameter turbines 5202 are positioned over a similar area as illustrated in FIG. 49 resulting in 40 turbines with reduced wake interference. The use case illustrated may be found at: Feng, Ju; Shen, Wen Zhong, "Optimization of Wind Farm Layout: A Refinement Method by Random Search", Proceedings of the 2013 International Conference on aerodynamics of Offshore Wind Energy Systems and Wakes (ICOWES2013).

In both FIGS. 51 and 52, reduction of wake interference is achieved by strategic placement of the turbines. This strategic placement results in an increase of one turbine from windfarm 5100 to windfarm 5200. However, the density of turbines in both windfarm configurations of FIGS. 51 and 52 is much lower than the density of turbines in the embodiment provided in FIG. 50 using methods disclosed herein. Likewise, in FIG. 49 the density of turbines in a standard 10×10 grid is much lower than the density of turbines in the embodiment provided in FIG. 50 using methods disclosed herein.

What is claimed is:

1. A wind turbine farm comprising:
a plurality of steerable wind turbines each having a turbine diameter, wherein
the plurality of steerable wind turbines is grouped pairwise into a plurality of monopole wind tower pairs, wherein
each monopole wind tower pair is placed in a fixed pair placement and oriented in one of a plurality of fixed pair orientations, wherein
each one of the plurality of fixed pair orientations corresponds with one of a plurality of prevailing wind directions, and wherein
the plurality of monopole wind tower pairs is placed in a plurality of fixed pair positions, and wherein
the plurality of fixed pair positions comprises:
a first fixed pair position oriented along a first axis; and
a second fixed pair position oriented along a second axis and parallel with the first axis, wherein
each of the pairs of the second fixed pair position are rotated 180 degrees with respect to the pairs in the first fixed pair position.

2. The wind turbine farm of claim 1, wherein each steerable wind turbine in a monopole wind tower pair is steerable about a vertical azimuthal axis, and wherein the monopole wind tower pairs are separated by no less than 1.05 times the turbine diameter and by no more than 4.00 times the turbine diameter relative to the vertical azimuthal axis of each monopole wind tower pair.

3. The wind turbine farm of claim 1, wherein the fixed pair placement comprises:
three or more pairs placed approximately equidistant from one another.

4. The wind turbine farm of claim 3, wherein the three or more pairs are each spaced approximately ten turbine diameters apart from each other.

5. The wind turbine farm of claim 1, wherein each fixed pair orientation is oriented within approximately 15 degrees to the corresponding prevailing wind direction.

6. The wind turbine farm of claim 1, wherein each of the plurality of steerable wind turbines is vertically steerable.

7. The wind turbine farm of claim 1, wherein each of the plurality of steerable wind turbines is horizontally steerable.

8. The wind turbine farm of claim 1, wherein each of the plurality of steerable wind turbines has a turbine diameter in a range of approximately 50 to 100 meters.

9. A method for configuring a wind turbine farm defined by an area comprising:
providing a plurality of steerable wind turbines each having a turbine diameter, wherein
the plurality of steerable wind turbines is grouped pairwise into a plurality of monopole wind tower pairs, wherein
each monopole wind tower pair is placed in a fixed pair placement and oriented in one of a plurality of fixed pair orientations, wherein
each one of the plurality of fixed pair orientations corresponds with one of a plurality of prevailing wind directions, wherein
the plurality of monopole wind tower pairs is placed in a plurality of fixed pair positions, and wherein
the plurality of fixed pair positions comprises:
a first fixed pair position oriented along a first axis; and
a second fixed pair position oriented along a second axis and parallel with the first axis, wherein
each of the pairs of the second fixed pair position are rotated 180 degrees with respect to the pairs in the first fixed pair position;
creating a rose graph of the area, the rose graph graphically illustrating a plurality of wind characteristics of the area;
analyzing the rose graph to determine a plurality of prevailing wind directions
placing the plurality of steerable wind turbines such that each one of the plurality of fixed pair orientations corresponds with one of the plurality of prevailing wind directions, wherein
each of the plurality of monopole wind tower pairs is each positioned no closer than approximately six turbine diameters and no further than approximately fifteen turbine diameters from each another, and wherein
each of the plurality of monopole wind tower pairs comprises: a pair of steerable wind turbines each having a turbine diameter.

10. The method of claim 9, wherein the analyzing the rose graph comprises:
determining a first prevailing wind direction based on a first highest wind direction and speed probability distribution;
determining a second prevailing wind direction based on a second highest wind direction and speed probability distribution, wherein the second highest wind direction and speed probability distribution is equal to or lower than the first highest wind direction and speed probability distribution; and
determining a third prevailing wind direction based on a third highest wind direction and speed probability distribution, wherein the third highest wind direction and speed probability distribution is equal to or lower than the second highest wind direction and speed probability distribution.

11. The method of claim 10, further comprising:
determining at least one additional prevailing wind based on at least one additional highest wind direction and speed probability distribution, wherein the at least one highest wind direction and speed probability distribution is equal to or lower than the third highest wind direction and speed probability distribution.

12. The method of claim 9, wherein the analyzing the rose graph comprises:
determining at least one prevailing wind based on at least one highest wind direction and speed probability distribution.

13. The method of claim 9, wherein the wind characteristics are selected from the group consisting of: a wind direction, a wind speed, and a wind duration.

14. The method of claim 9, wherein the plurality of fixed set positions comprises:
a first fixed pair position oriented along a first axis, wherein
a second fixed pair position oriented along a second axis and parallel with the first axis, and wherein
each of the sets of the second fixed pair position are rotated 180 degrees with respect to the sets in the first fixed pair position.

15. A method for operating a wind turbine farm comprising:

providing a plurality of steerable wind turbines each having a turbine diameter, wherein
    the plurality of steerable wind turbines is grouped pairwise into a plurality of monopole wind tower pairs, wherein
    each monopole wind tower pair is placed in a fixed pair placement and oriented in one of a plurality of fixed pair orientations, wherein
    each one of the plurality of fixed pair orientations corresponds with one of a plurality of prevailing wind directions, wherein
    the plurality of monopole wind tower pairs is placed in a plurality of fixed pair positions, and wherein
    the plurality of fixed pair positions comprises:
        a first fixed pair position oriented along a first axis; and
        a second fixed pair position oriented along a second axis and parallel with the first axis, wherein
            each of the pairs of the second fixed pair position are rotated 180 degrees with respect to the pairs in the first fixed pair position;
steering a current turbine, wherein the current turbine is one of a the plurality of steerable wind turbines each having a turbine diameter
determining a turbine control mode based on presence of one or more downwind turbines; and
tuning the current turbine based on the turbine control mode.

16. The method of claim 15, wherein the steering comprises:
    determining a wind direction for the current turbine;
    setting an azimuth angle and veer for the current turbine; and
    determining an idle status of the current turbine.

17. The method of claim 16, wherein the determining the turbine control mode comprises:
    if the idle status of the current turbine is idle, setting the turbine control mode of the current turbine to an upwind interference mode; and
    setting a current turbine target output based on properties of the wind direction.

18. The method of claim 16, wherein the determining the turbine control mode comprises:
    if the idle status of the current turbine is not idle, determining whether the one or more downwind turbines is in a same pair as the current turbine;
    if the one or more downwind turbines is in the same pair, setting the status of the one or more downwind turbines to idle.

* * * * *